US007228000B2

(12) United States Patent
Sakuyama

(10) Patent No.: US 7,228,000 B2
(45) Date of Patent: Jun. 5, 2007

(54) IMAGE DATA GENERATION WITH REDUCED AMOUNT OF PROCESSING

(75) Inventor: Hiroyuki Sakuyama, Tokyo (JP)

(73) Assignee: Ricoh Co., Ltd., Tokyo (JP)

(*) Notice: Subject to any disclaimer, the term of this patent is extended or adjusted under 35 U.S.C. 154(b) by 860 days.

(21) Appl. No.: 10/390,193

(22) Filed: Mar. 14, 2003

(65) Prior Publication Data

US 2003/0228061 A1 Dec. 11, 2003

(30) Foreign Application Priority Data

Mar. 15, 2002 (JP) ............................ 2002-072696

(51) Int. Cl.

| | |
|---|---|
| ***G06K 9/36*** | (2006.01) |
| ***G06K 9/46*** | (2006.01) |
| ***H04N 7/12*** | (2006.01) |
| ***H04N 1/41*** | (2006.01) |
| *H04N 11/02* | (2006.01) |
| *H04N 1/32* | (2006.01) |

(52) U.S. Cl. ............... 382/240; 348/398.1; 358/426.14

(58) Field of Classification Search ................ 382/240, 382/232, 248, 260, 298; 358/426, 432, 433, 358/426.01, 426.14; 348/398, 403, 398.1, 348/403.1; 341/79

See application file for complete search history.

(56) References Cited

U.S. PATENT DOCUMENTS

| | | | | |
|---|---|---|---|---|
| 5,563,960 | A | 10/1996 | Shaprio | |
| 6,041,143 | A | 3/2000 | Chui et al. | |
| 6,101,284 | A * | 8/2000 | Matsubara et al. | 382/260 |
| 6,137,595 | A | 10/2000 | Sakuyama et al. | |
| 6,215,916 | B1 | 4/2001 | Acharya | |
| 6,226,011 | B1 | 5/2001 | Sakuyama et al. | |
| 2002/0039440 | A1 | 4/2002 | Sakuyama | |
| 2002/0159644 | A1 | 10/2002 | Sakuyama | |
| 2002/0196970 | A1 | 12/2002 | Sano et al. | |
| 2003/0002742 | A1 | 1/2003 | Sano et al. | |
| 2003/0179941 | A1* | 9/2003 | DeCegama | 382/240 |

FOREIGN PATENT DOCUMENTS

EP 0 859 335 A2 8/1998

(Continued)

OTHER PUBLICATIONS

Zhong Min Sheng, et al., "JPEG2000-Based Scalable Reconstruction of Image Local Regions", Proceedings of Int'l. Symposium on Intelligent Multimedia, Video and Speech Processing, 2001, pp. 174-177, XP002211321.

Panchanathan, S. et al., "Wavelet Based Scalable Image Compression", Proceedings of the SPIE, SPIE Bellingham, VA, US, vol. 2419, Feb. 7, 1995, pp. 505-514, XP008006331.

(Continued)

*Primary Examiner*—Yon J. Couso
(74) *Attorney, Agent, or Firm*—Blakely, Sokoloff, Taylor & Zafman LLP

(57) ABSTRACT

An image data generator for generating data on a size reduced image of an original image. In one embodiment, the image data generator includes: an inverse wavelet transform unit to perform on inverse wavelet transform on wavelet coefficients; and a coefficient selecting unit to select, of wavelet coefficients in a sub-band, wavelet coefficients to be subjected to the inverse wavelet transform. In one embodiment, the inverse wavelet transform unit performs the inverse wavelet transform only on the wavelet coefficients selected in the coefficient selecting unit with respect to the wavelet coefficients in the sub-band.

14 Claims, 33 Drawing Sheets

IMAGE DATA GENERATOR
10

11
INVERSE WAVELET TRANSFORM UNIT

12
COEFFICIENT SELECTING UNIT

FOREIGN PATENT DOCUMENTS

| | | | |
|---|---|---|---|
| EP | 03005303.7-1247 | | 8/2003 |
| FR | 2 805 640 | A1 | 8/2001 |
| JP | 5012800 | | 1/1993 |
| JP | 05064001 | A | 3/1993 |
| JP | 06022152 | A | 1/1994 |
| JP | 06044692 | A | 2/1994 |
| JP | 06350989 | A | 12/1994 |
| JP | 2000040142 | A | 2/2000 |
| JP | 2000-125293 | | 4/2000 |
| JP | 2000-125294 | | 4/2000 |
| JP | 2001285642 | A | 10/2001 |
| JP | 2002-152517 | | 5/2002 |
| JP | 2002-152744 | | 5/2002 |
| JP | 2002-344732 | | 11/2002 |
| WO | WO 99/49412 | | 9/1999 |

OTHER PUBLICATIONS

Panchanathan, S. et al., "Image Scalability Using Wavelet Vector Quantization" Journal of Electronic Imaging, SPIE/IS & T, US, vol. 5, No. 2, Apr. 1996, pp. 167-174, XP000596287.

Hideyuki Tamura, "Introduction to Computer Image Processing", Soken Publishing, Ltd., 1985, 7 pages.

JPEG 2000 Part I Committee Draft Version 1.0, Coding of Still Pictures, ISO/IEC JTC1/SC29 WG1, Mar. 16, 2000, XP-001004858, pp. 1-190.

Joel Askelof et al., "Region of Interest Coding in JPEG 2000", Signal Processing: Image Communication, vol. 17, No. 1, Jan. 2002, pp. 105-111.

E. Nguyen et al., "A ROI Approach for Hybrid Image Sequence Coding", Proceedings of the International Conference on Image Processing (ICIP), Austin, Nov. 13-16, 1994, Los Alamitos, vol. 3, Conf. 1, pp. 245-249.

* cited by examiner

FIG.2

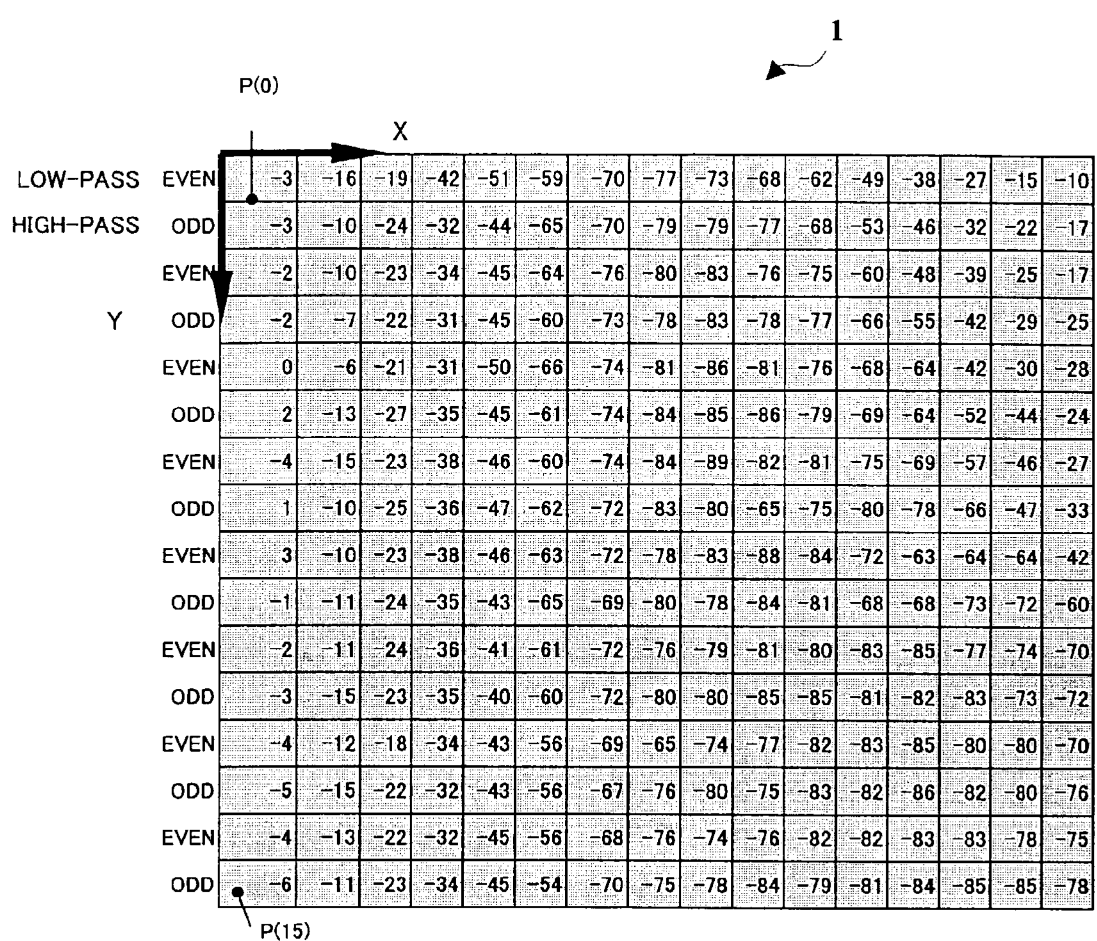

| | | | | | | | | | | | | | | | | |
|---|---|---|---|---|---|---|---|---|---|---|---|---|---|---|---|---|
| LOW-PASS EVEN | −3 | −16 | −19 | −42 | −51 | −59 | −70 | −77 | −73 | −68 | −62 | −49 | −38 | −27 | −15 | −10 |
| HIGH-PASS ODD | −3 | −10 | −24 | −32 | −44 | −65 | −70 | −79 | −79 | −77 | −68 | −53 | −46 | −32 | −22 | −17 |
| EVEN | −2 | −10 | −23 | −34 | −45 | −64 | −76 | −80 | −83 | −76 | −75 | −60 | −48 | −39 | −25 | −17 |
| ODD | −2 | −7 | −22 | −31 | −45 | −60 | −73 | −78 | −83 | −78 | −77 | −66 | −55 | −42 | −29 | −25 |
| EVEN | 0 | −6 | −21 | −31 | −50 | −66 | −74 | −81 | −86 | −81 | −76 | −68 | −64 | −42 | −30 | −28 |
| ODD | 2 | −13 | −27 | −35 | −45 | −61 | −74 | −84 | −85 | −86 | −79 | −69 | −64 | −52 | −44 | −24 |
| EVEN | −4 | −15 | −23 | −38 | −46 | −60 | −74 | −84 | −89 | −82 | −81 | −75 | −69 | −57 | −46 | −27 |
| ODD | 1 | −10 | −25 | −36 | −47 | −62 | −72 | −83 | −80 | −65 | −75 | −80 | −78 | −66 | −47 | −33 |
| EVEN | 3 | −10 | −23 | −38 | −46 | −63 | −72 | −78 | −83 | −88 | −84 | −72 | −63 | −64 | −64 | −42 |
| ODD | −1 | −11 | −24 | −35 | −43 | −65 | −69 | −80 | −78 | −84 | −81 | −68 | −68 | −73 | −72 | −60 |
| EVEN | −2 | −11 | −24 | −36 | −41 | −61 | −72 | −76 | −79 | −81 | −80 | −83 | −85 | −77 | −74 | −70 |
| ODD | −3 | −15 | −23 | −35 | −40 | −60 | −72 | −80 | −80 | −85 | −85 | −81 | −82 | −83 | −73 | −72 |
| EVEN | −4 | −12 | −18 | −34 | −43 | −56 | −69 | −65 | −74 | −77 | −82 | −83 | −85 | −80 | −80 | −70 |
| ODD | −5 | −15 | −22 | −32 | −43 | −56 | −67 | −76 | −80 | −75 | −83 | −82 | −86 | −82 | −80 | −76 |
| EVEN | −4 | −13 | −22 | −32 | −45 | −56 | −68 | −76 | −74 | −76 | −82 | −82 | −83 | −83 | −78 | −75 |
| ODD | −6 | −11 | −23 | −34 | −45 | −54 | −70 | −75 | −78 | −84 | −79 | −81 | −84 | −85 | −85 | −78 |

| EVEN | ODD | EVEN | ODD | | | | | | | | | | | | |
|---|---|---|---|---|---|---|---|---|---|---|---|---|---|---|---|
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |

EVEN ODD EVEN ODD

| LL | HL | LL | HL | LL | HL | LL | HL | LL | HL | LL | HL | LL | HL | LL | HL |
|---|---|---|---|---|---|---|---|---|---|---|---|---|---|---|---|
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |

| 1LL | 1LL | 1LL | 1LL | 1LL | 1LL | 1LL | 1LL | 1HL | 1HL | 1HL | 1HL | 1HL | 1HL | 1HL | 1HL |
|---|---|---|---|---|---|---|---|---|---|---|---|---|---|---|---|
| 1LL | 1LL | 1LL | 1LL | 1LL | 1LL | 1LL | 1LL | 1HL | 1HL | 1HL | 1HL | 1HL | 1HL | 1HL | 1HL |
| 1LL | 1LL | 1LL | 1LL | 1LL | 1LL | 1LL | 1LL | 1HL | 1HL | 1HL | 1HL | 1HL | 1HL | 1HL | 1HL |
| 1LL | 1LL | 1LL | 1LL | 1LL | 1LL | 1LL | 1LL | 1HL | 1HL | 1HL | 1HL | 1HL | 1HL | 1HL | 1HL |
| 1LL | 1LL | 1LL | 1LL | 1LL | 1LL | 1LL | 1LL | 1HL | 1HL | 1HL | 1HL | 1HL | 1HL | 1HL | 1HL |
| 1LL | 1LL | 1LL | 1LL | 1LL | 1LL | 1LL | 1LL | 1HL | 1HL | 1HL | 1HL | 1HL | 1HL | 1HL | 1HL |
| 1LL | 1LL | 1LL | 1LL | 1LL | 1LL | 1LL | 1LL | 1HL | 1HL | 1HL | 1HL | 1HL | 1HL | 1HL | 1HL |
| 1LL | 1LL | 1LL | 1LL | 1LL | 1LL | 1LL | 1LL | 1HL | 1HL | 1HL | 1HL | 1HL | 1HL | 1HL | 1HL |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |

| | | | | | | | | | | | | | | | |
|---|---|---|---|---|---|---|---|---|---|---|---|---|---|---|---|
| 2LL | 2LL | 2LL | 2LL | 2HL | 2HL | 2HL | 2HL | 1HL | 1HL | 1HL | 1HL | 1HL | 1HL | 1HL | 1HL |
| 2LL | 2LL | 2LL | 2LL | 2HL | 2HL | 2HL | 2HL | 1HL | 1HL | 1HL | 1HL | 1HL | 1HL | 1HL | 1HL |
| 2LL | 2LL | 2LL | 2LL | 2HL | 2HL | 2HL | 2HL | 1HL | 1HL | 1HL | 1HL | 1HL | 1HL | 1HL | 1HL |
| 2LL | 2LL | 2LL | 2LL | 2HL | 2HL | 2HL | 2HL | 1HL | 1HL | 1HL | 1HL | 1HL | 1HL | 1HL | 1HL |
| 2LH | 2LH | 2LH | 2LH | 2HH | 2HH | 2HH | 2HH | 1HL | 1HL | 1HL | 1HL | 1HL | 1HL | 1HL | 1HL |
| 2LH | 2LH | 2LH | 2LH | 2HH | 2HH | 2HH | 2HH | 1HL | 1HL | 1HL | 1HL | 1HL | 1HL | 1HL | 1HL |
| 2LH | 2LH | 2LH | 2LH | 2HH | 2HH | 2HH | 2HH | 1HL | 1HL | 1HL | 1HL | 1HL | 1HL | 1HL | 1HL |
| 2LH | 2LH | 2LH | 2LH | 2HH | 2HH | 2HH | 2HH | 1HL | 1HL | 1HL | 1HL | 1HL | 1HL | 1HL | 1HL |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |

| | | | | | | | | | | | | | | | | |
|---|---|---|---|---|---|---|---|---|---|---|---|---|---|---|---|---|
| EVEN | -3 | -16 | -19 | -42 | -51 | -59 | -70 | -77 | -73 | -68 | -62 | -49 | -38 | -27 | -15 | -10 |
| | -3 | -10 | -24 | -32 | -44 | -65 | -70 | -79 | -79 | -77 | -68 | -53 | -46 | -32 | -22 | -17 |
| | -2 | -10 | -23 | -34 | -45 | -64 | -76 | -80 | -83 | -76 | -75 | -60 | -48 | -39 | -25 | -17 |
| ODD | -2 | -7 | -22 | -31 | -45 | -60 | -73 | -78 | -83 | -78 | -77 | -66 | -55 | -42 | -29 | -25 |
| | 0 | -6 | -21 | -31 | -50 | -66 | -74 | -81 | -86 | -81 | -76 | -68 | -64 | -42 | -30 | -28 |
| | 2 | -13 | -27 | -35 | -45 | -61 | -74 | -84 | -85 | -86 | -79 | -69 | -64 | -52 | -44 | -24 |
| EVEN | -4 | -15 | -23 | -38 | -46 | -60 | -74 | -84 | -89 | -82 | -81 | -75 | -69 | -57 | -46 | -27 |
| | 1 | -10 | -25 | -36 | -47 | -62 | -72 | -83 | -80 | -65 | -75 | -80 | -78 | -66 | -47 | -33 |
| | 3 | -10 | -23 | -38 | -46 | -63 | -72 | -78 | -83 | -88 | -84 | -72 | -63 | -64 | -64 | -42 |
| ODD | -1 | -11 | -24 | -35 | -43 | -65 | -69 | -80 | -78 | -84 | -81 | -68 | -68 | -73 | -72 | -60 |
| | -2 | -11 | -24 | -36 | -41 | -61 | -72 | -76 | -79 | -81 | -80 | -83 | -85 | -77 | -74 | -70 |
| | -3 | -15 | -23 | -35 | -40 | -60 | -72 | -80 | -80 | -85 | -85 | -81 | -82 | -83 | -73 | -72 |
| EVEN | -4 | -12 | -18 | -34 | -43 | -56 | -69 | -65 | -74 | -77 | -82 | -83 | -85 | -80 | -80 | -70 |
| | -5 | -15 | -22 | -32 | -43 | -56 | -67 | -76 | -80 | -75 | -83 | -82 | -86 | -82 | -80 | -76 |
| | -4 | -13 | -22 | -32 | -45 | -56 | -68 | -76 | -74 | -76 | -82 | -82 | -83 | -83 | -78 | -75 |
| | -6 | -11 | -23 | -34 | -45 | -54 | -70 | -75 | -78 | -84 | -79 | -81 | -84 | -85 | -85 | -78 |

FIG.8B

| | | | | | | | | | | | | | | | | |
|---|---|---|---|---|---|---|---|---|---|---|---|---|---|---|---|---|
| EVEN L | -3 | -16 | -19 | -42 | -51 | -59 | -70 | -77 | -73 | -68 | -62 | -49 | -38 | -27 | -15 | -10 |
| H | -3 | -10 | -24 | -32 | -44 | -65 | -70 | -79 | -79 | -77 | -68 | -53 | -46 | -32 | -22 | -17 |
| | -2 | -10 | -23 | -34 | -45 | -64 | -76 | -80 | -83 | -76 | -75 | -60 | -48 | -39 | -25 | -17 |
| | -2 | -7 | -22 | -31 | -45 | -60 | -73 | -78 | -83 | -78 | -77 | -66 | -55 | -42 | -29 | -25 |
| EVEN | 0 | -6 | -21 | -31 | -50 | -66 | -74 | -81 | -86 | -81 | -76 | -68 | -64 | -42 | -30 | -28 |
| | 2 | -13 | -27 | -35 | -45 | -61 | -74 | -84 | -85 | -86 | -79 | -69 | -64 | -52 | -44 | -24 |
| | -4 | -15 | -23 | -38 | -46 | -60 | -74 | -84 | -89 | -82 | -81 | -75 | -69 | -57 | -46 | -27 |
| | 1 | -10 | -25 | -36 | -47 | -62 | -72 | -83 | -80 | -65 | -75 | -80 | -78 | -66 | -47 | -33 |
| EVEN | 3 | -10 | -23 | -38 | -46 | -63 | -72 | -78 | -83 | -88 | -84 | -72 | -63 | -64 | -64 | -42 |
| | -1 | -11 | -24 | -35 | -43 | -65 | -69 | -80 | -78 | -84 | -81 | -68 | -68 | -73 | -72 | -60 |
| | -2 | -11 | -24 | -36 | -41 | -61 | -72 | -76 | -79 | -81 | -80 | -83 | -85 | -77 | -74 | -70 |
| | -3 | -15 | -23 | -35 | -40 | -60 | -72 | -80 | -80 | -85 | -85 | -81 | -82 | -83 | -73 | -72 |
| EVEN | -4 | -12 | -18 | -34 | -43 | -56 | -69 | -65 | -74 | -77 | -82 | -83 | -85 | -80 | -80 | -70 |
| | -5 | -15 | -22 | -32 | -43 | -56 | -67 | -76 | -80 | -75 | -83 | -82 | -86 | -82 | -80 | -76 |
| | -4 | -13 | -22 | -32 | -45 | -56 | -68 | -76 | -74 | -76 | -82 | -82 | -83 | -83 | -78 | -75 |
| | -6 | -11 | -23 | -34 | -45 | -54 | -70 | -75 | -78 | -84 | -79 | -81 | -84 | -85 | -85 | -78 |

FIG.9A

| | | | | | | | | | | | | | | | | |
|---|---|---|---|---|---|---|---|---|---|---|---|---|---|---|---|---|
| EVEN L | -3 | -14 | -20 | -39 | -49 | -60 | -68 | -77 | -73 | -70 | -61 | -48 | -39 | -26 | -16 | -11 |
| H | 0 | 3 | -3 | 6 | 4 | -3 | 3 | 0 | -1 | -5 | 1 | 2 | -3 | 1 | -2 | -3 |
| | -2 | -9 | -24 | -32 | -43 | -63 | -75 | -79 | -83 | -77 | -75 | -60 | -48 | -39 | -26 | -18 |
| ODD | -1 | 1 | 0 | 2 | 3 | 5 | 2 | 3 | 2 | 1 | -1 | -2 | 1 | -1 | -1 | -2 |
| | 1 | -6 | -22 | -30 | -48 | -64 | -73 | -80 | -85 | -82 | -76 | -68 | -63 | -43 | -32 | -27 |
| | 4 | -2 | -5 | 0 | 3 | 2 | 0 | -1 | 3 | -4 | 0 | 3 | 3 | -2 | -6 | 4 |
| EVEN | -2 | -15 | -25 | -37 | -45 | -59 | -74 | -85 | -87 | -78 | -79 | -76 | -71 | -59 | -45 | -25 |
| | 2 | 3 | -2 | 2 | -1 | 0 | 1 | -2 | 6 | 20 | 8 | -6 | -12 | -5 | 8 | 2 |
| | 3 | -9 | -23 | -37 | -46 | -64 | -71 | -79 | -81 | -83 | -82 | -71 | -64 | -66 | -63 | -42 |
| ODD | -1 | 0 | 0 | 2 | 1 | -3 | 3 | -3 | 3 | 1 | 1 | 10 | 6 | -2 | -3 | -4 |
| | -2 | -12 | -24 | -35 | -40 | -62 | -71 | -79 | -79 | -82 | -81 | -80 | -83 | -78 | -74 | -71 |
| | 0 | -3 | -2 | 0 | 2 | -1 | -1 | -9 | -3 | -6 | -4 | 2 | 3 | -4 | 4 | -2 |
| EVEN | -4 | -13 | -19 | -34 | -42 | -56 | -69 | -68 | -76 | -78 | -83 | -82 | -85 | -81 | -79 | -71 |
| | -1 | -2 | -2 | 1 | 1 | 0 | 2 | -5 | -6 | 2 | -1 | 1 | -2 | 0 | -1 | -3 |
| | -5 | -13 | -23 | -32 | -45 | -55 | -68 | -77 | -76 | -77 | -81 | -81 | -84 | -83 | -80 | -76 |
| | -2 | 2 | -1 | -2 | 0 | 2 | -2 | 1 | -4 | -8 | 3 | 1 | -1 | -2 | -7 | -3 |

FIG.9B

| EVEN | | | ODD | | | EVEN | | | ODD | | | EVEN | | | |
|---|---|---|---|---|---|---|---|---|---|---|---|---|---|---|---|
| -3 | -14 | -20 | -39 | -49 | -60 | -68 | -77 | -73 | -70 | -61 | -48 | -39 | -26 | -16 | -11 |
| 0 | 3 | -3 | 6 | 4 | -3 | 3 | 0 | -1 | -5 | 1 | 2 | -3 | 1 | -2 | -3 |
| -2 | -9 | -24 | -32 | -43 | -63 | -75 | -79 | -83 | -77 | -75 | -60 | -48 | -39 | -26 | -18 |
| -1 | 1 | 0 | 2 | 3 | -5 | 2 | 3 | 2 | -1 | -1 | -2 | 1 | -1 | -1 | -2 |
| 1 | -6 | -22 | -30 | -48 | -64 | -73 | -80 | -85 | -82 | -76 | -68 | -63 | -43 | -32 | -27 |
| 4 | -2 | -5 | 0 | 3 | 2 | 0 | -1 | 3 | -4 | 0 | 3 | 3 | -2 | -6 | 4 |
| -2 | -15 | -25 | -37 | -45 | -59 | -74 | -85 | -87 | -78 | -79 | -76 | -71 | -59 | -45 | -25 |
| 2 | 3 | -2 | 2 | -1 | 0 | 1 | -2 | 6 | 20 | 8 | -6 | -12 | -5 | 8 | 2 |
| 3 | -9 | -23 | -37 | -46 | -64 | -71 | -79 | -81 | -83 | -82 | -71 | -64 | -66 | -63 | -42 |
| -1 | 0 | 0 | 2 | 1 | -3 | 3 | -3 | 3 | 1 | 1 | 10 | 6 | -2 | -3 | -4 |
| -2 | -12 | -24 | -35 | -40 | -62 | -71 | -79 | -79 | -82 | -81 | -80 | -83 | -78 | -74 | -71 |
| 0 | -3 | -2 | 0 | 2 | -1 | 1 | -9 | -3 | -6 | -4 | 2 | 3 | -4 | 4 | -2 |
| -4 | -13 | -19 | -34 | -42 | -56 | -69 | -68 | -76 | -78 | -83 | -82 | -85 | -81 | -79 | -71 |
| -1 | -2 | -2 | 1 | 1 | 0 | 2 | -5 | -6 | 2 | -1 | 1 | -2 | 0 | -1 | -3 |
| -5 | -13 | -23 | -32 | -45 | -55 | -68 | -77 | -76 | -77 | -81 | -81 | -84 | -83 | -80 | -76 |
| -2 | 2 | -1 | -2 | 0 | 2 | -2 | 1 | -4 | -8 | 3 | 1 | -1 | -2 | -7 | -3 |

ORIGINAL RESOLUTION
L
H
1/2 RESOLUTION
1LL
1HL
1LH
1HH
2L
2H
1/4 RESOLUTION
2LL
2HL
2LH
2HH
3L
1/8 RESOLUTION
3LL
3HL
1/3 RESOLUTION
WAVELET TRANSFORM
INVERSE WAVELET TRANSFORM

39
MONITOR
DISPLAYED SIZE-REDUCED IMAGE
37
36
CPU (INSIDE PC)
35
RAM (INSIDE PC)
S213
S212
S214
S211
38
HDD
WRITTEN SIZE-REDUCED IMAGE
RECORDED ORIGINAL-RESOLUTION IMAGE
DATA BUS
ORIGINAL-RESOLUTION IMAGE

FIG.15

| | |
|---|---|
| RESOLUTION 0 (MIN.) | COMPONENT 0(LUMINANCE) |
| | COMPONENT 1(COLOR DIFFERENCE Cb) |
| | COMPONENT 2(COLOR DIFFERENCE Cr) |
| RESOLUTION 1 | COMPONENT 0 |
| | COMPONENT 1 |
| | COMPONENT 2 |
| RESOLUTION 2 | COMPONENT 0 |
| | COMPONENT 1 |
| | COMPONENT 2 |
| ... | ... |

FIG.24A

| | | | | | | | | | | | | | | | |
|---|---|---|---|---|---|---|---|---|---|---|---|---|---|---|---|
| -3 | -14 | -20 | -39 | -49 | -60 | -68 | -77 | -73 | -70 | -61 | -48 | -39 | -26 | -16 | -11 |
| 0 | 3 | -3 | 6 | 4 | -3 | 3 | 0 | -1 | -5 | 1 | 2 | -3 | 1 | -2 | -3 |
| -2 | -9 | -24 | -32 | -43 | -63 | -75 | -79 | -83 | -77 | -75 | -60 | -48 | -39 | -26 | -18 |
| -1 | 1 | 0 | 2 | 3 | 5 | 2 | 3 | 2 | 1 | -1 | -2 | 1 | -1 | -1 | -2 |
| 1 | -6 | -22 | -30 | -48 | -64 | -73 | -80 | -85 | -82 | -76 | -68 | -63 | -43 | -32 | -27 |
| 4 | -2 | -5 | 0 | 3 | 2 | 0 | -1 | 3 | -4 | 0 | 3 | 3 | -2 | -6 | 4 |
| -2 | -15 | -25 | -37 | -45 | -59 | -74 | -85 | -87 | -78 | -79 | -76 | -71 | -59 | -45 | -25 |
| 2 | 3 | -2 | 2 | -1 | 0 | 1 | -2 | 6 | 20 | 8 | -6 | -12 | -5 | 8 | 2 |
| 3 | -9 | -23 | -37 | -46 | -64 | -71 | -79 | -81 | -83 | -82 | -71 | -64 | -66 | -63 | -42 |
| -1 | 0 | 0 | 2 | 1 | -3 | 3 | -3 | 3 | 1 | 1 | 10 | 6 | -2 | -3 | -4 |
| -2 | -12 | -24 | -35 | -40 | -62 | -71 | -79 | -79 | -82 | -81 | -80 | -83 | -78 | -74 | -71 |
| 0 | -3 | -2 | 0 | 2 | -1 | -1 | -9 | -3 | -6 | -4 | 2 | 3 | -4 | 4 | -2 |
| -4 | -13 | -19 | -34 | -42 | -56 | -69 | -68 | -76 | -78 | -83 | -82 | -85 | -81 | -79 | -71 |
| -1 | -2 | -2 | 1 | 1 | 0 | 2 | -5 | -6 | 2 | -1 | 1 | -2 | 0 | -1 | -3 |
| -5 | -13 | -23 | -32 | -45 | -55 | -68 | -77 | -76 | -77 | -81 | -81 | -84 | -83 | -80 | -76 |
| -2 | 2 | -1 | -2 | 0 | 2 | -2 | 1 | -4 | -8 | 3 | 1 | -1 | -2 | -7 | -3 |

FIG.24B

EVEN ODD EVEN ODD EVEN

| | | | | | | | | | | | | | | | |
|---|---|---|---|---|---|---|---|---|---|---|---|---|---|---|---|
| -3 | -14 | -20 | -39 | -49 | -60 | -68 | -77 | -73 | -70 | -61 | -48 | -39 | -26 | -16 | -11 |
| 0 | 3 | -3 | 6 | 4 | -3 | 3 | 0 | -1 | -5 | 1 | 2 | -3 | 1 | -2 | -3 |
| -2 | -9 | -24 | -32 | -43 | -63 | -75 | -79 | -83 | -77 | -75 | -60 | -48 | -39 | -26 | -18 |
| -1 | 1 | 0 | 2 | 3 | -5 | 2 | 3 | 2 | -1 | -1 | -2 | 1 | -1 | -1 | -2 |
| 1 | -6 | -22 | -30 | -48 | -64 | -73 | -80 | -85 | -82 | -76 | -68 | -63 | -43 | -32 | -27 |
| 4 | -2 | -5 | 0 | 3 | 2 | 0 | -1 | 3 | -4 | 0 | 3 | 3 | -2 | -6 | 4 |
| -2 | -15 | -25 | -37 | -45 | -59 | -74 | -85 | -87 | -78 | -79 | -76 | -71 | -59 | -45 | -25 |
| 2 | 3 | -2 | 2 | -1 | 0 | 1 | -2 | 6 | 20 | 8 | -6 | -12 | -5 | 8 | 2 |
| 3 | -9 | -23 | -37 | -46 | -64 | -71 | -79 | -81 | -83 | -82 | -71 | -64 | -66 | -63 | -42 |
| -1 | 0 | 0 | 2 | 1 | -3 | 3 | -3 | 3 | 1 | 1 | 10 | 6 | -2 | -3 | -4 |
| -2 | -12 | -24 | -35 | -40 | -62 | -71 | -79 | -79 | -82 | -81 | -80 | -83 | -78 | -74 | -71 |
| 0 | -3 | -2 | 0 | 2 | -1 | 1 | -9 | -3 | -6 | -4 | 2 | 3 | -4 | 4 | -2 |
| -4 | -13 | -19 | -34 | -42 | -56 | -69 | -68 | -76 | -78 | -83 | -82 | -85 | -81 | -79 | -71 |
| -1 | -2 | -2 | 1 | 1 | 0 | 2 | -5 | -6 | 2 | -1 | 1 | -2 | 0 | -1 | -3 |
| -5 | -13 | -23 | -32 | -45 | -55 | -68 | -77 | -76 | -77 | -81 | -81 | -84 | -83 | -80 | -76 |
| -2 | 2 | -1 | -2 | 0 | 2 | -2 | 1 | -4 | -8 | 3 | 1 | -1 | -2 | -7 | -3 |

FIG.25A

| | | | | | | | | | | | | | | | | |
|---|---|---|---|---|---|---|---|---|---|---|---|---|---|---|---|---|
| | -3 | -16 | -19 | -42 | -51 | -59 | -70 | -77 | -73 | -68 | -62 | -49 | -38 | -27 | -15 | -10 |
| ODD | -3 | -10 | -24 | -32 | -44 | -65 | -70 | -79 | -79 | -77 | -68 | -53 | -46 | -32 | -22 | -17 |
| | -2 | -10 | -23 | -34 | -45 | -64 | -76 | -80 | -83 | -76 | -75 | -60 | -48 | -39 | -25 | -17 |
| ODD | -2 | -7 | -22 | -31 | -45 | -60 | -73 | -78 | -83 | -78 | -77 | -66 | -55 | -42 | -29 | -25 |
| | 0 | -6 | -21 | -31 | -50 | -66 | -74 | -81 | -86 | -81 | -76 | -68 | -64 | -42 | -30 | -28 |
| ODD | 2 | -13 | -27 | -35 | -45 | -61 | -74 | -84 | -85 | -86 | -79 | -69 | -64 | -52 | -44 | -24 |
| | -4 | -15 | -23 | -38 | -46 | -60 | -74 | -84 | -89 | -82 | -81 | -75 | -69 | -57 | -46 | -27 |
| ODD | 1 | -10 | -25 | -36 | -47 | -62 | -72 | -83 | -80 | -65 | -75 | -80 | -78 | -66 | -47 | -33 |
| | 3 | -10 | -23 | -38 | -46 | -63 | -72 | -78 | -83 | -88 | -84 | -72 | -63 | -64 | -64 | -42 |
| ODD | -1 | -11 | -24 | -35 | -43 | -65 | -69 | -80 | -78 | -84 | -81 | -68 | -68 | -73 | -72 | -60 |
| | -2 | -11 | -24 | -36 | -41 | -61 | -72 | -76 | -79 | -81 | -80 | -83 | -85 | -77 | -74 | -70 |
| ODD | -3 | -15 | -23 | -35 | -40 | -60 | -72 | -80 | -80 | -85 | -85 | -81 | -82 | -83 | -73 | -72 |
| | -4 | -12 | -18 | -34 | -43 | -56 | -69 | -65 | -74 | -77 | -82 | -83 | -85 | -80 | -80 | -70 |
| ODD | -5 | -15 | -22 | -32 | -43 | -56 | -67 | -76 | -80 | -75 | -83 | -82 | -86 | -82 | -80 | -76 |
| | -4 | -13 | -22 | -32 | -45 | -56 | -68 | -76 | -74 | -76 | -82 | -82 | -83 | -83 | -78 | -75 |
| | -6 | -11 | -23 | -34 | -45 | -54 | -70 | -75 | -78 | -84 | -79 | -81 | -84 | -85 | -85 | -78 |

FIG.25B

| | | | | | | | | | | | | | | | | |
|---|---|---|---|---|---|---|---|---|---|---|---|---|---|---|---|---|
| EVEN | -3 | -16 | -19 | -42 | -51 | -59 | -70 | -77 | -73 | -68 | -62 | -49 | -38 | -27 | -15 | -10 |
| | -3 | -10 | -24 | -32 | -44 | -65 | -70 | -79 | -79 | -77 | -68 | -53 | -46 | -32 | -22 | -17 |
| EVEN | -2 | -10 | -23 | -34 | -45 | -64 | -76 | -80 | -83 | -76 | -75 | -60 | -48 | -39 | -25 | -17 |
| | -2 | -7 | -22 | -31 | -45 | -60 | -73 | -78 | -83 | -78 | -77 | -66 | -55 | -42 | -29 | -25 |
| | 0 | -6 | -21 | -31 | -50 | -66 | -74 | -81 | -86 | -81 | -76 | -68 | -64 | -42 | -30 | -28 |
| | 2 | -13 | -27 | -35 | -45 | -61 | -74 | -84 | -85 | -86 | -79 | -69 | -64 | -52 | -44 | -24 |
| | -4 | -15 | -23 | -38 | -46 | -60 | -74 | -84 | -89 | -82 | -81 | -75 | -69 | -57 | -46 | -27 |
| | 1 | -10 | -25 | -36 | -47 | -62 | -72 | -83 | -80 | -65 | -75 | -80 | -78 | -66 | -47 | -33 |
| | 3 | -10 | -23 | -38 | -46 | -63 | -72 | -78 | -83 | -88 | -84 | -72 | -63 | -64 | -64 | -42 |
| | -1 | -11 | -24 | -35 | -43 | -65 | -69 | -80 | -78 | -84 | -81 | -68 | -68 | -73 | -72 | -60 |
| | -2 | -11 | -24 | -36 | -41 | -61 | -72 | -76 | -79 | -81 | -80 | -83 | -85 | -77 | -74 | -70 |
| | -3 | -15 | -23 | -35 | -40 | -60 | -72 | -80 | -80 | -85 | -85 | -81 | -82 | -83 | -73 | -72 |
| | -4 | -12 | -18 | -34 | -43 | -56 | -69 | -65 | -74 | -77 | -82 | -83 | -85 | -80 | -80 | -70 |
| | -5 | -15 | -22 | -32 | -43 | -56 | -67 | -76 | -80 | -75 | -83 | -82 | -86 | -82 | -80 | -76 |
| | -4 | -13 | -22 | -32 | -45 | -56 | -68 | -76 | -74 | -76 | -82 | -82 | -83 | -83 | -78 | -75 |
| | -6 | -11 | -23 | -34 | -45 | -54 | -70 | -75 | -78 | -84 | -79 | -81 | -84 | -85 | -85 | -78 |

FIG.27A

| | | | |
|---|---|---|---|
| 0 | 1 | 2 | 3 |
| 4 | 5 | 6 | 7 |
| 8 | 9 | 10 | 11 |
| 12 | 13 | 14 | 15 |

FIG.27B

MSB BIT PLANE

| | | | |
|---|---|---|---|
| 0 | 0 | 0 | 0 |
| 0 | 0 | 0 | 0 |
| 1 | 1 | 1 | 1 |
| 1 | 1 | 1 | 1 |

| | | | |
|---|---|---|---|
| 0 | 0 | 0 | 0 |
| 1 | 1 | 1 | 1 |
| 0 | 0 | 0 | 0 |
| 1 | 1 | 1 | 1 |

| | | | |
|---|---|---|---|
| 0 | 0 | 1 | 1 |
| 0 | 0 | 1 | 1 |
| 0 | 0 | 1 | 1 |
| 0 | 0 | 1 | 1 |

LSB BIT PLANE

| | | | |
|---|---|---|---|
| 0 | 1 | 0 | 1 |
| 0 | 1 | 0 | 1 |
| 0 | 1 | 0 | 1 |
| 0 | 1 | 0 | 1 |

FIG.28

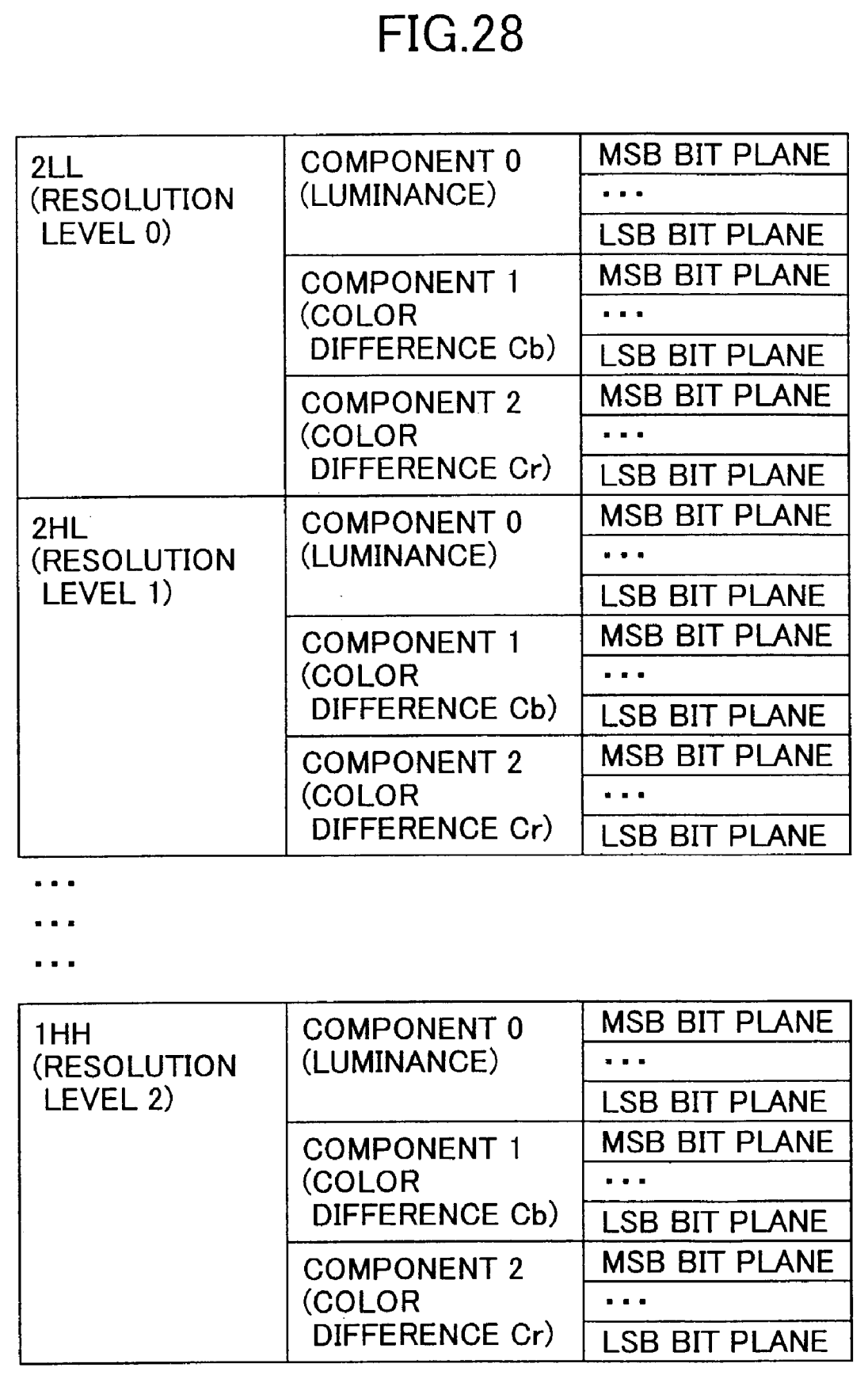

| | | |
|---|---|---|
| 2LL (RESOLUTION LEVEL 0) | COMPONENT 0 (LUMINANCE) | MSB BIT PLANE |
| | | ... |
| | | LSB BIT PLANE |
| | COMPONENT 1 (COLOR DIFFERENCE Cb) | MSB BIT PLANE |
| | | ... |
| | | LSB BIT PLANE |
| | COMPONENT 2 (COLOR DIFFERENCE Cr) | MSB BIT PLANE |
| | | ... |
| | | LSB BIT PLANE |
| 2HL (RESOLUTION LEVEL 1) | COMPONENT 0 (LUMINANCE) | MSB BIT PLANE |
| | | ... |
| | | LSB BIT PLANE |
| | COMPONENT 1 (COLOR DIFFERENCE Cb) | MSB BIT PLANE |
| | | ... |
| | | LSB BIT PLANE |
| | COMPONENT 2 (COLOR DIFFERENCE Cr) | MSB BIT PLANE |
| | | ... |
| | | LSB BIT PLANE |

...

...

...

| | | |
|---|---|---|
| 1HH (RESOLUTION LEVEL 2) | COMPONENT 0 (LUMINANCE) | MSB BIT PLANE |
| | | ... |
| | | LSB BIT PLANE |
| | COMPONENT 1 (COLOR DIFFERENCE Cb) | MSB BIT PLANE |
| | | ... |
| | | LSB BIT PLANE |
| | COMPONENT 2 (COLOR DIFFERENCE Cr) | MSB BIT PLANE |
| | | ... |
| | | LSB BIT PLANE |

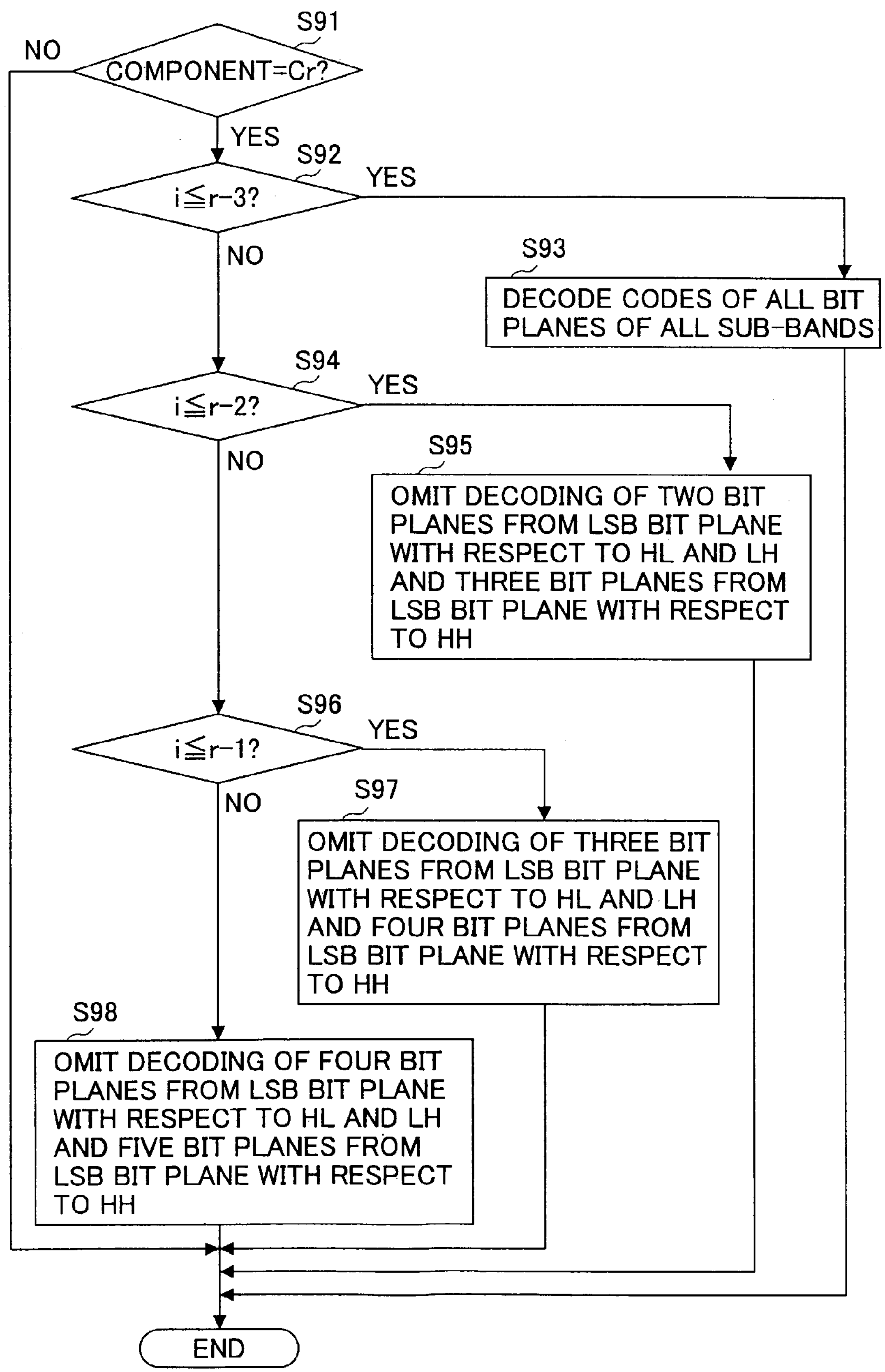
FIG.31
S91
COMPONENT=Cr?
NO
YES
S92
i≦r−3?
YES
NO
S93
DECODE CODES OF ALL BIT PLANES OF ALL SUB-BANDS
S94
i≦r−2?
YES
NO
S95
OMIT DECODING OF TWO BIT PLANES FROM LSB BIT PLANE WITH RESPECT TO HL AND LH AND THREE BIT PLANES FROM LSB BIT PLANE WITH RESPECT TO HH
S96
i≦r−1?
YES
NO
S97
OMIT DECODING OF THREE BIT PLANES FROM LSB BIT PLANE WITH RESPECT TO HL AND LH AND FOUR BIT PLANES FROM LSB BIT PLANE WITH RESPECT TO HH
S98
OMIT DECODING OF FOUR BIT PLANES FROM LSB BIT PLANE WITH RESPECT TO HL AND LH AND FIVE BIT PLANES FROM LSB BIT PLANE WITH RESPECT TO HH
END

IMAGE DATA GENERATION WITH REDUCED AMOUNT OF PROCESSING

The present application claims priority to the corresponding Japanese priority application 2002-072696 filed on Mar. 15, 2002, the entire contents of which are hereby incorporated by reference.

FIELD OF THE INVENTION

The present invention generally relates to image data generators, and more particularly to an image data generator for generating a reduced size image of an original. For purpose of this application, a reduced size image can be the one whose aspect ratio is different from that of the original image. The present invention is applicable to an application program for generating a reduced size image of an original, a device driver such as a printer driver, and other apparatuses for processing images.

DESCRIPTION OF THE RELATED ART

Wavelet transforms have been employed more often lately as a substitute frequency conversion technique for DCTs (Discrete Cosine Transforms) employed in JPEG (Joint Photographic Coding Experts Group). A typical example of the use of wavelet transforms is JPEG 2000, which is an image compression and decompression method standardized internationally in 2001 as a successor to JPEG.

A wavelet transform is characterized in that an image is compressed at high compression rates with excellent image quality, and at the time of compression, is decomposed into a plurality of resolution components so that an image having a lower resolution than the original image is generated.

Conventionally, however, the following restriction exists in generating a low-resolution image from the original image. According to the conventional wavelet decoding entailing resolution conversion, resolution can be reduced only to $1/2^n$ (n=1, 2 . . . ) due to the nature of the wavelet decoding. This is because the conventional wavelet transform employs a two-division filter bank. Accordingly, the low-frequency components can be synthesized only in $1/2^n$ in a synthesis filter bank in the process of decoding, so that the reduction rate of the decoded image is limited to $1/2^n$.

On the other hand, there is a demand for decoding with resolutions other than $1/2^n$ increases as the original image has a higher resolution. That is, if decoding can be performed with resolutions of any rational numbers including $1/2^n$, the decoding is independent of the constraints on the terminal side, thereby considerably expanding its application range.

With respect to this resolution conversion, Japanese Laid-Open Patent Applications No. 2000-125293 and No. 2000-125294 (hereinafter referred to as first prior art and second prior art, respectively), showing the above-described problem in resolution conversion, disclose wavelet decoders and methods. Those wavelet decoders and methods are allowed to decode an image signal compressed and coded by wavelet transforms with resolutions of any rational numbers without being affected by the constraints on the terminal side. As a result, those wavelet decoders and methods are allowed to effectively store and display, for instance, a so-called thumbnail, which is frequently used in electronic still cameras and printers, and an image obtained by converting the resolution of an original image (a reduced or enlarged original image). Therefore, those wavelet decoders and methods can be applied to a wider variety of products.

Each of the wavelet decoders in the first prior art and the second prior art includes an entropy decoding unit that applies entropy decoding to a coded bit stream, an inverse quantization unit that inversely quantizes quantization coefficients and outputs transform coefficients, a transform coefficient inverse scanning unit that scans the transform coefficients according to a predetermined method and rearranges the transform coefficients, and a wavelet inverse transform unit that inversely transforms the rearranged transform coefficients and provides a decoded image. The wavelet inverse transform unit includes means for limiting the bandwidth of the transform coefficients in accordance with magnifications of resolution conversion, and has a configuration where up-samplers, down-samplers, and synthesis filers are adaptively arranged.

FIG. 1 is a diagram showing the configuration of the wavelet inverse transform unit of the wavelet decoder of the second prior art in the case of obtaining a 1/3 resolution of an original image. The wavelet inverse transform unit of FIG. 1 includes 2× up-samplers 119, 121, 124, 126, 129 and 131, low-pass filters 120, 125, and 130 for synthesis, high-pass filters 122, 127, and 132 for synthesis, adders 123, and a down-sampler 134. Due to band restriction, the coefficients of resolution components (LH signal and H signal) 111 and 112 higher than one third of the resolution of the original image are not employed. On the other hand, the coefficient of low-resolution components (LLL signal and LLH signal) 109 and 110 are combined and output from the adder 123 further to be inversely converted, so that an image (signal) 114 whose resolution is a half of the resolution of the original image is obtained. The signal 114 is further inversely transformed so that an image (signal) 117 that has the same resolution as the original image is obtained. Finally, the signal 117 is thinned out or reduced to one third by the down-sampler 134 so that a desired image (signal) 118 is obtained. In FIG. 1, the elements indicated by the broken lines are unnecessary.

Thus, in both of the first prior art and the second prior art described above, it is not clear what "configuration where . . . are adaptively arranged" means. In the embodiments of those inventions, wavelet transform is performed after band restriction so that a decoded image is obtained. Thereafter, the decoded image is thinned out by the down-sampler provided at the final stage, so that a reduced image is obtained. Such a configuration, however, does not also perform inverse wavelet transform and decoding on pixels that are finally eliminated, and therefore, lacks efficiency Japanese Laid-Open Patent Applications No. 2002-152517, No. 2002-152744, and No. 2002-344732 disclose an apparatus and methods for obtaining a decompressed image from a coded image. In these inventions, wavelet coefficients of up to a resolution level close to a desired size are extracted to be subjected to inverse wavelet transform so that a decoded image is generated. Thereafter, processing for varying magnification is performed so that an image of the desired size is obtained. In these inventions, it is required to vary magnification.

Further, the technique of imposing band restriction on a wavelet coefficient in the first prior art and the second prior art may be effective to some extent in increasing processing speed. This technique, however, is based on the premise that all of the codes of the wavelet coefficients that are not subjected to band restriction are decoded in the entropy decoding unit, and therefore, is not efficient.

SUMMARY OF THE INVENTION

An image data generation method and apparatus are disclosed. In one embodiment, an image data generator generates data of a reduced size image of an original image. The image data generator comprises an inverse wavelet transform unit to perform an inverse wavelet transform on wavelet coefficients and a coefficient selecting unit to select wavelet coefficients in a sub-band, wavelet coefficients to be subjected to the inverse wavelet transform. The inverse wavelet transform unit performs the inverse wavelet transform only on the wavelet coefficients selected in the coefficient selecting unit with respect to the wavelet coefficients in the sub-band.

BRIEF DESCRIPTION OF THE DRAWINGS

Other objects, features and advantages of the present invention will become more apparent from the following detailed description when read in conjunction with the accompanying drawings, in which:

FIG. 2 is a diagram for illustrating a process of two-dimensionally (vertically and horizontally) performing wavelet transform called 5×3 transform employed in JPEG 2000 on a 16×16 monochrome image according to one embodiment of the present invention;

FIG. 3 is another diagram for illustrating the process of two-dimensionally (vertically and horizontally) performing wavelet transform called 5×3 transform employed in JPEG 2000 on the 16×16 monochrome image according to one embodiment of the present invention;

FIG. 4 is another diagram for illustrating the process of two-dimensionally (vertically and horizontally) performing wavelet transform called 5×3 transform employed in JPEG 2000 on the 16×16 monochrome image according to one embodiment of the present invention;

FIG. 5 is another diagram for illustrating the process of two-dimensionally (vertically and horizontally) performing wavelet transform called 5×3 transform employed in JPEG 2000 on the 16×16 monochrome image according to one embodiment of the present invention;

FIG. 6 is a diagram showing a typical coefficient array after rearranging coefficients obtained after two wavelet transform operations according to one embodiment of the present invention;

FIG. 8A is a diagram showing a 16×16 image generated by performing inverse wavelet transform on all coefficients obtained after performing 5×3 wavelet transform on the original image of FIG. 2 in the case of obtaining a 5×5 image, and FIG. 8B is a diagram showing the 16×16 image of FIG. 8A in the case of obtaining a 5×4 image according to the first embodiment of the present invention;

FIG. 9 is a diagram showing a 16×16 image generated by performing horizontal filtering at the time of the inverse wavelet transform operation on all the coefficients obtained after performing 5×3 wavelet transform on the original image of FIG. 2 in the case of obtaining the 5×5 image, and FIG. 9B is a diagram showing the 16×16 image of FIG. 9A in the case of obtaining the 5×4 image according to the first embodiment of the present invention;

FIG. 15 is a diagram showing a code configuration according to the fourth embodiment of the present invention;

FIG. 24A is a diagram showing pixels to be obtained in the case of obtaining a 2/3-resolution image of interleaved coefficients and FIG. 24B is a diagram showing pixels to be obtained in the case of generating a 10×8 image of the interleaved coefficients according to the fourth embodiment of the present invention;

FIG. 25A is another diagram showing the pixels to be obtained in the case of obtaining the 2/3-resolution image of the interleaved coefficients and FIG. 25B is another diagram showing the pixels to be obtained in the case of generating the 10×8 image of the interleaved coefficients according to the fourth embodiment of the present invention;

FIG. 27A is a diagram showing coefficients of a 2LL sub-band, and FIG. 27B is a diagram showing the coefficients divided into bit planes according to a sixth embodiment of the present invention;

FIG. 28 is a diagram showing a code configuration according to the sixth embodiment of the present invention;

FIG. 31 is another flowchart for expatiating the partial decoding in the operation of FIG. 29 according to the sixth embodiment of the present invention;

DETAILED DESCRIPTION OF THE PRESENT INVENTION

Figure 1:
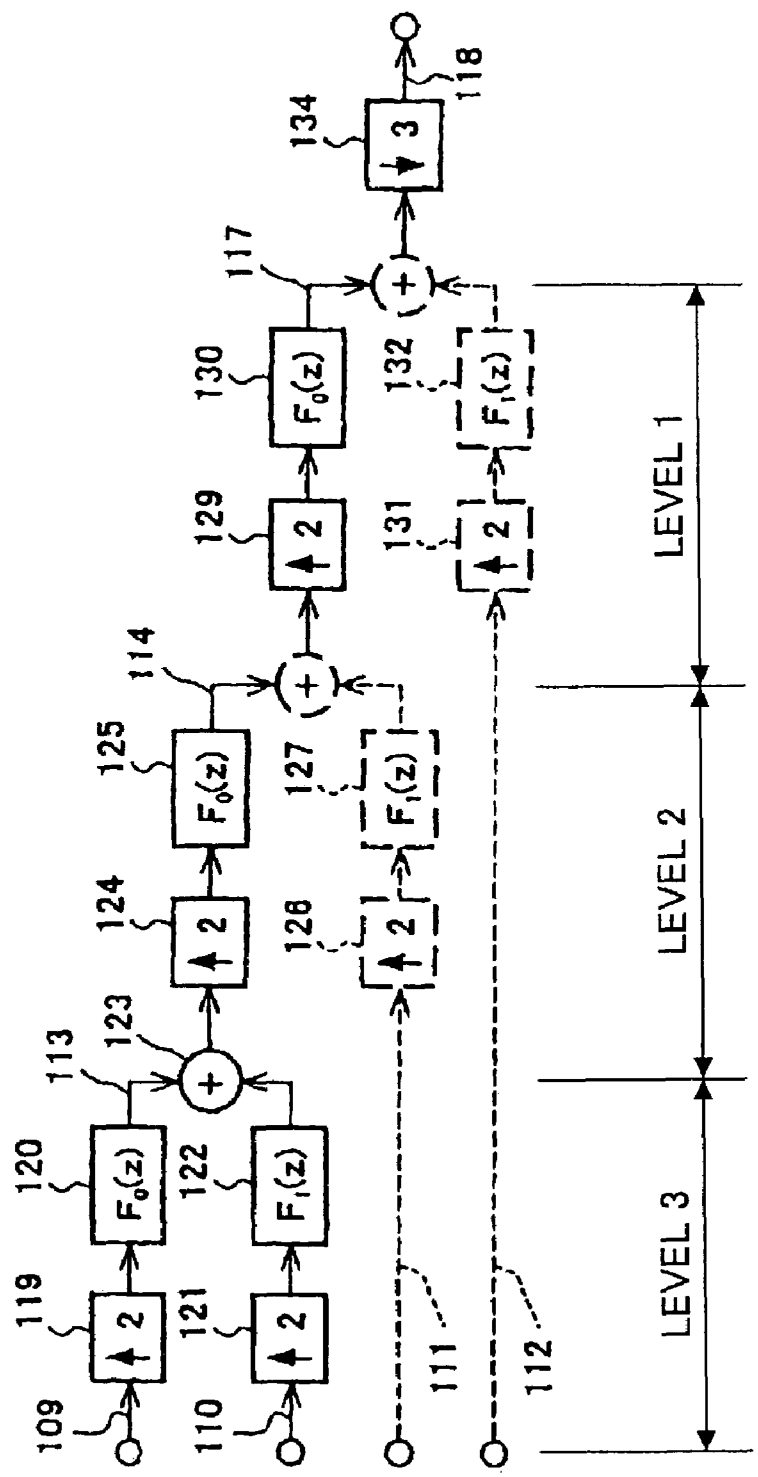
FIG. 1 is a diagram showing the configuration of an inverse wavelet transform unit of the prior art in the case of obtaining a 1/3-resolution of an original image.

An image data generator and an image data generating method in which the above-described disadvantages are eliminated is disclosed.

Focusing on the fact that a wavelet coefficient inherently corresponds to its pixel position, one embodiment of the present invention provides an image data generator and an image data generating method that can generate decoded image data of a desired resolution, or desired reduced size image data, with a smaller amount of processing by performing inverse wavelet transform only on the coefficients that are related to pixels desired to be finally obtained, using the correspondence between the wavelet coefficients and their pixel positions. As mentioned above, a reduced size image can be the one whose aspect ratio is not equal to that of the original image.

Another embodiment of the present invention provides an image data generator and an image data generating method that can generate decoded image data of a desired resolution, or desired reduced size image data, balancing a decoding rate and decoding image quality, by timely performing partial decoding on coded wavelet coefficients.

Another embodiment of the present invention comprises image data generator for generating data on a reduced size image of an original image, where the image data generator includes an inverse wavelet transform unit to perform an inverse wavelet transform on wavelet coefficients and a coefficient selecting unit to select wavelet coefficients in a sub-band, wavelet coefficients to be subjected to the inverse wavelet transform, wherein the inverse wavelet transform unit performs the inverse wavelet transform only on the wavelet coefficients selected in the coefficient selecting unit with respect to the wavelet coefficients in the sub-band.

Another embodiment of the present invention comprises an image data generator for generating data on a reduced size image of an original image, where the image data generator includes an inverse wavelet transform unit to perform an inverse wavelet transform on wavelet coefficients of a plurality of components, the inverse wavelet transform unit to perform the inverse wavelet transform independently on each of the components with at least one of the components having a resolution set, which is different from a resolution set for the rest of the components.

Another embodiment of the present invention comprises an image data generator for generating data on a reduced size image of an original image, where the image data generator includes a coefficient decoding unit to decode codes into which wavelet coefficients are coded and a code omitting unit to omit codes not to be decoded of codes in a sub-band, where the coefficient decoding unit decodes codes other than those omitted by the code omitting unit.

According to the above-described image data generators of the present invention, the wavelet coefficients are subjected to inverse wavelet transform, and in the case of generating a reduced size image of an original image, the wavelet coefficients in the same sub-band are selectively subjected to an inverse wavelet transform. Therefore, the reduced size image can be generated with a reduced amount of calculation.

Further, the wavelet coefficients in the same sub-band are partially decoded in performing an inverse wavelet transform on the wavelet coefficients and generating a reduced size image of an original image. Therefore, the reduced size image can be generated with decoding speed and decoded image quality being balanced with each other.

In another embodiment of the present invention, a method of generating data on a reduced size image of an original image is disclosed, where the method includes: (a) selecting, of wavelet coefficients in a sub-band, wavelet coefficients to be subjected to an inverse wavelet transform; and (b) performing the inverse wavelet transform on wavelet coefficients, where performing the inverse wavelet transform includes performing the inverse wavelet transform only on the wavelet coefficients selected to be subjected to the inverse wavelet transform with respect to the wavelet coefficients in the sub-band.

Another embodiment of the present invention comprises a method of generating data on a reduced size image of an original image, where the method includes performing an inverse wavelet transform on wavelet coefficients of a plurality of components, wherein the inverse wavelet transform is performed independently on each of the components with at least one of the components having a resolution set which is different from a resolution set for the rest of the components. Another embodiment of the present invention includes a method of generating data on a reduced size image of an original image, where the method comprises: (a) decoding codes into which wavelet coefficients are coded; (b) omitting codes not to be decoded from codes in a sub-band; and (c) decoding codes other than those omitted as not to be decoded.

Another embodiment of the present invention comprises a computer-readable recording medium storing a program for causing a computer to execute a method of generating data on a reduced size image of an original image, where the method includes: (a) selecting, of wavelet coefficients in a sub-band, wavelet coefficients to be subjected to an inverse wavelet transform; and (b) performing the inverse wavelet transform on wavelet coefficients, where performing the inverse wavelet transform includes performing the inverse wavelet transform only on the wavelet coefficients selected to be subjected to the inverse wavelet transform with respect to the wavelet coefficients in the sub-band.

Another of the present invention comprises a computer-readable recording medium storing a program for causing a computer to execute a method of generating data on a reduced size image of an original image, where the method includes performing an inverse wavelet transform on wavelet coefficients of a plurality of components, wherein the inverse wavelet transform is performed independently on each of the components with at least one of the components having a resolution set therefor, the resolution being set different from a resolution set for the rest of the components. Another embodiment of the present invention comprises a computer-readable recording medium storing a program for causing a computer to execute a method of generating data on a reduced size image of an original image, where the method includes: (a) decoding codes into which wavelet coefficients are coded; (b) omitting codes not to be decoded of codes in a sub-band; and (c) decoding codes other than those omitted codes.

A description will now be given, with reference to the accompanying drawings, of embodiments of the present invention.

First, a description will be given, with respect to the present invention, of the reason a decoded image of a desired resolution can be generated with a reduced amount of processing by performing an inverse wavelet transform only on the coefficients that relate to pixels desired to be finally obtained, focusing on the correspondence between wavelet coefficients and their pixel positions.

In the following description, a vertical direction refers to upward and downward directions and a horizontal direction refers to rightward and leftward directions in the accompanying drawings.

FIGS. 2 through 5 are diagrams for illustrating a process of performing wavelet transform called a 5×3 transform employed in JPEG 2000 two-dimensionally (in the vertical and horizontal directions) on a 16×16 monochrome image. FIG. 2 is a diagram showing an original image and a coordinate system therefor. FIG. 3 is a diagram showing an array of coefficients after filtering in the vertical direction. FIG. 4 is a diagram showing an array of coefficients after filtering in the horizontal direction. FIG. 5 is a diagram showing an array of coefficients after rearrangement. JPEG 2000 provides two types of wavelet transform, that is, 5×3 wavelet transform and 9×7 wavelet transform. In the following description, only the 5×3 wavelet transform is given as an example of wavelet transform. The present invention, however, is also applicable to other wavelet transforms including the 9×7 wavelet transform.

As shown in FIG. 2, an X-Y coordinate plane is formed on the image with the horizontal direction being the X-axis, the vertical direction being the Y-axis, and the uppermost leftmost point being the origin. The pixel value of a pixel having a Y-coordinate value y for an X-coordinate value x is expressed as P(y) ($0 \leqq y \leqq 15$). In JPEG 2000, first, with respect to each X-coordinate value x, high-pass filtering is performed vertically (in the positive direction of the Y-axis) on each pixel having an odd Y-coordinate value y (y=2i+1) using its adjacent pixels, so that a coefficient C(2i+1) is obtained. Next, low-pass filtering is performed on each pixel having an even Y-coordinate value y (y=2i) using its adjacent coefficients, so that a coefficient C(2i) is obtained. The high-pass filtering and the low-pass filtering are given by the following equations (1) and (2), respectively:

$$C(2i+1)=P(2i+1)-\lfloor (P(2i)+P(2i+2))/2 \rfloor \quad (1)$$

$$C(2i)=P(2i)+\lfloor (C(2i-1)+C(2i+1)+2)/4 \rfloor \quad (2)$$

where the symbol $\lfloor x \rfloor$ represents a floor function of x that replaces a real number x with the largest of all the integers smaller than or equal to x. In the edge units of the image, a pixel in the center may lack an adjacent pixel. In this case, an appropriate pixel value is supplemented in accordance with a predetermined rule, which is irrelevant to the essence of the present invention so that a description thereof will be omitted.

If, for the purpose of simplification, the coefficients obtained by high-pass filtering are expressed as H, and the coefficients obtained by low-pass filtering are expressed as L, then a coefficient array 1 of FIG. 2 is converted to a coefficient array 2 of H and L coefficients as shown in FIG. 3 by the above-described vertical conversion.

Next, high-pass filtering is performed horizontally (in the positive direction of the X-axis) on each coefficient of an odd X-coordinate value x (x=2i+1) using its adjacent coefficients in the coefficient array 2 of FIG. 3, and then low-pass filtering is performed on each coefficient of an even X-coordinate value x (x=2i) using its adjacent coefficients. This process is performed on each Y-coordinate value y. In this case, P(2i), P(2i+1), . . . in the above-described equations (1) and (2) are understood to mean their corresponding coefficients.

If, for the purpose of simplification, the coefficients obtained by performing low-pass filtering on the above-described coefficients L using its adjacent coefficients are expressed as LL, the coefficients obtained by performing high-pass filtering on the above-described coefficients L using its adjacent coefficients are expressed as HL, the coefficients obtained by performing low-pass filtering on the above-described coefficients H using its adjacent coefficients are expressed as LH, and the coefficients obtained by performing high-pass filtering on the above-described coefficients H using its adjacent coefficients are expressed as HH, then the coefficient array 2 of FIG. 3 is converted to a coefficient array 3 of FIG. 4. For purposes of this disclosure, a group of coefficients assigned the same symbol (LL, for instance) is called a sub-band, and the image of FIG. 4 is composed of four sub-bands.

Thus, one wavelet transform operation (one decomposition) is completed. At this point, only the LL coefficients are collected. That is, as a coefficient array 4 of FIG. 5, the coefficients are collected according to the sub-bands (LL sub-band $\mathbf{4}_1$, HL sub-band $\mathbf{4}_2$, LH sub-band $\mathbf{4}_3$, and HH sub-band $\mathbf{4}_4$), and only the LL sub-band $\mathbf{4}_1$ is extracted. In so doing, a half-resolution "image" of the original image is obtained. Such grouping by the sub-band is referred to as deinterleaving, while the coefficients arranged in the state of FIG. 4 are described as "interleaved." The above-described prior art employs the expression of "scanned and rearranged" to describe the same. The second wavelet transform operation may consider the LL sub-band $\mathbf{4}_1$ as an original image and perform the same conversion as described above. In this case, when the coefficients are rearranged, a typical coefficient array 5 (of LL sub-band $\mathbf{5}_1$, HL sub-band $\mathbf{5}_2$, LH sub-band $\mathbf{5}_3$, HH sub-band $\mathbf{5}_4$, HL sub-band $\mathbf{4}_2$, LH sub-band $\mathbf{4}_3$, and HH sub-band $\mathbf{4}_4$) shown in FIG. 6 is obtained. In the case of FIG. 6, there exist seven types of sub-bands from 2LL to 1HH in total. In FIGS. 5 and 6, the prefix of 1 or 2 applied to the coefficients indicates the number of wavelet transform operations by which the coefficients are obtained. This number is referred to as a decomposition level. The levels in FIG. 1 refer to the decomposition levels. A sub-band of a higher decomposition level has a lower resolution.

In the above description, in the case of performing a wavelet transform only one-dimensionally, the wavelet transform may be performed in either a horizontal or a vertical direction.

On the other hand, inverse wavelet transform is performed by first performing inverse low-pass filtering horizontally on each coefficient of an even X-coordinate value x (x=2i+1) using its adjacent coefficients and then performing inverse high-pass filtering on each coefficient of an odd X-coordinate value x (x=2i) using its adjacent results of inverse low-pass filtering in the interleaved coefficient array 3 shown in FIG. 4. This process is performed on each Y-coordinate value y. The inverse low-pass filtering and the inverse high-pass filtering are given by the following equations (3) and (4), respectively:

$$P(2i)=C(2i)-\lfloor(C(2i-1)+C(2i+1)+2)/4\rfloor \quad (3)$$

$$P(2i+1)=C(2i+1)+\lfloor(P(2i)+P(2i+2))/4\rfloor \quad (4)$$

As in the above-described case of a wavelet transform, in the edge units of the image, a pixel in the center may lack an adjacent pixel. In this case, an appropriate pixel value is supplemented in accordance with a predetermined rule, which is irrelevant to the essence of the present invention so that a description thereof will be omitted.

In this manner, the coefficient array 3 of FIG. 4 is converted to the coefficient array 2; that is, the coefficient array 3 is inversely converted. Likewise, successively thereafter, inverse low-pass filtering is performed vertically on each coefficient of an even Y-coordinate value y (y=2i) using its adjacent coefficients, and then, inverse high-pass filtering is performed on each coefficient of an odd Y-coordinate value (y=2i+1) using its adjacent results of inverse low-pass filtering. This process is performed on each X-coordinate value x. In so doing, one inverse wavelet transform operation is completed, so that the coefficient array 2 of FIG. 3 is returned to the coefficient array 1 of the image of FIG. 2. That is, the coefficient array 1 of the original image is restructured. When a plurality of wavelet transform operations are performed, the same inverse wavelet transform operation may be repeated using the HL and other coefficients, considering the coefficient array 1 of FIG. 2 as the LL sub-band. An exemplary description of the way each sub-band is generated and restructured by wavelet transform and inverse wavelet transform will be given later (see FIG. 10).

At this point, it can be understood that the result of inverse low-pass filtering is obtained from three coefficients including a coefficient from the filtering center (that is, a coefficient desired to be subjected to filtering), and it can also be understood that the result of inverse high-pass filtering is obtained from a coefficient from the filtering center and the two adjacent results of inverse low-pass filtering. The two results of inverse low-pass filtering are calculated from five coefficients including the coefficient from the filtering center. Therefore, the result of inverse high-pass filtering is obtained from five coefficients. As is apparent from the above-described understanding, in order to obtain one pixel, it is sufficient to perform an inverse wavelet transform centered on the target pixel, and it is not necessary to perform inverse wavelet transform on pixels irrelevant to the inverse wavelet transform on the target pixel. Accordingly, by performing an inverse wavelet transform using only those required to finally obtain a desired pixel of all of the coefficients in the same sub-band, a decoded image of a desired resolution can be generated with a reduced amount of processing without obtaining pixels to be subtracted.

Figure 7:
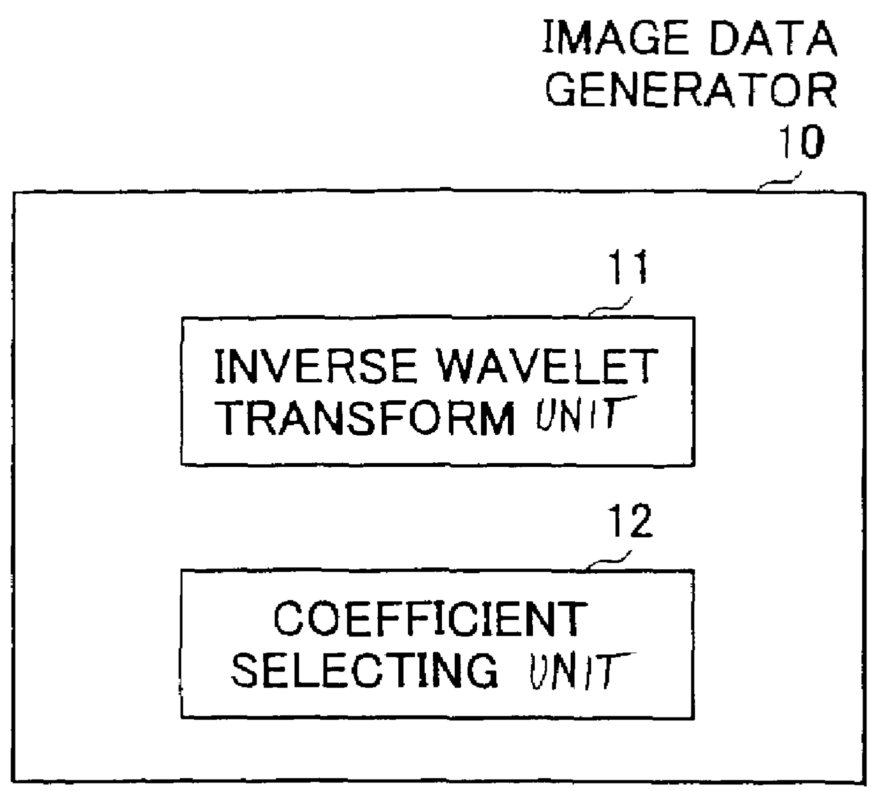
FIG. 7 is a block diagram showing an image data generator according to a first embodiment of the present invention.

FIG. 7 is a block diagram showing an image data generator 10 according to a first embodiment of the present invention.

The image data generator 10 of this embodiment includes an inverse wavelet transform unit 11 and a coefficient selecting unit 12. The inverse wavelet transform unit 11 performs inverse wavelet transform on wavelet coefficients obtained by performing wavelet transform on an original image one or a plurality of times, so that the image data generator 10 generates data on a reduced size image of the original image. The original image includes an image obtained after performing conversion such as color conversion on the original image.

The coefficient selecting unit 12 selects those to be subjected to inverse wavelet transform of the coefficients in the same sub-band. In other words, all of the coefficients before selection can also be defined as all of the coefficients in one LL sub-band, which may be data on the original image. That is, the LL sub-band may be four sub-bands having a decomposition level higher than that of the LL sub-band by one. The selecting operation in this embodiment is different from the conventional technique of, for instance, selecting 2LL, 2HL, 2LH, and 2HH sub-bands but not selecting (that is, not performing inverse wavelet transform on) 1HL, 1LH, and 1HH sub-bands. Practically, as will be later described, the selecting operation can be performed more simply if the coefficients before selection are interleaved.

The inverse wavelet transform unit 11 performs inverse wavelet transform only on the coefficients selected by the coefficient selecting unit 12 from the above-described wavelet coefficients in the same sub-band. In this manner, data on the reduced size image is generated. For instance, in the case of performing an inverse wavelet transform on the coefficients selected from the coefficients in the 2LL sub-band (that is, 3LL, 3HL, 3LH, and 3HH sub-bands) using the selective inverse wavelet transform of one embodiment of the present invention, the wavelet coefficients relating to other operations including an operation preceding the inverse wavelet transform, such as coefficients in the 3LL sub-band (composed of 4LL, 4HL, 4LH, and 4HH sub-bands and not processed through the coefficient selecting unit 12) to be obtained as required in the preceding operation may be inversely converted by the inverse wavelet transform unit 11.

As described above, it may also be considered that the image data generator 10 according to this embodiment includes a unit to selectively subject coefficients in the same or a single sub-band to inverse wavelet transform. Here, the sub-band may be the entire original image.

In the specification, coefficients to be inversely converted (or subjected to inverse wavelet transform) by the inverse wavelet transform unit 11 are referred to as wavelet coefficients or simply as coefficients. Coefficients to be again inversely converted after being subjected to an inverse wavelet transform are also referred to as wavelet coefficients or simply as coefficients. In the case of two-dimensional inverse wavelet transform, coefficients to be subjected to an inverse wavelet transform in both directions and coefficients to be subjected to an inverse wavelet transform in one direction are also referred to as wavelet coefficients or simply as coefficients.

FIG. 8A is a diagram showing a 16×16 image generated by performing inverse wavelet transform on all of the coefficients obtained after performing 5×3 wavelet transform on the original image of FIG. 2.

For purposes of this disclosure, the size of the original image is defined as 16×16, and a 1/3 scale image, or an image reduced to one third of the original image vertically and horizontally in size, is generated from the original image as previously described in the first prior art and the second prior art. For purposes of this disclosure, the 1/3 scale image is a 5×5 image since 16 is not divisible by three. FIG. 8A shows a coefficient array (equal to the coefficient array 1 of FIG. 2) of the 16×16 image generated by subjecting all of the coefficients to an inverse wavelet transform first horizontally and then vertically. In order to generate a 5×5 image, an inverse wavelet transform may be performed centered only on the coefficients of the underlined pixels of all of the coefficients in FIG. 8A. This embodiment employs a 5×3 transform, so that the result of vertical inverse high-pass filtering can be obtained from a coefficient of the filtering center and its two adjacent results of inverse low-pass filtering. Therefore, finally, it is sufficient to (vertically) perform inverse wavelet transform only for the 45 shaded pixels in FIG. 8A. Pixels to be obtained in the case of employing a 5×3 transform and performing three-to-one scaling as in this embodiment are the 25 underlined pixels, so that at the preceding stage, that is, at the stage after performing horizontal filtering (before vertical filtering) at the time of an inverse wavelet transform operation, it is sufficient that only the 45 shaded pixels have been obtained. This means that it is sufficient to select pixels equivalent to less than 18% of the entire image and obtain the coefficients of the 25 pixels by vertical filtering at the time of an inverse wavelet transform operation. The 45 pixels shown shaded herein do not have the coefficients shown in FIG. 8A before the vertical inverse wavelet transform. The coefficient values in the pixel positions illustrated in FIG. 8A are obtained only after performing an inverse wavelet transform horizontally and vertically. According to this embodiment, a reduced size image can be generated with a reduced amount of calculation.

Additionally, in order to generate a 5×4 image from the 16×16 image, an inverse wavelet transform may be performed centered only on the coefficients of the underlined pixels of all of the coefficients in FIG. 8B. This embodiment employs a 5×3 transform, so that the result of vertical inverse high-pass filtering can be obtained from a coefficient from the filtering center and its two adjacent results of inverse low-pass filtering. Therefore, finally, it is sufficient to (vertically) perform inverse wavelet transform only for the 20 shaded pixels in FIG. 8B. This means that it is sufficient to select pixels equivalent to less than 8% of the entire image and obtain the coefficients of the 20 pixels by vertical filtering at the time of an inverse wavelet transform operation.

The coefficient selecting unit 12 may include a unit to select at least all of the wavelet coefficients relating to the pixels of a reduced size image to be generated (or desired to be finally obtained). Further, the coefficient selecting unit 12 may include a unit to select only the wavelet coefficients relating to the pixels of a reduced size image to be generated (or desired to be finally obtained). That is, the inverse wavelet transform may be performed only on the wavelet coefficients relating to the pixels of a reduced size image desired to be obtained. For purposes of this disclosure, the term "relating" refers to a relationship originating from the nature of wavelet transforms, such as a relationship derived from the above-described equations (1) through (4) (the shaded pixels to the underlined pixels in FIG. 8A). According to this configuration, a reduced size image can be generated with the smallest amount of calculation.

It should be noted that an image obtained as a result of performing an inverse wavelet transform only on the coefficients relating to the pixels of a reduced size image desired to be obtained is mathematically equivalent to a reduced size image generated by thinning out or reducing an image obtained by performing an inverse wavelet transform on all of the wavelet coefficients. In the case of thinning out the wavelet coefficients themselves and performing an inverse wavelet transform on the remaining wavelet coefficients, a reduced size image of the same size can be obtained. In this case, however, the inverse wavelet transform is performed using coefficients different from those obtained in the "forward" wavelet transform. Therefore, the obtained reduced size image has no mathematical grounds.

On the other hand, according to one embodiment of the present invention, a totally equivalent image having mathematical grounds can be obtained.

As previously described, in order to obtain the underlined 25 pixels of FIG. 8A, in addition to the 25 pixels, the shaded pixels surrounding the 25 pixels have also been obtained as the coefficients in the state where horizontal filtering is completed (before vertical filtering) at the time of an inverse wavelet transform operation. If it is difficult to determine whether a pixel corresponds to the "surrounding pixel," all the pixels in each vertical straight line (column) including an underlined pixel may be selected.

Accordingly, all of the coefficients positioned on a straight line extending in one direction (in which the inverse wavelet transform is performed in an inverse wavelet transform operation) where the straight line includes a coefficient corresponding to a pixel position of a reduced size image desired to be generated may be obtained. The coefficient selecting unit 12 may include a unit to select, of the above-described wavelet coefficients in the same sub-band (in the interleaved state), all of the coefficients positioned on a straight line extending in one direction (in the vertical direction in the above-described case) in which an inverse wavelet transform is performed, the straight line including a wavelet coefficient in a position of a pixel of a reduced size image desired to be generated. By this selecting operation, all of these selected wavelet coefficients are subjected to an inverse wavelet transform in the inverse wavelet transform unit 11, and as a result of this inverse wavelet transform, all of the coefficients positioned on each of the above-described straight lines including the coefficients of the pixel positions of the reduced size image desired to be generated. The pixels composed of the obtained coefficients are thinned out as appropriate as described above, so that the desired reduced size image is obtained. According to this configuration, the actual application can be simplified in generating a reduced size image.

FIG. 9A is a diagram showing a 16×16 image generated by performing horizontal filtering, at the time of an inverse wavelet transform operation, on all of the coefficients obtained after performing 5×3 wavelet transform on the original image of FIG. 1. A coefficient array 7 of FIG. 9A corresponds to the coefficient array 2 of FIG. 3. FIG. 9B is a diagram showing the 16×16 image of FIG. 9A in the case of obtaining its 5×4 image.

In order to obtain the coefficients of the shaded pixel positions of FIG. 8A, the pixels of the shaded units of FIG. 9A are selected as the coefficients in the state before horizontal filtering is performed at the time of an inverse wavelet transform operation. The 126 shaded pixels shown in FIG. 9A do not have the coefficients shown therein, which are obtained only after horizontal filtering at the time of an inverse wavelet transform operation. As in the above-described case, the actual application may also be simplified without making a determination as to the "surrounding pixels" in the case of FIG. 9A. Likewise, in order to obtain the underlined 20 pixels of FIG. 8B, in addition to the 20 pixels, the shaded pixels surrounding the 20 pixels in FIG. 9B are also obtained as the coefficients in the state where horizontal filtering is completed (before vertical filtering) at the time of an inverse wavelet transform operation. If it is difficult to determine whether a pixel corresponds to the "surrounding pixel," all the pixels in each vertical straight line (column) including an underlined pixel in FIG. 9B may be selected to simplify the implementation.

Accordingly, an inverse wavelet transform may be performed two-dimensionally, and all of the coefficients positioned on straight lines perpendicular to the direction in which the first inverse wavelet transform in an inverse wavelet transform operation is performed may be obtained, where the straight lines include the coefficients corresponding to the positions of the pixels of the reduced size image and the positions relating to the positions of the pixels. The coefficient selecting unit 12 of this embodiment may include a unit that, at the time of selecting coefficients for inverse wavelet transform performed in one direction (in the horizontal direction in the above-described case) in which the inverse wavelet transform is performed first in an inverse wavelet transform operation, selects, of the above-described wavelet coefficients in the same sub-band (in the interleaved state), all of the coefficients on straight lines perpendicular to the direction in which the inverse wavelet transform is performed first, where the straight lines include the coefficients corresponding to the positions of the pixels of the reduced size image to be generated and the positions of pixels necessary for obtaining the positions of the pixels of the reduced size image. As a result of employing this unit of the coefficient selecting unit 12, the selected coefficients are subjected to an inverse wavelet transform in the direction in which the inverse wavelet transform is performed first, and are subjected to an inverse wavelet transform in the other direction and thinned out as required. In so doing, the coefficients of the pixel positions of the reduced size image desired to be generated are obtained. According to this configuration, the actual application can be simplified in generating a reduced size image.

Figure 10:
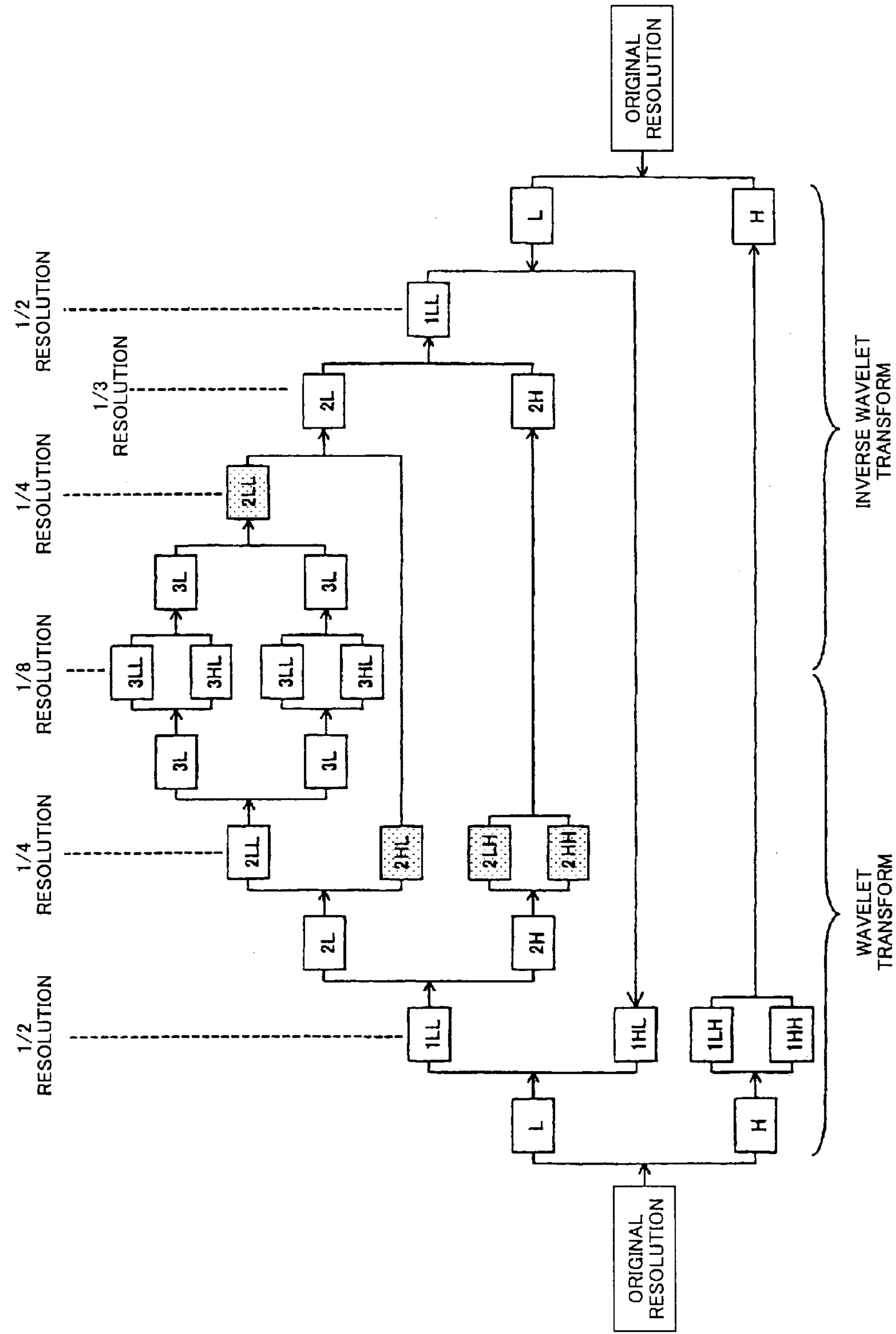
FIG. 10 is a diagram showing a configuration for generating a 1/3-resolution image along the flow of wavelet transform and inverse wavelet transform according to one embodiment of the present invention.

In FIG. 1 of the second prior art, an image having the same resolution as the original image is first generated and then reduced to one third of the original image. In principle, however, it takes less time to obtain a one-third image based on the 1/2-resolution image of the original image. FIG. 10 is a diagram showing a configuration for generating a 1/3-resolution image along the flow of a wavelet transform and an inverse wavelet transform according to one embodiment of the present invention. In the case of generating a 1/3-resolution image, the LL coefficients of a resolution lower than a desired resolution, that is, the 2LL coefficients of a one-fourth resolution, may be obtained by performing an inverse wavelet transform. Then, the obtained 2LL coefficients are selectively subjected to inverse wavelet transform using the coefficients of the 2HL, 2LH, and 2HH sub-bands, so that a 1/3-resolution image can be finally obtained.

Therefore, according to one embodiment of the present invention, an inverse wavelet transform may be performed on all of the coefficients of up to the resolution closest to a desired resolution. That is, the coefficient selecting unit 12 of one embodiment of the present invention may include a unit that selects all of the wavelet coefficients in the sub-bands of the same decomposition level higher than that of the LL sub-band having the highest resolution below the resolution of a reduced size image to be obtained so that the LL sub-band is obtained by an inverse wavelet transform.

As shown in the shaded units of FIG. 8A, in the above-described 5×3 transform, the number of adjacent pixels to be obtained differs depending on whether an underlined pixel desired to be finally obtained is located in an odd or even position. As previously described, this results from the difference in tap length between the low-pass filter and the high-pass filter. In this case, therefore, by selecting pixels desired to be finally obtained so that the desired pixels are located in even positions as much as possible, the number of adjacent pixels to be obtained can be reduced, so that processing can be performed at high speed. In order to select pixels desired to be finally obtained so that the desired pixels are located in even positions, a vertex pixel of the pixels desired to be obtained, that is, the pixel of −3 in FIG. 8A, may be located in an even position. There is also an alternate method of not arranging the underlined pixels regularly in a grid-like manner.

Therefore, according to one embodiment of the present invention, the coefficients of pixels in such positions as to reduce the sum of the tap lengths of the filters may be selected. In FIG. 8A, in the case of selecting a position whose X-coordinate and Y-coordinate values are both even numbers, the tap length for the inverse wavelet transform per direction becomes Tlow, namely, a minimum length. On the other hand, in the case of selecting a position whose X-coordinate and Y-coordinate values are both odd numbers, the tap length for the inverse wavelet transform per direction becomes Thigh, namely, a maximum length. Accordingly, in order to reduce the amount of processing, it is effective to select a position so that the tap length for an inverse wavelet transform per direction becomes smaller than the average of the minimum and maximum values, that is, (Tlow+Thigh)/2. The high-pass filter and the low-pass filter may have different tap lengths for inverse wavelet transform, so that the sum of the tap lengths of the high-pass and low-pass filters that perform filtering centered on the coefficients corresponding to the pixel positions of a reduced size image to be generated of all of the above-described coefficients in the same sub-band (in the interleaved state) is smaller than d·n(Tlow+Thigh)/2, where d is the dimensional number of the inverse wavelet transform, n is the number of pixels of the reduced size image, Tlow is the tap length of the low-pass filter, and Thigh is the tap length of the high-pass filter. According to this configuration, processing can be performed at high speed in generating a reduced size image by the inverse wavelet transform.

In the case of performing inverse wavelet transform two-dimensionally, the operation of performing an inverse wavelet transform selectively on the coefficients in the same (or a single) sub-band, and the operation of causing the sum of the tap lengths of the high-pass and low-pass filters to be smaller than n(Tlow+Thigh), the high-pass and low-pass filters having different tap lengths for an inverse wavelet transform and performing filtering centered on the coefficients corresponding to the pixel positions of a reduced size image of all of the coefficients in the interleaved state may be provided. In the case of generating a reduced size image by performing the inverse wavelet transform two-dimensionally, processing can also be performed at high speed.

In the case of generating the 1/3-resolution reduced size image of an original image from wavelet coefficients divided into 3LL, 3HL, 3LH, 3HH, 2HL, 2LH, 2HH, 1HL, 1LH, and 1HH sub-bands, using the above-described configurations suitably, the following processes (a) through (c) may be performed as main procedures to which the selective inverse wavelet transform of one embodiment of the present invention is applied. In the case of performing an inverse wavelet transform on two-dimensional coefficients in the horizontal and vertical directions, it may be determined based on the direction in which the inverse wavelet transform is performed whether the selective inverse wavelet transform of one embodiment of the present invention is employed.

(a) The conventional inverse wavelet transform, which does not employ the selective inverse wavelet transform of one embodiment of the present invention, that is, which selects all of the coefficients, is performed on the coefficients of the 2LL sub-band, that is, the coefficients of the four sub-bands of decomposition level 3 (3LL, 3HL, 3LH, and 3HH). By doing so, the 2LL sub-band is obtained. Then, the coefficients of the 1LL sub-band, that is, the coefficients of the four sub-bands of decomposition level 2 (2LL, 2HL, 2LH, and 2HH) in the interleaved state, are selectively subjected to the inverse wavelet transform, so that a new LL sub-band is extracted. In this manner, a reduced size image is obtained.

(b) Coefficients are selected, in consideration of two inverse wavelet transform operations, from the coefficients of the 2LL sub-band, that is, the coefficients of the four sub-bands of decomposition level 3 (3LL, 3HL, 3LH, and 3HH), in the interleaved state, and the selected coefficients are subjected to an inverse wavelet transform twice using the coefficients of the 2HL, 2LH, and 2HH sub-bands. In this manner, a reduced size image is obtained.

(c) The selection of coefficients in each of the processes (a) and (b) is simplified, and the unnecessary coefficients after the inverse wavelet transform operations are subtracted so that a reduced size image is obtained.

In the case of compressing an original image, which is, for instance, a color image formed of three components of R, G, and B, normally, in order to increase the compression rate, color conversion is performed on the R, G, and B components so that the R, G, and B components are converted to three new components of one luminance and two color differences, and a wavelet transform is performed on each of the new components obtained after the color conversion.

A color conversion called RCT (Reversible Component Transform), which is one of color conversion methods employed in JPEG 2000, is given by the following:

$$\text{Luminance } Y = \lfloor (R+2G+B)/4 \rfloor \tag{5}$$

$$\text{Color difference } Cr = R - G$$

$$\text{Color difference } Cb = B - G$$

The inverse conversion of RCT is given by the following:

$$R = G + Cr \tag{6}$$

$$G = Y - \lfloor (Cr+Cb)/4 \rfloor$$

$$B = Cb + G$$

Figure 11:
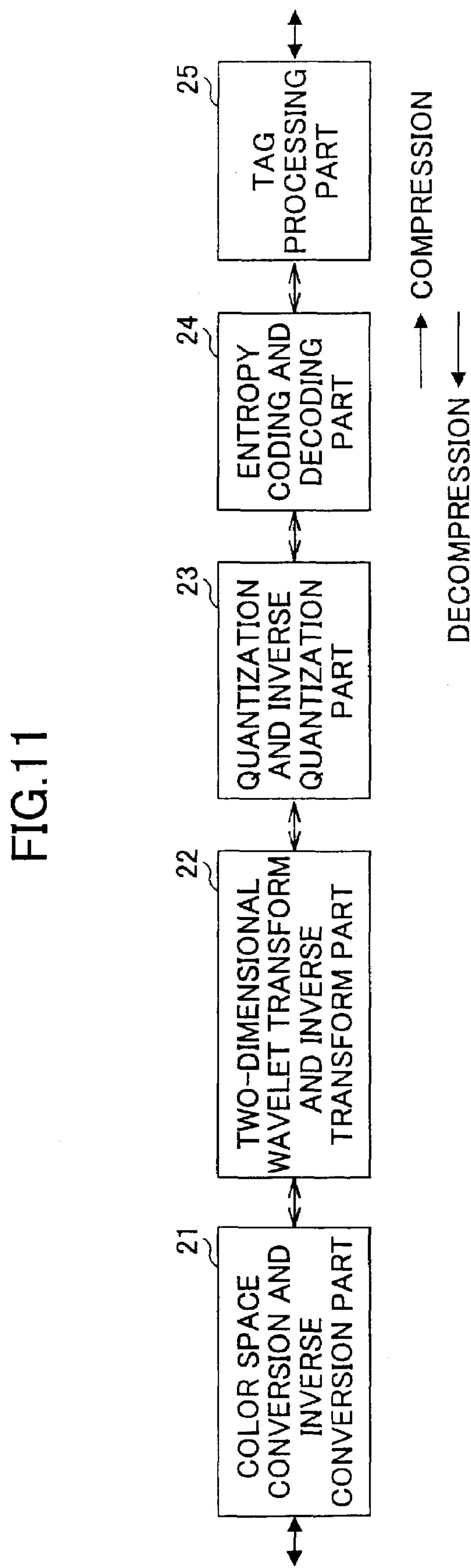
FIG. 11 is a block diagram for illustrating an image data generator according to a second embodiment of the present invention.

FIG. 11 is a block diagram for illustrating an image data generator according to a second embodiment of the present invention and for illustrating a DWT (Discrete Wavelet Transform) image compression and decompression algorithm in JPEG 2000.

JPEG 2000 is an image compression and decompression method standardized internationally in 2001 as a successor to JPEG. The image data generator of FIG. 11 includes a two-dimensional wavelet transform and inverse transform unit 22, a quantization and inverse quantization unit 23, and an entropy coding and decoding unit 24. Of these units, the two-dimensional wavelet transform and inverse transform unit 22 relates to one embodiment of the present invention. In the specification, the two-dimensional wavelet transform and inverse transform unit 22 is described mainly as an inverse wavelet transform unit. The two-dimensional wavelet transform and inverse transform unit 22, the quantization and inverse quantization unit 23, and the entropy coding and decoding unit 24 are provided as a unit receive an input from and transmit an output to a color space conversion and inverse conversion unit 21 and a tag processing unit 25. Each of these units may have independent configurations for the forward (compression) and inverse (decompression) operations. Further, each of these units may perform processing component by component. At the time of performing decompression in the JPEG 2000 configuration of FIG. 11, the wavelet coefficients of each of the components obtained through entropy decoding and inverse quantization are subjected to an inverse wavelet transform. Thereafter, the wavelet coefficients are subjected to a color conversion so as to be returned to the R, G, and B pixel values.

When the effect of each component on image quality is considered, normally, the color-difference components are more quantized in the quantization process of FIG. 11 than the luminance component because, generally, luminance has a greater effect than color difference. By applying this technique to the generation of a reduced size image so that an inverse wavelet transform is performed with the color-difference components having a lower resolution than the luminance component and an inverse color conversion is performed with (virtual) interpolation being performed on the color-difference components, a reduced size image can be generated at high speed with the effect on image quality being controlled. Further, the color differences Cr and Cb do not affect image quality to exactly the same degree. For instance, experiments show that the color difference Cb has a smaller effect than the color difference Cr. Therefore, the color-difference components may have different resolutions.

Therefore, according to this embodiment, an apparatus for generating a reduced size image of an original image by performing an inverse wavelet transform on the wavelet coefficients of a plurality of components may include a unit that performs the inverse wavelet transform on the components to different resolutions so that the resolution differs between the components when the inverse wavelet transform is performed. That is, an inverse wavelet transform may be performed with a difference between the resolutions of the components. The image data generator of this embodiment may be an apparatus for generating data on a reduced size image of an original image, the apparatus including an inverse wavelet transform unit that performs an inverse wavelet transform on the wavelet components of a plurality of components. The inverse wavelet transform unit performs an inverse wavelet transform component by component with the resolution differing between at least one of the components and the rest of the components. According to this embodiment, a reduced size image having a plurality of components can be generated at high speed with a reduced amount of processing using the characteristic between the components.

Moreover, by applying the characteristics of this embodiment to the above-described first embodiment of the image data generator relating to the selective inverse wavelet transform, processing speed can be further increased and the actual application can be further simplified.

Further, with respect to each of the wavelet coefficient luminance component and the wavelet coefficient color-difference component of the above-described plural components, the coefficients of the LL sub-band having the highest resolution below the resolution of a reduced size image to be generated may be obtained. According to this configuration, a reduced size image formed of a plurality of components can be generated at higher speed with more simplicity.

Further, in the image data generator of this embodiment, the above-described components may be a luminance component and a color-difference component, and the luminance component is subjected to an inverse wavelet transform to a resolution higher than a resolution to which the color-difference component is subjected to an inverse wavelet transform. As a result, the color-difference component has a lower resolution. According to this configuration, a reduced size image formed of luminance and color-difference components can be generated at higher speed with a reduced amount of processing while the effect on image quality is controlled.

Further, according to this embodiment, the above-described components may include two color-difference components, and the two color-difference components may be subjected to an inverse wavelet transform to different resolutions. According to this configuration, a reduced size image formed of a plurality of components may be generated at higher speed by setting a lower resolution for one of the color-difference components than for the other one of the color-difference components, using the characteristic between the color-difference components.

Further, in this embodiment, the resolution of the color-difference components may be set to a half of the resolution of the luminance component. Generally, this resolution combination, which corresponds to sub-sampling color difference to one-fourth of luminance, provides a good balance between image quality and processing speed. According to this configuration, a reduced size image having a plurality of components can be generated with image quality and processing speed being in balance with each other.

The foregoing embodiments are described, focusing on the image data generators according to the present invention. Embodiments of the present invention can also be realized as an image data generating method including the processing operations performed in the image data generators; a program for causing a computer to function as any of the above-described image data generators or as each unit thereof or a program for causing a computer to execute the image data generating method (a computer program with the contents of the processing steps); and a computer-readable recording medium recording the program (a computer-readable information recording medium recording the contents of the processing steps). As is apparent from a later-described embodiment, this image data generating method of the present invention may be used to generate a reduced size image with a reduced amount of calculation and/or generate a reduced size image at high speed using the characteristics between components. Further, one embodiment of this program makes it possible to provide a system that can generate a reduced size image with a reduced amount of calculation, can generate a reduced size image simply with high image quality, and can generate a reduced size image at high speed using the characteristics between components by the operations corresponding to the above-described embodiments. Further, one embodiment of this recording medium makes it possible to provide a system that can generate a reduced size image with a reduced amount of calculation, can generate a reduced size image simply with high image quality, and can generate a reduced size image at high speed using the characteristics between components with the configurations corresponding to the above-described embodiments. It is apparent that this program and this recording medium can be realized easily based on the later-described embodiment in addition to the above-described embodiments.

A description will be given of a recording medium storing a program or data for realizing the image data generating function of the present invention according to a third embodiment of the present invention.

Specifically, the recording medium may be any of a CD-ROM, a magneto-optical disk, a DVD-ROM, a FD, a flash memory, and other various ROMs and RAMs. The recording medium is recorded with a program for causing a computer to execute the functions relating to the above-described embodiments according to the present invention so as to realize the image data generating function of the present invention. By distributing this recording medium, the above-described functions can be realized easily. Then, the image data generating function according to one embodiment, the present invention can be performed by loading the recording medium into an information processing apparatus such as a computer and causing the information processing apparatus to read out the program or by storing the program in a recording medium provided in an information processing apparatus and reading out the program as required.

An expatiation will be given of the third embodiment of the present invention.

Figure 12:
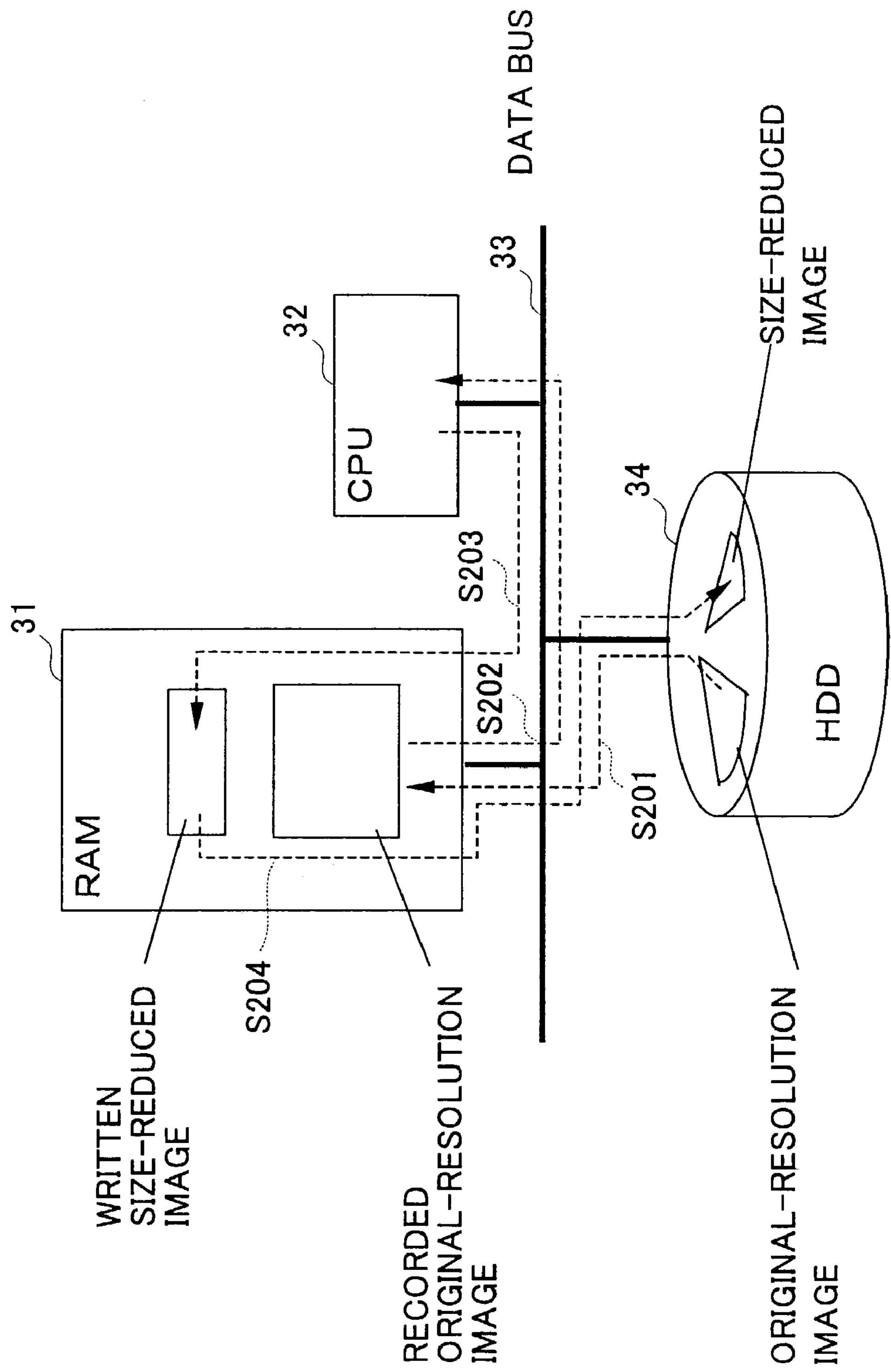
FIG. 12 is a block diagram showing an image data generator according to a third embodiment of the present invention.

FIG. 12 is a block diagram showing an image data generator according to the third embodiment of the present invention.

According to the image data generator of FIG. 12, a RAM 31, a CPU 32, and an HDD 34 are connected via a data bus 33. In one embodiment, a reduced size image is generated from a compressed image of an original resolution and stored in the HDD 34 using the following process.

In step S201, compressed image data of an original resolution recorded on the HDD 34 is read into the RAM 31 by a command transmitted from the CPU 32. Next, in step S202, the CPU 32 reads the compressed image data recorded in the RAM 31 only for an amount corresponding to a predetermined resolution, and obtains wavelet coefficients. The CPU 32 performs processing on the wavelet coefficients according to one embodiment of the present invention, thereby generating a reduced size image. In step S203, the CPU 32 writes the generated reduced size image to another region in the RAM 31. In step S204, the reduced size image is recorded on the HDD 34 by a command transmitted from the CPU 32.

Figure 13:
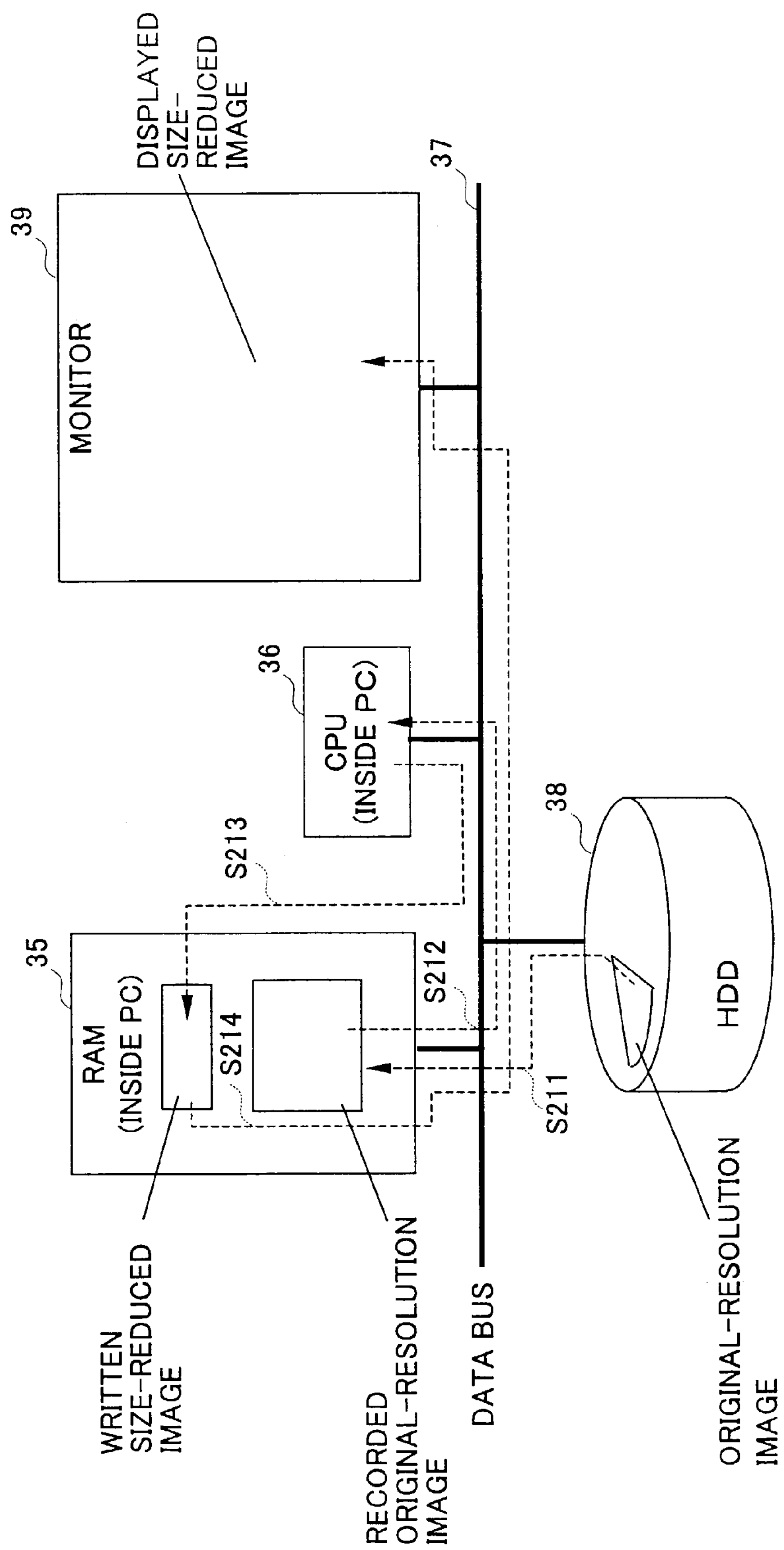
FIG. 13 is a block diagram showing another image data generator according to the third embodiment of the present invention.

FIG. 13 is a block diagram showing another image data generator according to the third embodiment of the present invention.

According to the image data generator of FIG. 13, a RAM 35 inside a personal computer (PC), a CPU 36 inside the PC, an HDD 38, and a monitor 39 such as a CRT or LCD monitor are connected via a data bus 39. By an instruction from a user, a reduced size image is generated at high speed from image data of an original resolution and displayed on the monitor 39.

In step S211, compressed image data of an original resolution recorded on the HDD 38 is read into the RAM 35 by a command transmitted from the CPU 36. Next, in step S212, the CPU 36 reads the compressed image data recorded on the RAM 35 only for an amount corresponding to a predetermined resolution, and obtains wavelet coefficients. Then, the CPU 36 performs processing on the wavelet coefficients according to one embodiment of the present invention, thereby generating a reduced size image. In step S213, the CPU 36 writes the generated reduced size image to another region in the RAM 35. In step S214, the reduced size image is transmitted to and displayed on the monitor 39 by a command transmitted from the CPU 36.

Figure 14:
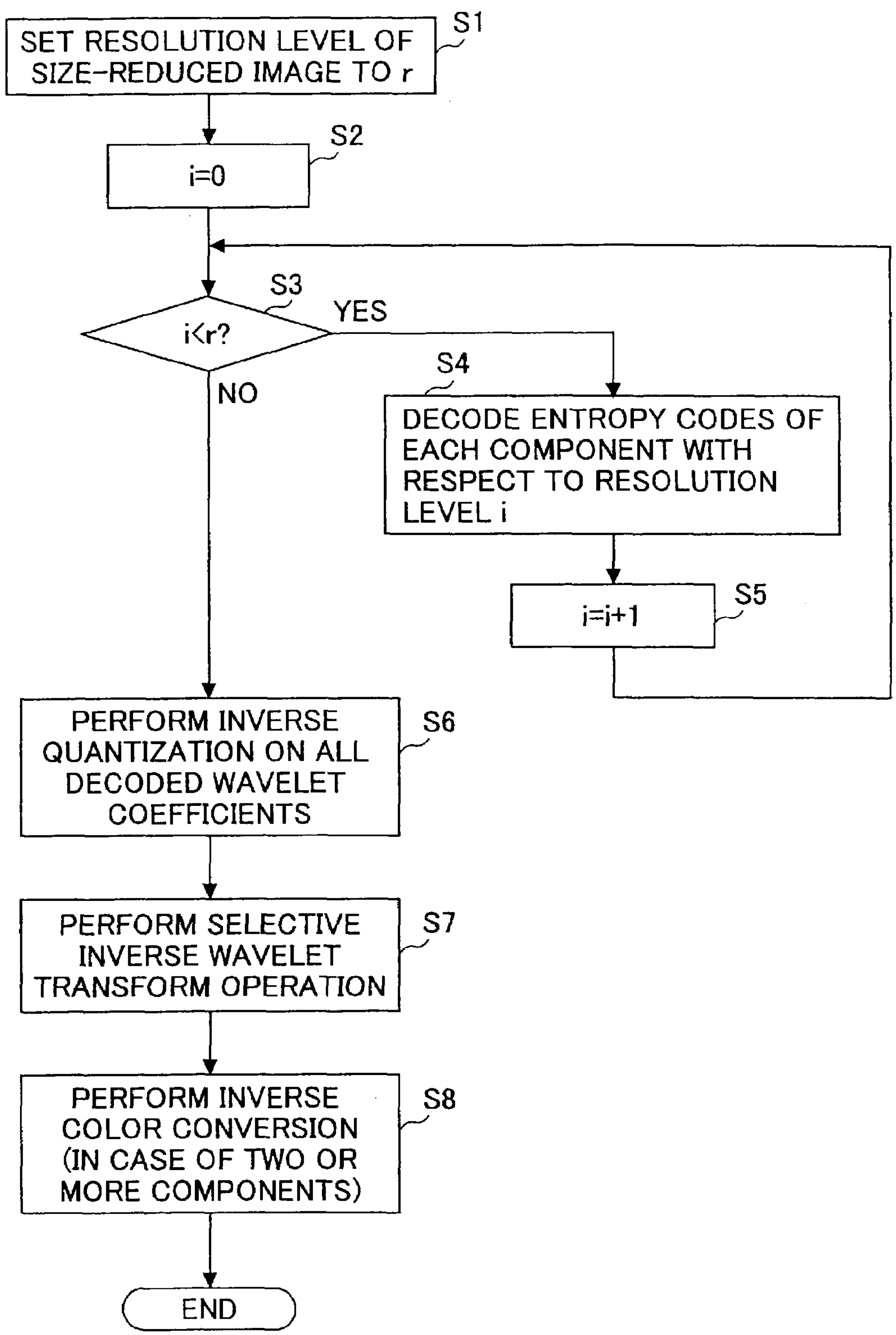
FIG. 14 is a flowchart for illustrating the basic flow of an operation of generating a reduced size image in an image data generator according to a fourth embodiment of the present invention.
Figure 16:
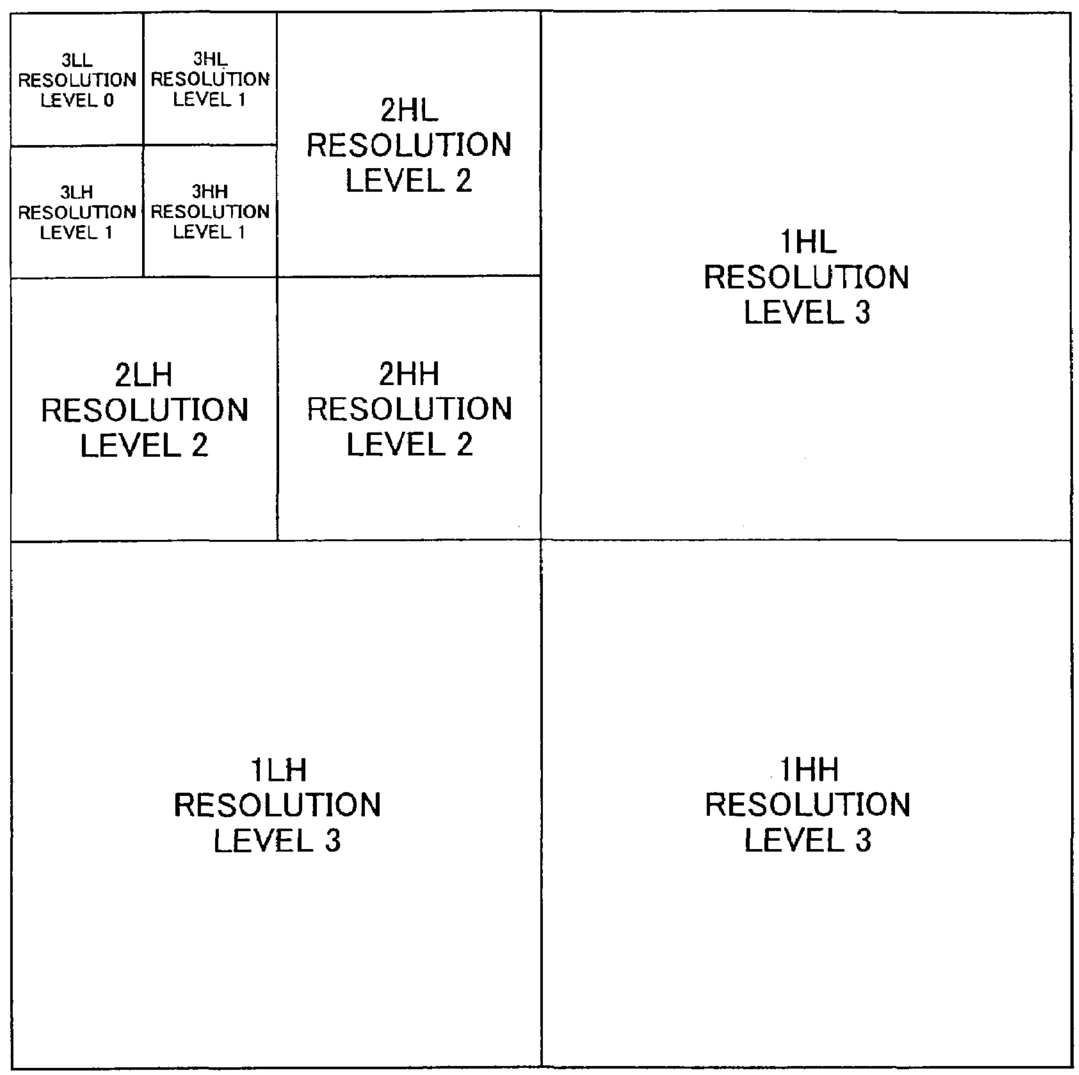
FIG. 16 is a diagram showing the relationship between decomposition level and resolution level according to the fourth embodiment of the present invention.

FIG. 14 is a flowchart for illustrating the basic flow of an operation of generating a reduced size image in an image data generator according to a fourth embodiment of the present invention. FIG. 15 is a diagram showing a code configuration according to the fourth embodiment of the present invention. FIG. 16 is a diagram showing the relationship between decomposition level and resolution level according to the fourth embodiment of the present invention.

A description will be given of the case where a reduced size image is generated based on an image defined by the even number of rows of pixels and the even number of columns of pixels, where the image is compressed in compliance with a JPEG-2000 format using the color conversion of the equations (5) and 5×3 wavelet transform in an image data generator having the above-described configuration according to one embodiment of the present invention.

In the operation of generating a reduced size data in this embodiment, first, in step S1, the resolution level of a reduced size image to be generated is set to (resolution level) r based on a resolution (1/k) specified by a user. It is preferable that the image data generator include a unit that allows the user to specify a desired resolution. Then, in step S2, (resolution level) i is set to zero. In steps S3 through S5, i is incremented until i reaches r. During this process, in step S4, the entropy codes of all components are decoded with respect to each resolution level i. The decoding of the entropy codes is the decoding of variable length codes, and an MQ-coder is employed for the decoding in JPEG 2000. Since the decoding of the entropy codes is irrelevant to the point of this embodiment, a description thereof will be omitted.

FIG. 15 shows the codes of the components arranged in the following order: component 0 (luminance), component 1 (color difference Cb), and component 2 (color difference Cr) of resolution 0 (minimum resolution), components 0, 1, and 2 of resolution 1, components 0, 1, and 2 of resolution 2, . . . . As is well known, in JPEG 2000, the codes of all components can be arranged in the order of resolutions as shown in FIG. 15. Therefore, it is possible to extract only the wavelet coefficients from the lowest resolution up to a desired resolution with ease (steps S1 through S5).

In this specification, the expression of a 1/3 "resolution" is frequently used, while in JPEG 2000, a quantity called "resolution level" is employed as a quantity similar to "resolution." The lowest resolution is 0, and the second lowest resolution is 1. FIG. 16 shows the relationship between decomposition level and resolution level. Each "LL" sub-band takes an exceptional value in this relationship. That is, the resolution level of 3LL is resolution level 0, the resolution level of 3HL, 3LH, and 3HH is resolution level 1, the resolution level of 2HL, 2LH, and 2HH is resolution level 2, and the resolution level of 1HL, 1LH, and 1HH is resolution level 3. Further, the resolution level of 2LL is resolution level 1, and the resolution level of 1LL is resolution level 2.

The ratio of the resolution of revolution level r to the resolution of an original image depends on the maximum value of the decomposition level. If the maximum value of the decomposition level is d, the resolution of the wavelet coefficients (sub-band) of resolution level r (r>0) with respect to the original image is $1/2^{(d-r+1)}$. Therefore, the value of r that should be set in step S1 in order to generate a 1/k scale image of the original image is given by:

$$r=d-(\log_2 k-1) \quad (7)$$

Accordingly, when the desired resolution (1/k) with respect to the original image is provided by the user, the value of r is calculated by the equation (7) to be set in step S1. In the case of generating a reduced size image having an aspect ratio different from that of its original image as shown in FIG. 8B, if the resolution of the reduced size image is specified by a user as 1/kh horizontally and 1/kv vertically with respect to the original image, the smaller of kh and kv is defined as k. Then, r is calculated by the equation (7) to be set in step S1, so that the operation of FIG. 14 is performed.

Normally, the wavelet coefficients are quantized, and therefore, should be inversely quantized before being subjected to an inverse wavelet transform. Therefore, when the decoding is completed in each resolution level i lower than resolution level r (that is, "NO" in step S3), in step S6, all of the decoded wavelet coefficients are inversely quantized. Thereafter, in step S7, the inversely quantized wavelet coefficients are subjected to a selected inverse wavelet transform operation. The selected inverse wavelet transform operation of step S7 is composed of an LL generating operation performed shown in FIG. 17, a horizontal pixel position determining and horizontal filtering operation performed shown in FIG. 19, and a vertical pixel position determining and vertical filtering operation performed shown in FIG. 21, which will be described later. Each of the operations of FIGS. 17, 19, and 21 according to this embodiment is performed with respect to each component. In step S8, an inverse color conversion operation is performed when there are two or more components.

Figure 17:
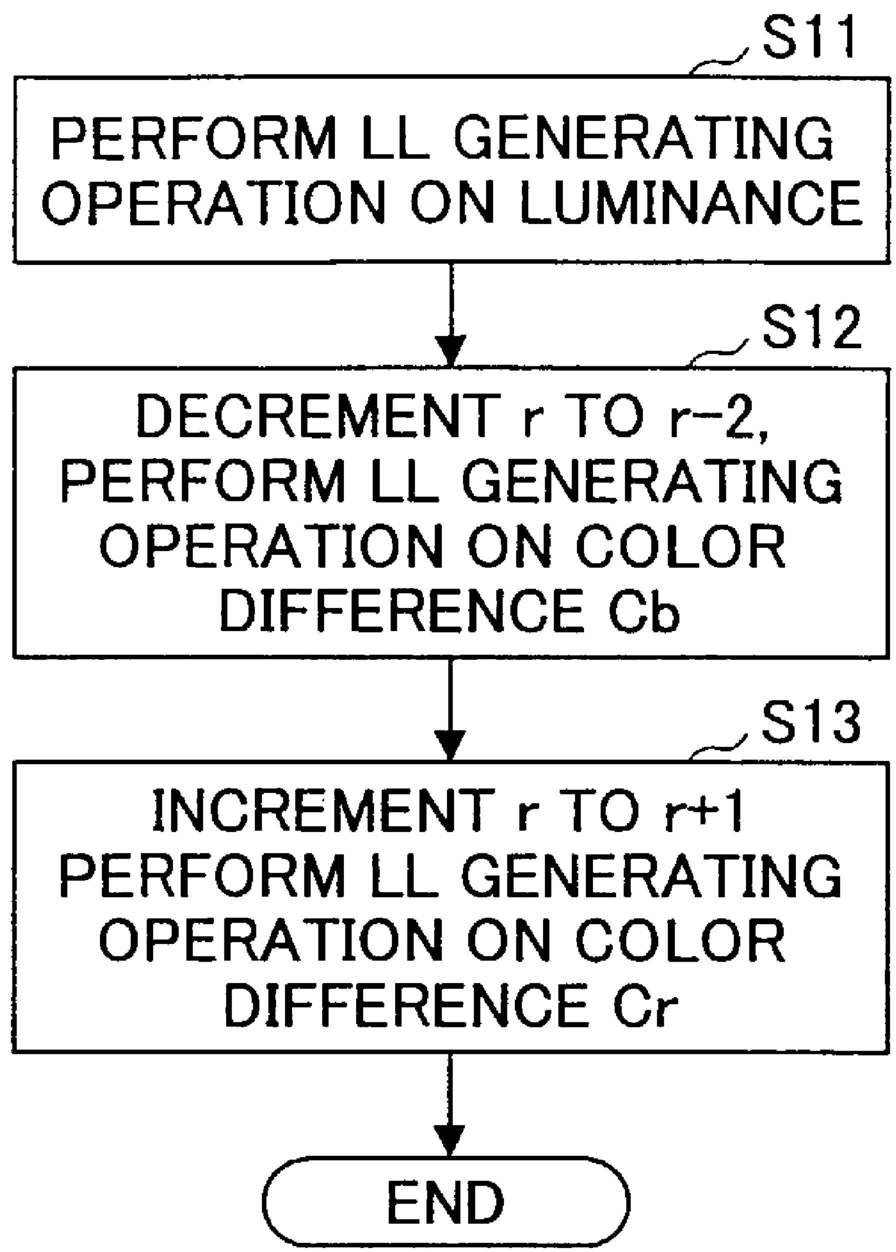
FIG. 17 is a flowchart for illustrating an LL generating operation performed on each component according to the fourth embodiment of the present invention.
Figure 18:
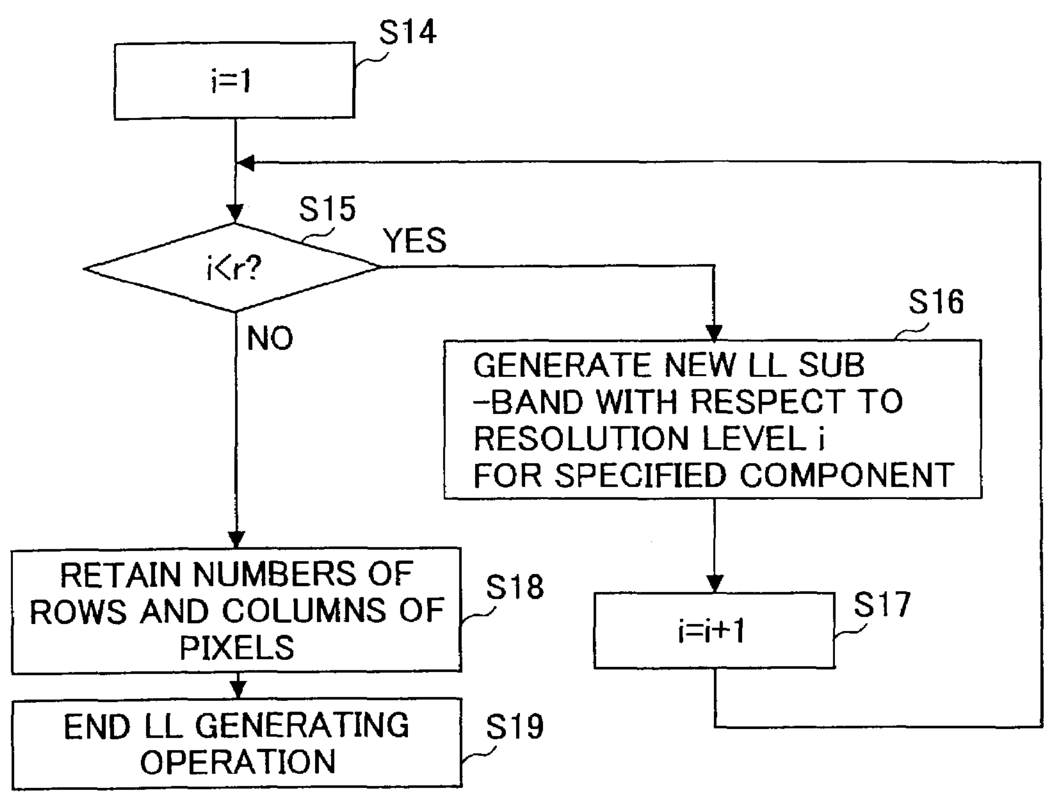
FIG. 18 is a flowchart for illustrating the operation of FIG. 17 in detail according to the fourth embodiment of the present invention.

FIG. 17 is a flowchart for illustrating the LL generating operation performed on each component according to the fourth embodiment of the present invention. FIG. 18 is a flowchart for illustrating the operation of FIG. 17 in detail. FIG. 18 illustrates an operation of obtaining the coefficients of an LL sub-band having a resolution lower than that of a reduced size image to be generated.

Figure 20:
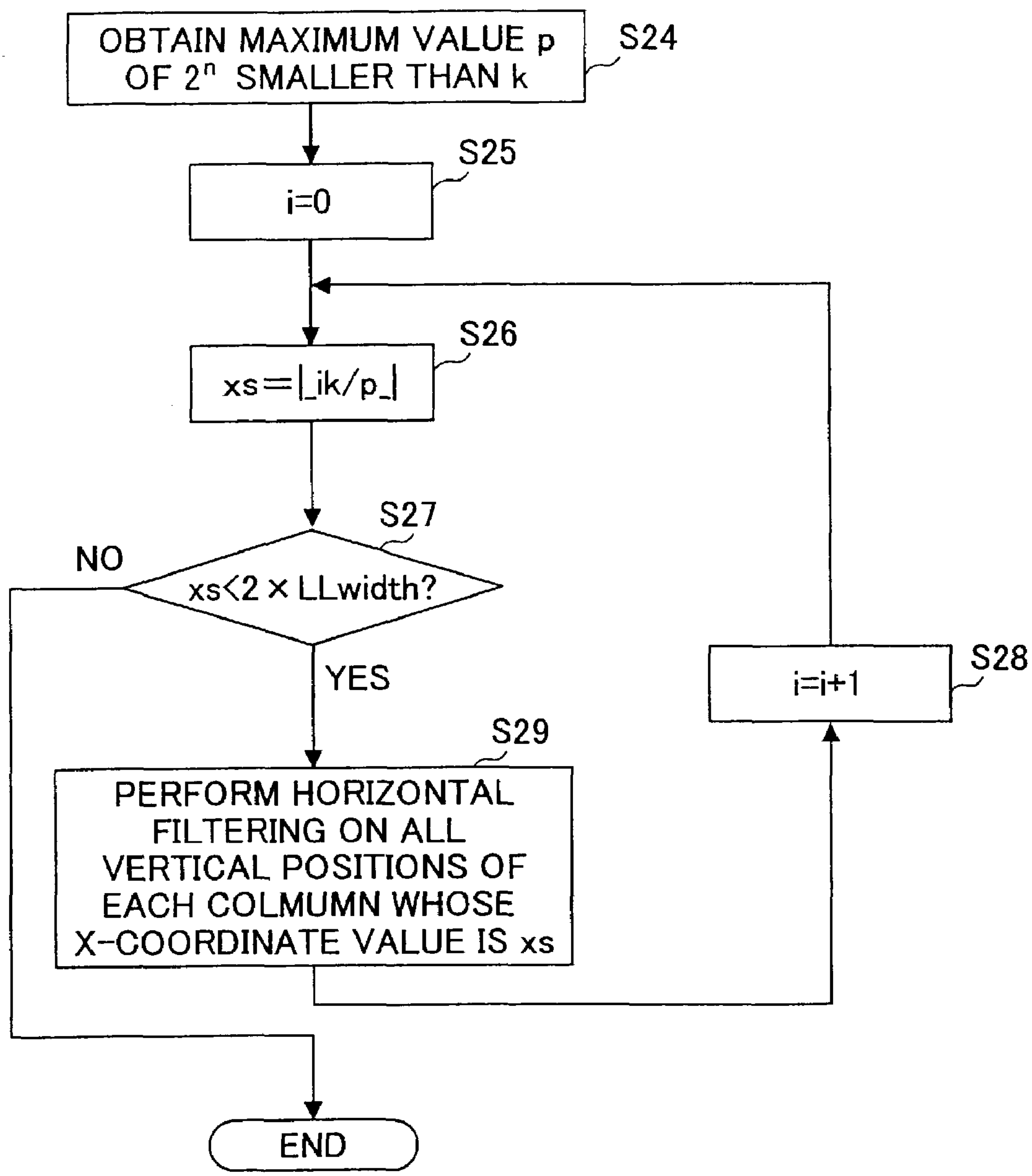
FIG. 20 is a flowchart for illustrating the operation of FIG. 19 in detail according to the fourth embodiment of the present invention.
Figure 22:
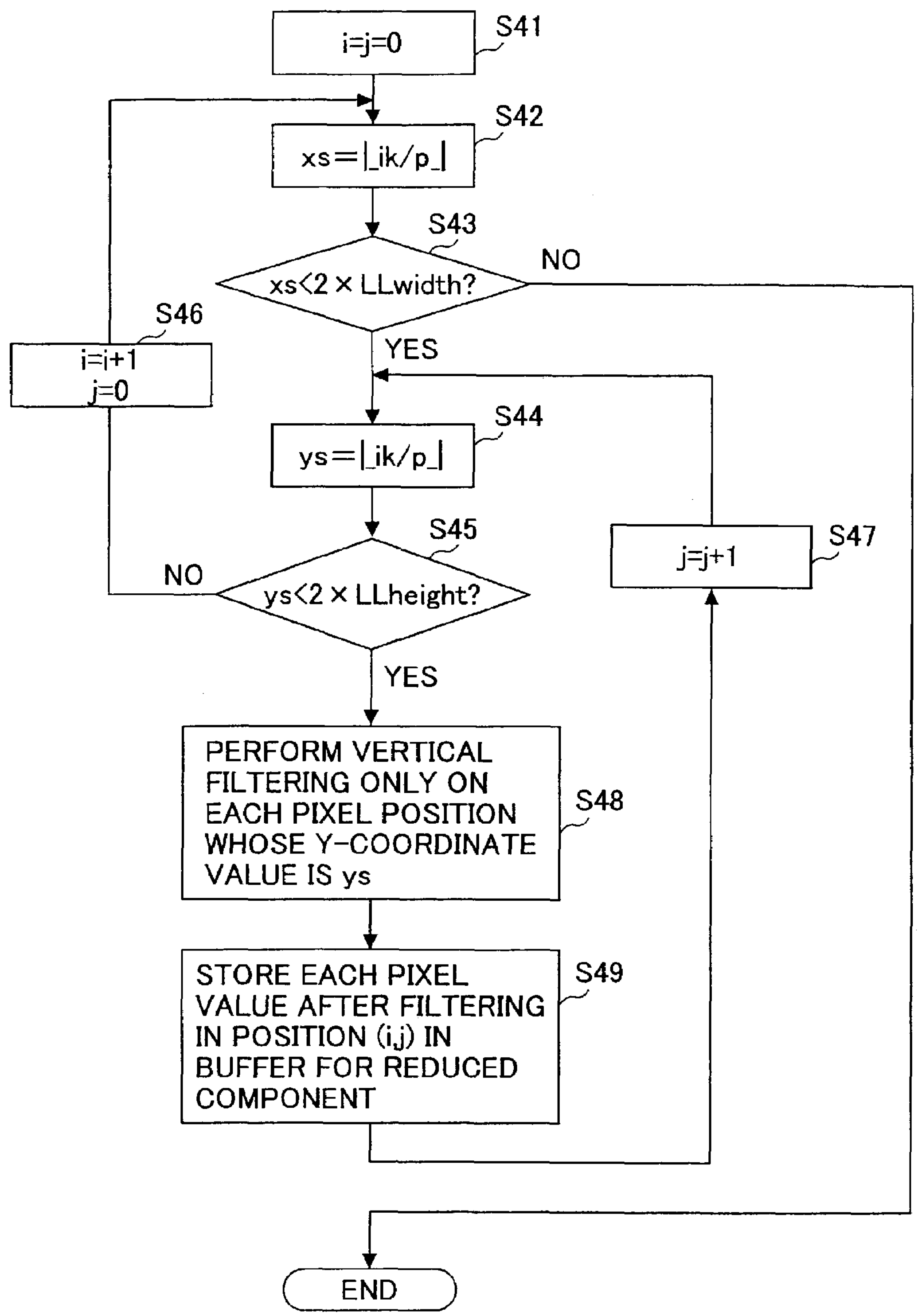
FIG. 22 is a flowchart for illustrating the operation of FIG. 21 in detail according to the fourth embodiment of the present invention.

According to this embodiment, first, in step S11 of FIG. 17, the LL generating operation is performed on the luminance Y. Next, in step S12, r is decremented by two (r=r−2), and the LL generating operation is performed on the color difference Cb. Then, in step S13, r is incremented by one (r=r+1), and the LL generating operation is performed on the color difference Cr. Similarly, when the resolution of luminance is reduced in the ratio of k:1, the resolution of Cr and the resolution of Cb are reduced in the ratio of 2k:1 and 4k:1, respectively. Then, as far as Cr and Cb are concerned, k in FIGS. 20 and 22 are treated as 2k and 4k, respectively.

FIG. 18 shows that by using the wavelet coefficients of four sub-bands, (new) LL coefficients of a decomposition level lower by one than that of the four sub-bands are generated. By recursively repeating this operation, all of the LL coefficients that have the highest resolution below the desired resolution level r can be obtained. That is, according to the LL generating operation performed on each component, in step S14 of FIG. 18, i is set to one (i=1). Then, in steps S15 through S17, i is incremented until i reaches r. During this process, in step S16, with respect to each resolution level i, using an LL sub-band and three HL, LH, and HH sub-bands of resolution level i, inverse wavelet transform is performed to generate a new LL sub-band for a specified component. When the generation of a new LL sub-band is completed in each resolution level i below resolution level r (that is, "NO" in step S15), in step S18, the number of vertical pixels (rows) LLheight and the number of horizontal pixels (columns) LLwidth of the new LL sub-band are retained. Then, in step S19, the LL generating operation ends. In this manner, all of the wavelet coefficients of the LL sub-band having the highest resolution below the resolution of a reduced size image to be generated are obtained.

As described in step S12, with respect to the color difference Cb, the LL sub-band is generated using the sub-bands of up to a resolution level lower than that of the luminance Y by two. With respect to the color difference Cr, the LL sub-band is generated using the sub-bands of up to a resolution level higher than that of the color difference Cb by one. In the case of FIG. 17, the resolution of the color difference Cr is set to a half of the resolution of the luminance Y.

Figure 19:
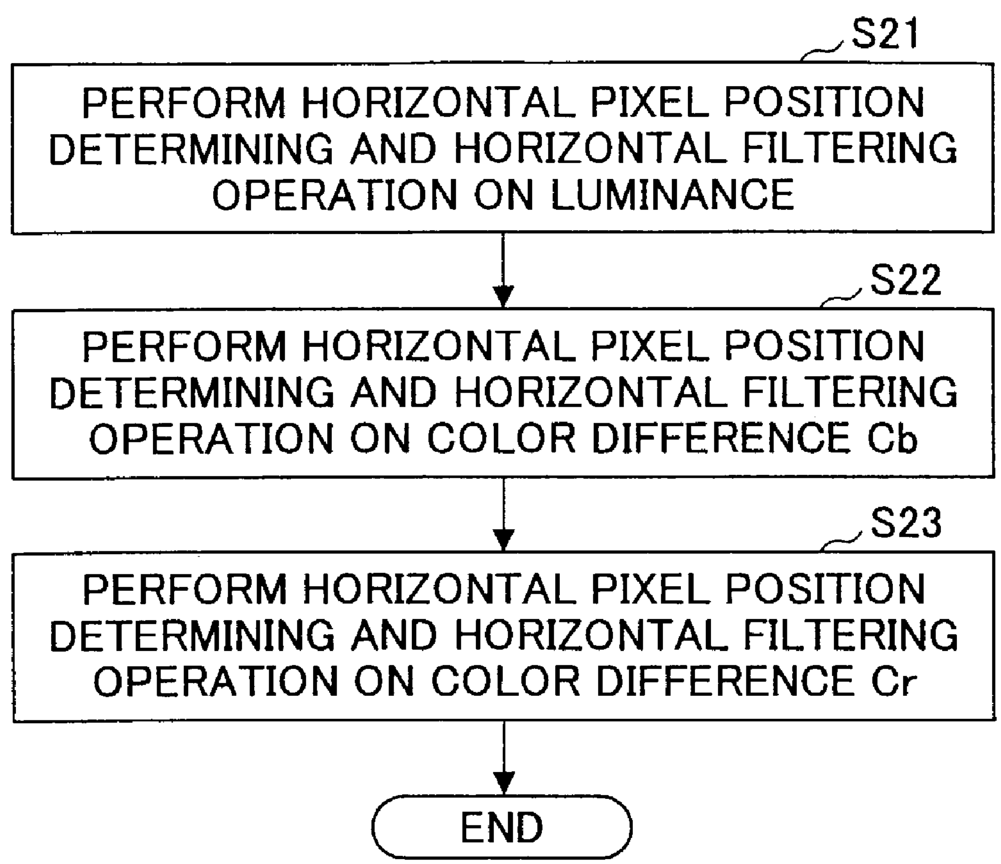
FIG. 19 is a flowchart for illustrating a horizontal pixel position determining and horizontal filtering operation performed on each component according to the fourth embodiment of the present invention.

FIG. 19 is a flowchart for illustrating the horizontal pixel position determining and horizontal filtering operation performed on each component according to the fourth embodiment of the present invention. FIG. 20 is a flowchart for illustrating the operation of FIG. 19 in detail.

According to this embodiment, first, in step S21 of FIG. 19, the horizontal pixel position determining and horizontal filtering operation is performed on the luminance Y. Next, in step S22, the horizontal pixel position determining and horizontal filtering operation is performed on the color difference Cb. Then, in step S23, the horizontal pixel position determining and horizontal filtering operation is performed on the color difference Cr.

FIG. 20 shows the operation of obtaining the maximum value p of $2^n$ smaller than k, obtaining the horizontal positions of the above-described "pixels desired to be finally obtained" with k/p being employed as a unit (a horizontal position determining operation), and performing horizontal filtering on all of the vertical positions of each of the horizontal positions. Although horizontal filtering is performed on all of the vertical positions, the wavelet coefficients can be selected so as to be selectively subjected to an inverse wavelet transform. This is because the horizontal position determining operation is performed. That is, according to the horizontal pixel position determining and horizontal filtering operation, first, in step S24 of FIG. 20, the maximum value p of $2^n$ smaller than k is obtained based on the resolution 1/k specified by the user. Next, in step S25 i is set to zero (i=0). Then, in step S26, a horizontal position xs is determined by $xs=\lfloor ik/p \rfloor$. Thereafter, in steps S27 and S28, i is incremented until xs equals 2×LLwidth (xs=2×LLwidth), while step S26 is performed. During this process, in step S29, horizontal filtering is performed on all of the vertical positions of each column whose X-coordinate value is xs. If the result of step S27 is "NO", the operation ends. As stated above, when the aspect ratio of a reduced size image is different from that of the original image, if a desired resolution (1/kh horizontally and 1/kv vertically) with respect to the original image is provided by a user, the value of r is calculated by the equation (7) using the smaller of kh and kv as k.

At this point, the number of adjacent pixels to be obtained can be reduced by first selecting (0, 0) of FIG. 2, that is, a horizontally and vertically even-numbered position, as the "vertex pixel of the pixels desired to be finally obtained" of each component.

Figure 21:
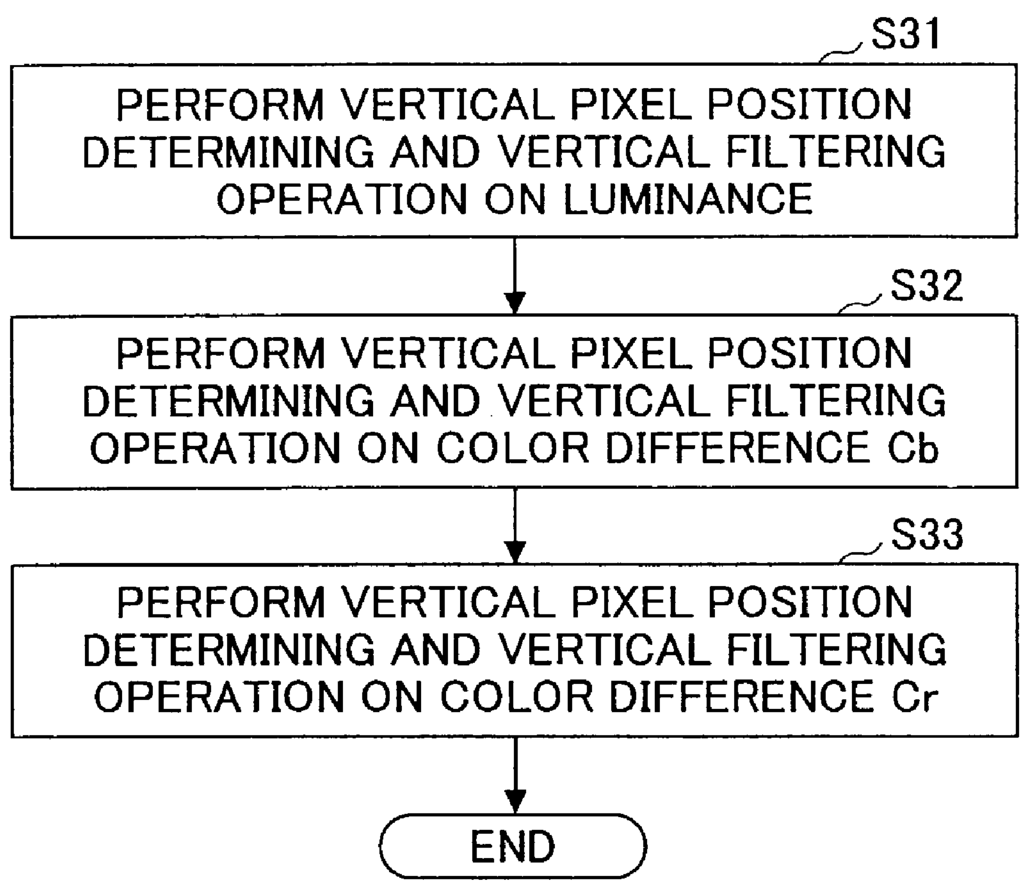
FIG. 21 is a flowchart for illustrating a vertical pixel position determining and vertical filtering operation performed on each component according to the fourth embodiment of the present invention.

FIG. 21 is a flowchart for illustrating the vertical pixel position determining and vertical filtering operation performed on each component according to the fourth embodiment of the present invention. FIG. 22 is a flowchart for illustrating the operation of FIG. 21 in detail.

According to this embodiment, first, in step S31, the vertical pixel position determining and vertical filtering operation is performed on the luminance Y. Next, in step S32, the vertical pixel position determining and vertical filtering operation is performed on the color difference Cb. Then, in step S33, the vertical pixel position determining and vertical filtering operation is performed on the color difference Cr.

The vertical pixel position determining and vertical filtering operation, which is similar to the horizontal pixel position determining and horizontal filtering operation of FIGS. 19 and 20, is performed only on necessary pixel positions. As previously described, the necessity of a pixel is determined based on whether the vertical position of the pixel is even-numbered or odd-numbered. That is, according to this embodiment, first in step S41, i and j are set to zero (i=j=0). Then, in step S42, a horizontal position xs is determined by $xs=\lfloor ik/p \rfloor$. In step S43, it is determined whether xs<2×LLwidth holds. If xs<2×LLwidth (that is, "YES" in step S43), steps S44 and S45 (will be later described) are performed. In the case of "NO" in step S45, in step S46, i is incremented by one and j is set to zero (j=0). If xs≧2×LLwidth (that is, "NO" in step S43), the operation ends. In step S44, a vertical position ys is determined by $ys=\lfloor jk/p \rfloor$. In step S45, it is determined whether ys<2×LLheight holds. If ys<2×LLheight (that is, "YES" in step S45), steps S48 and S49 (will be later described) are performed, and in step S47, j is incremented by one (j=j+1), and the operation returns to step S44. This process continues until ys equals 2×LLheight. If ys≧2×LLheight (that is, "NO" in step S45), in step S46, i is incremented by one and j is set to zero (j=0), and the operation returns to step S42. In step S48, vertical filtering is performed only on each pixel position whose Y-coordinate value is ys. In step S49, each pixel value after the filtering is stored in the position (i, j) in a buffer for reduced component. Thereafter, as previously described, step S47 is performed. In FIG. 22, the operation of obtaining xs may be omitted. In this case, the vertical filtering is performed with respect to each horizontal position (column). Besides, when the aspect ratio of a reduced size image is different from that of the original image, if a desired resolution (1/kh horizontally and 1/kv vertically) with respect to the original image is provided by a user, the horizontal position xs is determined by $xs=\lfloor ikh/p \rfloor$ in step S42 and the vertical position ys is determined by $ys=\lfloor jkv/p \rfloor$ in step S44.

Figure 23:
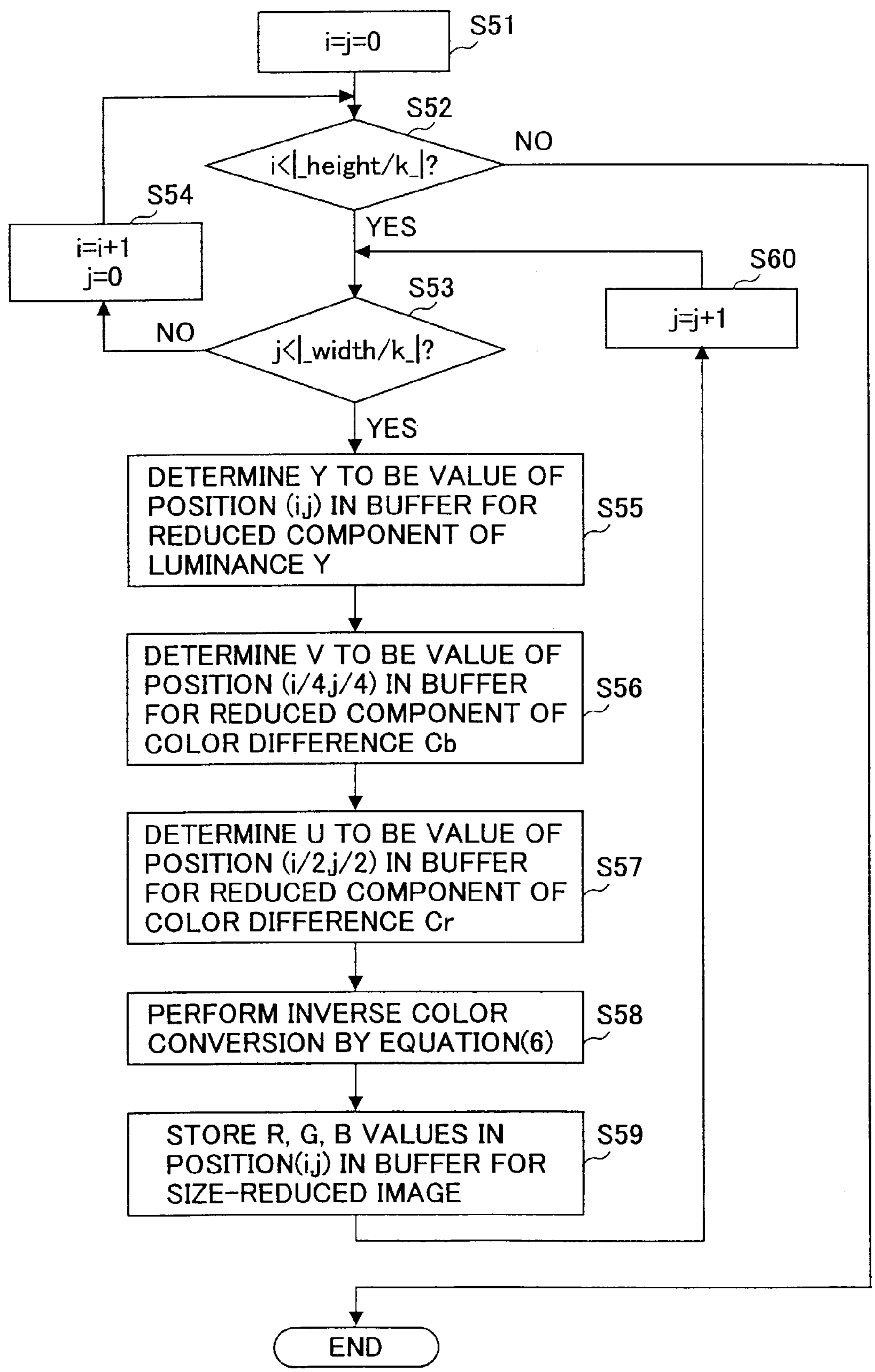
FIG. 23 is a diagram for illustrating an inverse color conversion operation according to the fourth embodiment of the present invention.

FIG. 23 is a diagram for illustrating the inverse color conversion operation according to this embodiment.

The maximum value of the decomposition level and the number of vertical pixels (height) and the number of horizontal pixels (width) of an original image can be read from the headers of the codes, and the number of vertical pixels and the number of horizontal pixels of a reduced size image to be generated are given by ⌊height/k⌋ and ⌊width/k⌋, respectively, and also used in the inverse color conversion operation. The color difference components are subjected to an inverse wavelet transform only up to resolutions lower than that of the luminance component by one or more levels. Therefore, the number of pixels of the reduced size image to be generated is defined by the following:

Color difference Cb:
Vertical pixels ⌊height/4k⌋,
Horizontal pixels ⌊width/4k⌋
Color difference Cr:
Vertical pixels ⌊height/2k⌋,
Horizontal pixels ⌊width/2k⌋

Similarly, when the aspect ratio of a reduced size image is different from the original image, the number of pixels of the reduced size image to be generated is defined by the following:

Color difference Cb:
Vertical pixels ⌊height/4kv⌋,
Horizontal pixels ⌊width/4kh⌋;
Color difference Cr:
Vertical pixels ⌊height/2kv⌋,
Horizontal pixels ⌊width/2kh⌋

In the inverse color conversion operation, if i<⌊height/k⌋ and j<⌊width/k⌋, later-described steps S55 through S59 are performed. That is, first, in step S51 of FIG. 23, i and j are zero (i=j=0). Then, (in the case of "YES" in step S52) in step S54, i is incremented by one until i equals ⌊height/k⌋ with j being set to zero (j=0). During this operation, below-described operations are performed, and if it is determined in step S52 that i≧⌊height/k⌋, the operation ends. The operations performed during the above-described operation are as follows. In the case of "YES" in step S53, steps S55 through S59 are performed until j equals ⌊width/k⌋. If it is determined in step S53 that j≧⌊width/k⌋ (that is, "NO" in step S53), i is incremented and j is set to zero (j=0), and the operation returns to step S52. In step S55, with respect to the luminance Y, Y is determined to be the value of the position (i, j) in the buffer for reduced component of the luminance Y. In step S56, with respect to the color difference Cb, Cb is determined to be the value of the position (i/4, j/4) in the buffer for reduced component of the color difference Cb. In step S57, with respect to the color difference Cr, Cr is determined to be the value of the position (i/2, j/2) in the buffer for reduced component of the color difference Cr. Next, in step S58, an inverse color conversion is performed by the above-described equations (6), and in step S59, the R, G, and B values are stored in the position (i, j) in a buffer for reduced size image.

As previously described, in the case of obtaining the 1/3-resolution image of an original image, the wavelet coefficients of up to an LL sub-band (and HL, LH, and HH sub-bands) that may be interleaved to have a resolution (or pixels) half the resolution (or pixels) of the original image are obtained, and the 2/3-resolution image of the interleaved coefficients of the LL sub-band is generated by the processing described herein.

FIGS. 24A and 25A are diagrams showing pixels to be obtained in the case of generating the 2/3-resolution image of the interleaved coefficients. In FIG. 24A, those pixels in the state after horizontal filtering at the time of an inverse wavelet transform operation are indicated by shading. In FIG. 25A, those pixels in the state after vertical filtering at the time of the inverse wavelet transform operation are indicated by shading. Further, in FIGS. 24A and 25A, the pixels to be obtained are shown underlined as in FIG. 8A. In a coefficient array 8 of FIG. 24A and a coefficient array 9 of FIG. 25A, as in FIGS. 9A and 8A, the "coefficient positions to be obtained" are indicated by shading as the state after horizontal filtering and the state after vertical filtering, respectively, at the time of the inverse wavelet transform operation. The coefficient values of FIGS. 24A and 25A correspond to those of FIGS. 3 and 2, respectively. The number of pixels of the original image in FIGS. 24A and 25A is different from that in FIGS. 8A and 9A. FIGS. 24B and 25B show pixels to be obtained in the case of generating a 10×8 image of the 16×16 interleaved coefficients (sub-band). In FIG. 24B, the coefficient positions to be subjected to a horizontal inverse wavelet transform are indicated by shading, and in FIG. 25B, the coefficient positions to be subjected to vertical inverse wavelet transform are indicated by shading.

The above description is given of the selective inverse wavelet transform operation according to one embodiment of the present invention. A description will now be given of an image data generator, an image data generating method, and an image data generating program for generating decoded image data of a desired resolution (desired reduced size image data), balancing decoding speed and decoded image quality by decoding unit of the codes of wavelet coefficients in an entropy decoding unit in generating a reduced size image. A description will also be given of a recording medium storing such a program.

Decoding is often employed in generating a reduced size image to be displayed on a display unit having a small screen. In this case, since the display unit is limited in representation performance, the image quality of the reduced size image itself may not be strictly questioned. Rather, decoding time may become an issue. Further, due to the limited representation performance of the display unit, the degradation of data on the reduced size image often cannot be observed visually.

In a method that can make a selection as to not only resolution (band) but also the ratio of codes to be decoded (code-decoding ratio) in an entropy decoding unit, such as JPEG 2000, the entropy decoding of wavelet coefficients can be performed at high speed by limiting the code-decoding ratio. In the case of JPEG 2000, since the binary representation of a wavelet coefficient is decoded bit by bit from MSB (Most Significant Bit) to LSB (Least Significant Bit), decoding image quality and decoding speed can be improved by selecting an appropriate bit up to which the decoding is to be performed. In the case of displaying an image on a display unit having a limited display capability as previously described, it is often the case that it is not necessary to decode all codes.

Figure 26:
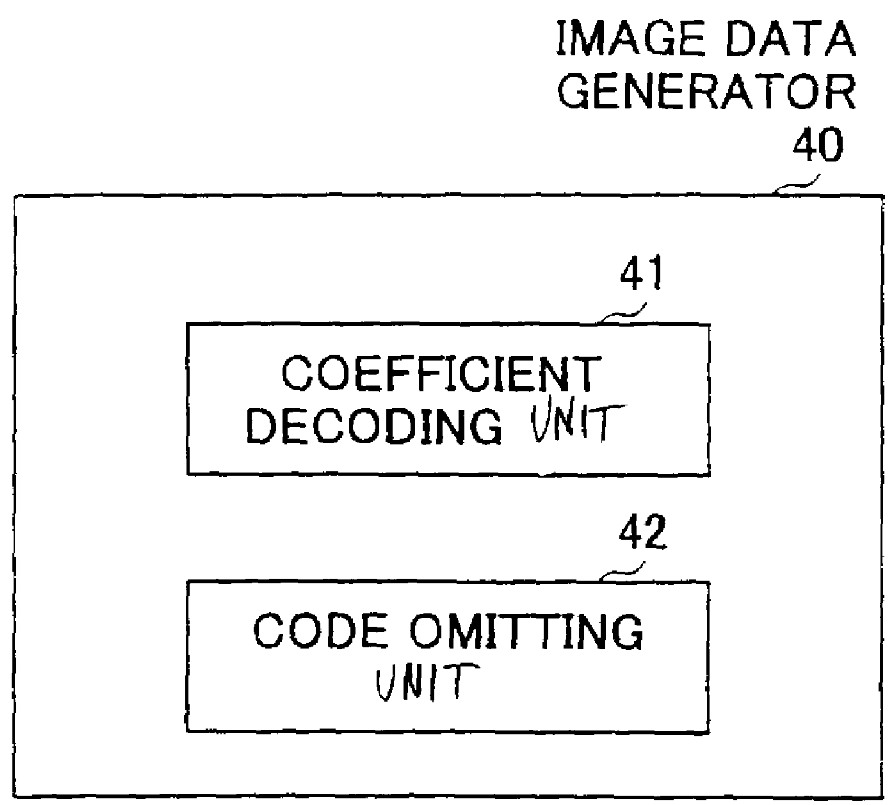
FIG. 26 is a block diagram showing an image data generator according to a fifth embodiment of the present invention.

FIG. 26 is a block diagram showing an image data generator 40 according to this embodiment.

The image data generator 40, which generates data on a reduced size image of an original image, includes a coefficient decoding unit 41 decode coded wavelet coefficients and a code omitting unit 42.

The code omitting unit 42 omits, of the codes of the same sub-band, the codes that are not to be decoded. The coefficient decoding unit 41 decodes the codes other than those omitted in the code omitting unit 42. That is, the coefficient decoding unit 41 decodes unit of the codes of the same sub-band. As will be later described, the image data generator 40 may decode unit of a layer and obtain a reduced size image based on the decoded data. According to this embodiment, it is possible to generate reduced size data, balancing decoding speed and decoded image quality. The partial decoding according to one embodiment of the present invention excludes the case of performing no decoding, which case is equivalent to the case of omitting decoding by band restriction.

In realizing the above-described improvements, it is important to reduce the amount of codes to be decoded while controlling the effect on image quality. It is well known that in the case of a wavelet transform, a quantization error generated in coefficients affects image quality differently in each sub-band (each of LL, HL, LH, and HH). The LL sub-band has the largest effect on image quality, and generally, HL≈LH>HH holds in terms of the magnitude of the effect on image quality. Accordingly, normally, the LL sub-band is least quantized while the HH sub-band is most quantized. Further, as in the above-described case of JPEG 2000, decoding only a number of high-order bit planes (will be later described) with the remaining low-order bit planes being left undecoded is equivalent to losing lower bits by quantization. This means that it is possible to provide a greater code-decoding ratio to the LL sub-band and a smaller code-decoding ratio to the HH sub-band.

Further, it is well know that in the case of a wavelet transform, the effect of quantization error generated in coefficients on image quality differs depending on the decomposition level. The effect becomes greater as the decomposition level becomes higher.

Therefore, according to this embodiment, the sub-bands may be provided with different code-decoding ratios. That is, the amount or ratio of codes to be omitted (not to be decoded) in the code omitting unit 42 may be caused to differ among the sub-bands. According to this configuration, by considering the effect on image quality by each sub-band, a reduced size image can be generated with decoding speed and decoded image quality being improved.

Further, according to this embodiment, the LL, HL, LH, and HH sub-bands may be provided with different code-decoding ratios. That is, the amount or ratio of codes to be omitted in the code omitting unit 42 may be caused to differ among the sub-bands of the same decomposition level. According to this configuration, by considering the effect on image quality by each of the sub-bands of the same decomposition level, a reduced size image can be generated with decoding speed and decoded image quality beingimproved improved.

Further, according to this embodiment, the decomposition levels may be provided with different code-decoding ratios. That is, the amount or ratio of codes to be omitted in the code omitting unit 42 may be caused to differ among the decomposition levels. According to this configuration, by considering the effect on image quality by each decomposition level, a reduced size image can be generated with decoding speed and decoded image quality being improved.

In the case of compressing an original image, which is, for instance, a color image formed of three components of R, G, and B, normally, in order to increase the compression rate, a color conversion is performed on the R, G, and B components so that the R, G, and B components are converted to three new components of one luminance and two color differences, and wavelet transform is performed independently on each of the new components obtained after the color conversion.

As previously described, RCT, which is one of color conversion methods employed in JPEG 2000, is given by the following:

$$\text{Luminance } Y = \lfloor (R + 2G + B)/4 \rfloor \quad (8)$$

$$\text{Color difference } Cr = R - G$$

$$\text{Color difference } Cb = B - G$$

The inverse conversion of RCT is given by the following:

$$R = G + Cr \quad (9)$$

$$G = Y - \lfloor Cr + Cb)/4 \rfloor$$

$$B = Cb + G$$

where the symbol $\lfloor x \rfloor$ represents a floor function of x that replaces a real number x with the largest of all the integers smaller than or equal to x.

In this case, it is well known that the effect of a quantization error generated in coefficients on image quality differs among the components. In the case of the luminance-color difference system, the luminance exerts the largest effect. Further, it is also well known that the effect differs between the color differences. In the case of no color conversion, the G component has the largest effect.

Therefore, according to one embodiment of the present invention, in an apparatus decoding the wavelet coefficients of a plurality of components, the components may be provided with different code-decoding ratios. That is, decoding may be performed component by component, and the amount or ratio of codes to be omitted in the code omitting unit 42 may be caused to differ among the components. According to this configuration, by considering the effect on image quality by each component, a reduced size image can be generated with decoding speed and decoded image quality being improved.

Further, according to this embodiment, the LL sub-band may be provided with the smallest amount or ratio of codes not to be decoded. According to this configuration, by considering the effect on image quality by the LL sub-band, a reduced size image can be generated with decoding speed and decoded image quality being improved.

Further, according to this embodiment, the HH sub-band may be provided with the largest amount or ratio of codes not to be decoded. According to this configuration, by considering the effect on image quality by the HH sub-band, a reduced size image can be generated with decoding speed and decoded image quality being improved.

Further, according to this embodiment, a higher decomposition level may be provided with a smaller amount or ratio of codes not to be decoded. According to this configuration, by considering the effect on image quality by the decomposition level, a reduced size image can be generated with decoding speed and decoded image quality being improved.

Further, according to this embodiment, in an apparatus decoding a luminance component, the luminance component may be provided with the smallest amount or ratio of codes not to be decoded of all components. According to this configuration, by considering the effect on image quality by luminance, a reduced size image can be generated with decoding speed and decoded image quality being improved.

Further, according to this embodiment, in an apparatus decoding a plurality of color-difference components, the color-difference components may be provided with different amounts or ratios of codes not to be decoded. According to this configuration, by considering the effect on image quality by each color-difference component, a reduced size image can be generated with decoding speed and decoded image quality being improved.

Further, according to this embodiment, in an apparatus decoding a luminance component Y and two color-difference components Cb and Cr, $Y<Cr<Cb$ may hold in terms of the amount or ratio of codes not to be decoded. It is empirically known that in light of human visual characteristics, Cb has a smaller effect than Cr. According to this configuration, by considering the effect on image quality by each of Cb and Cr, a reduced size image can be generated with decoding speed and decoded image quality being improved.

Normally, in order to generate a reduced size image of a desired size, codes are decoded to a size larger than the desired size and thinned out after being subjected to an inverse wavelet transform, or codes are decoded to a size smaller than the desired size and subjected to interpolation. When these decoding cases are compared at the same decomposition level (to be subjected to decoding), the code-decoding ratio should be set higher in the latter case (with interpolation processing) than in the former case (with thinning-out processing).

Therefore, the image data generator 40 of this embodiment may include a unit to decode only a sub-band of a size smaller than or equal to a desired image size. In other words, the codes are extracted in the size of an LL sub-band.

According to this configuration, by restricting the size of a sub-band to be decoded, a reduced size image can be generated with decoding speed and decoded image quality being improved.

Further, the image data generator 40 of this embodiment may include a unit to decode only a sub-band of a size smaller than a desired image size and a unit to thin out the decoded sub-band. According to this configuration, by restricting the size of a sub-band to be decoded, a reduced size image can be generated with decoding speed and decoded image quality being improved.

Further, the image data generator 40 of this embodiment may include a unit to decode sub-bands of up to the maximum of sizes smaller than or equal to a desired image size and a unit to perform interpolation. According to this configuration, by restricting the size of a sub-band to be decoded, a reduced size image can be generated with decoding speed and decoded image quality being improved.

The above description is given, focusing on the image data generator performing the partial decoding of one embodiment of the present invention. One embodiment of the present invention may also be realized as: an image data generating method including the processing steps performed in the image data generator; a program for causing a computer to function as the above-described image data generator or as each unit thereof or a program for causing a computer to execute the image data generating method (a computer program with the contents of the processing steps); and a computer-readable recording medium recording the program (a computer-readable information recording medium recording the contents of the processing steps). As is apparent from a later-described embodiment, by this image data generating method of the present invention, a reduced size image can be generated with decoding speed and decoded image quality being balanced or improved. Further, this program makes it possible to provide a system that can generate a reduced size image, balancing or improving decoding speed and decoded image quality, by the operations corresponding to the above-described embodiment. Further, this recording medium makes it possible to provide a system that can generate a reduced size image, balancing or improving decoding speed and decoded image quality, with the configurations corresponding to the above-described embodiment. It is apparent that this program and this recording medium can be realized easily based on the later-described embodiment in addition to the above-described embodiment.

A description will be given of a recording medium storing a program or data for realizing the image data generating function of the present invention according to a sixth embodiment of the present invention.

Specifically, the recording medium may be any of a CD-ROM, a magneto-optical disk, a DVD-ROM, a FD, a flash memory, and other various ROMs and RAMs. The recording medium is recorded with a program for causing a computer to execute the functions relating to the above-described embodiment according to the present invention so as to realize the image data generating function of the present invention. By distributing this recording medium, the above-described functions can be realized easily. Then, the image data generating function according to the present invention can be performed by loading the recording medium into an information processing apparatus such as a computer and causing the information processing apparatus to read out the program or by storing the program in a recording medium provided in an information processing apparatus and reading out the program as required.

A specific description will be given of the partial decoding operation of the present invention.

As will be later described, the amount or ratio of codes not to be decoded in the partial decoding operation of the present invention means, for instance, the "number of bit planes not to be decoded" or the "number of bit planes not to be decoded against the total number of coded bit planes."

Since this embodiment employs an apparatus configuration equal to those described with reference to FIGS. 12 and 13, a description thereof will be omitted.

In this embodiment, JPEG 2000 selecting the 5×3 wavelet transform is employed. Therefore, a description will first be given of the outline of the JPEG 2000 operation. The application range of the present invention is not limited to JPEG 2000.

Referring again to FIG. 11, the rightward arrow (→) and the leftward arrow (←) in the JPEG 2000 encoding and decoding processes indicate the direction of encoding (compression) and the direction of decoding (decompression), respectively. FIG. 11 shows that at the time of decoding, the wavelet coefficients of each component obtained through entropy decoding and inverse quantization (as required) are subjected component by component to an inverse wavelet transform and then an inverse color conversion to be returned to the R, G, and B pixel values.

Since the color space conversion and inverse conversion unit 21 is previously described, a description will now be given of a reduced size image generating operation according to this embodiment while defining "sub-band" and "decomposition level."

Since a wavelet transform and an inverse wavelet transform themselves are described with reference to FIGS. 2 through 6, 10, 11, and 15, a description thereof will be omitted.

A description will be given of the encoding of the wavelet coefficients of each sub-band. As is well known, in JPEG 2000, it is possible to code the coefficients from MSB to LSB in bit planes in each sub-band. Strictly, the encoding is performed by subdividing each bit plane, a description of which is omitted.

FIG. 27A is a diagram showing the coefficients of a 2LL sub-band, and FIG. 27B is a diagram showing the coefficients divided into bit planes. FIG. 28 is a diagram showing a code configuration according to the sixth embodiment. FIG. 28 shows that codes can be arranged in the order the codes are arranged from top to bottom in FIG. 28.

For purposes of this application, it is supposed that the coefficients of the 2LL sub-band $\mathbf{5}_1$ of FIG. 6 take the values shown in FIG. 27A. These values are expressed in binary numbers and the binary numbers of the same digit position are grouped into a bit plane. The coefficients of FIG. 27A can be divided into the four bit planes of FIG. 27B. The decimal number 15 is expressed as a binary 1111, so that a binary 1 occupies the position corresponding to 15 in each bit plane.

In JPEG 2000, each bit plane is individually coded. That is, it is possible to generate codes with the configuration of FIG. 28. FIG. 28 shows that the codes start from the 2LL sub-band and end at the 1HH sub-band. The bit planes are coded in order from the MSB bit plane to the LSB bit plane, and the decoder can recognize the total number of coded bit planes. Therefore, the decoder can easily omit the decoding of the LSB bit plane or the decoding of the two bit planes counted from the LSB bit plane.

Based on the above, a description will be given of the basic flow of a reduced size image generating operation to which the partial decoding of one embodiment of the present invention is applied.

Figure 29:
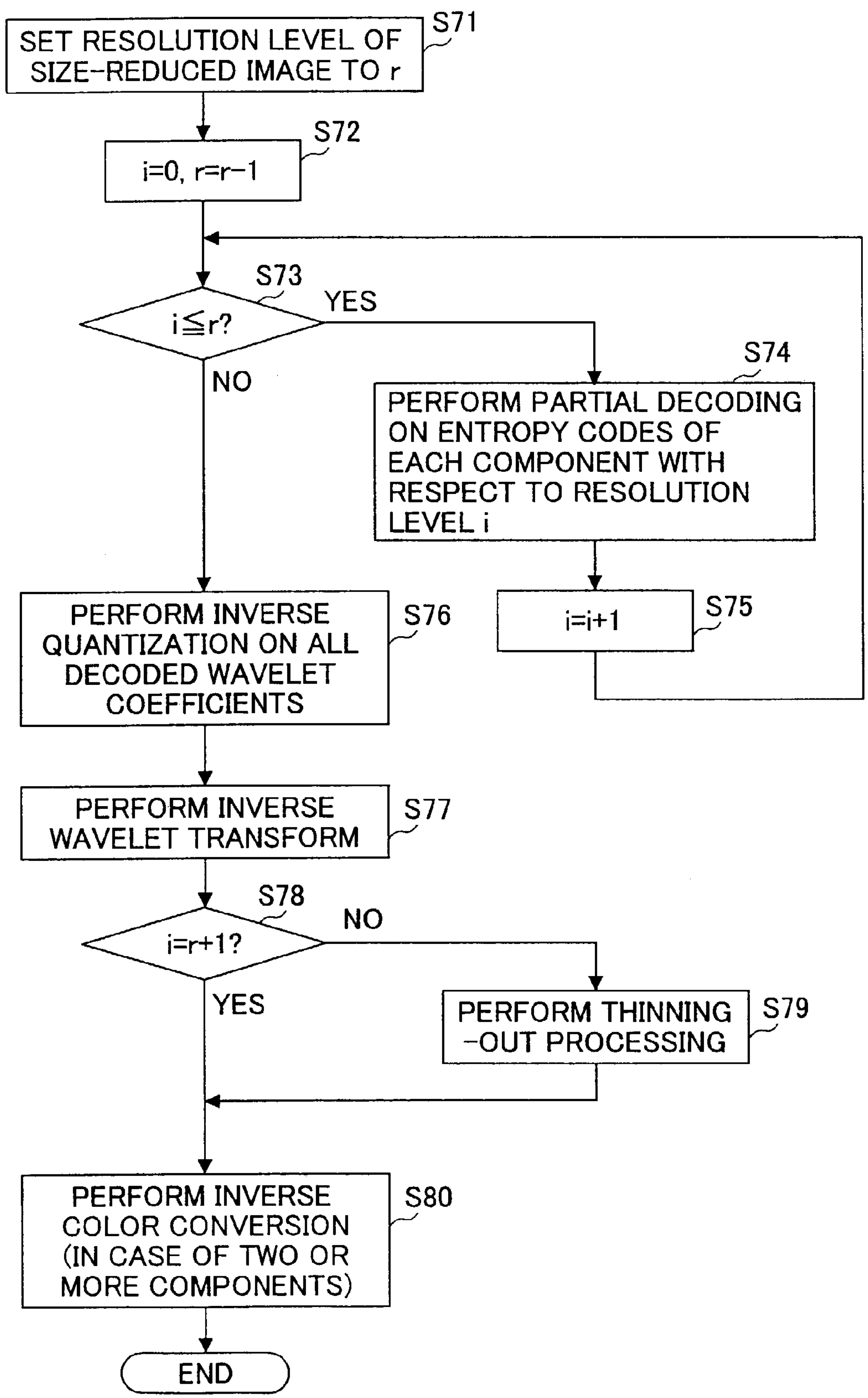
FIG. 29 is a flowchart for illustrating the basic flow of a reduced size image generating operation performed in an image data generator according to the sixth embodiment of the present invention.
Figure 30:
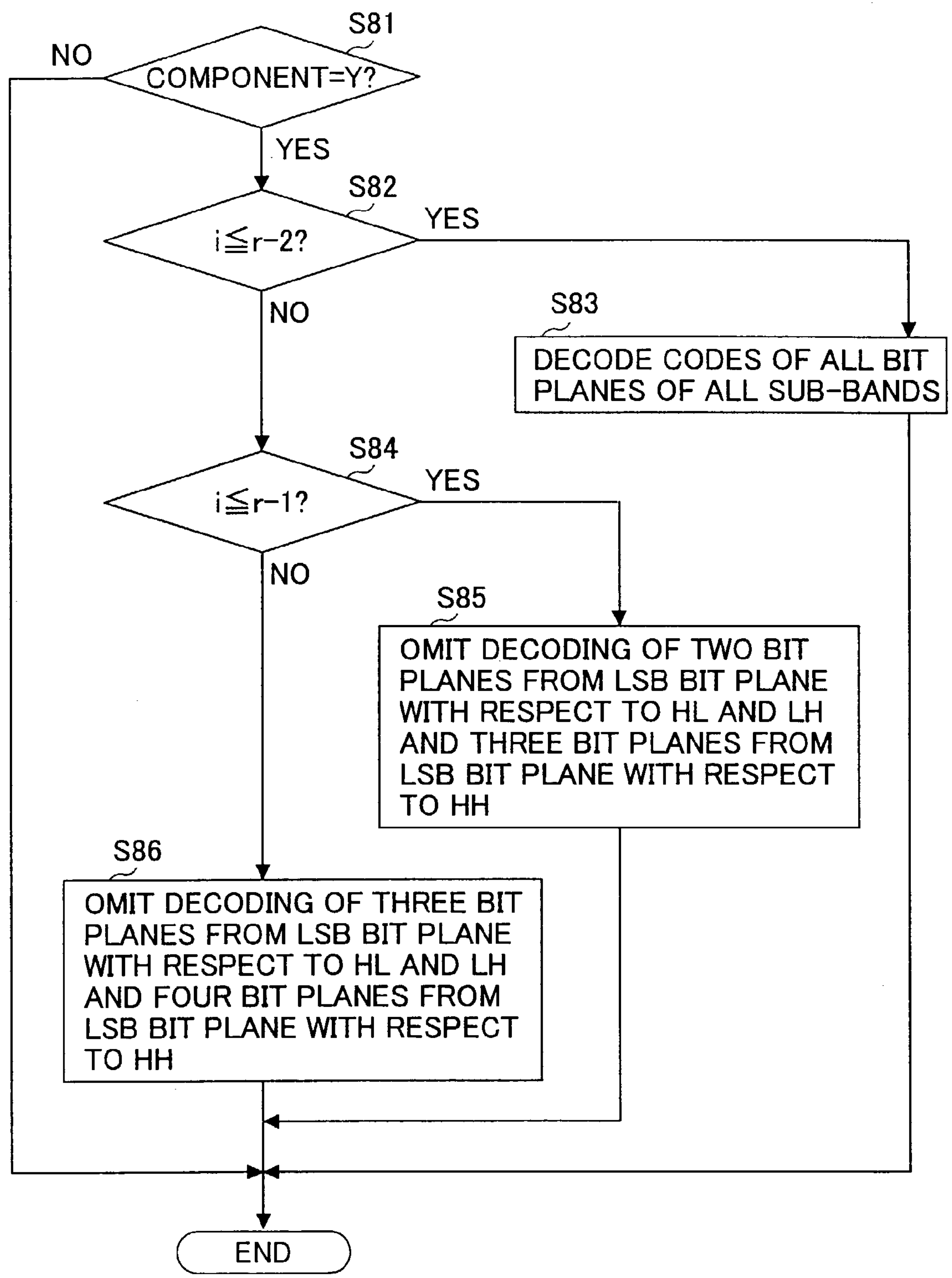
FIG. 30 is a flowchart for expatiating partial decoding in the operation of FIG. 29 according to the sixth embodiment of the present invention.
Figure 32:
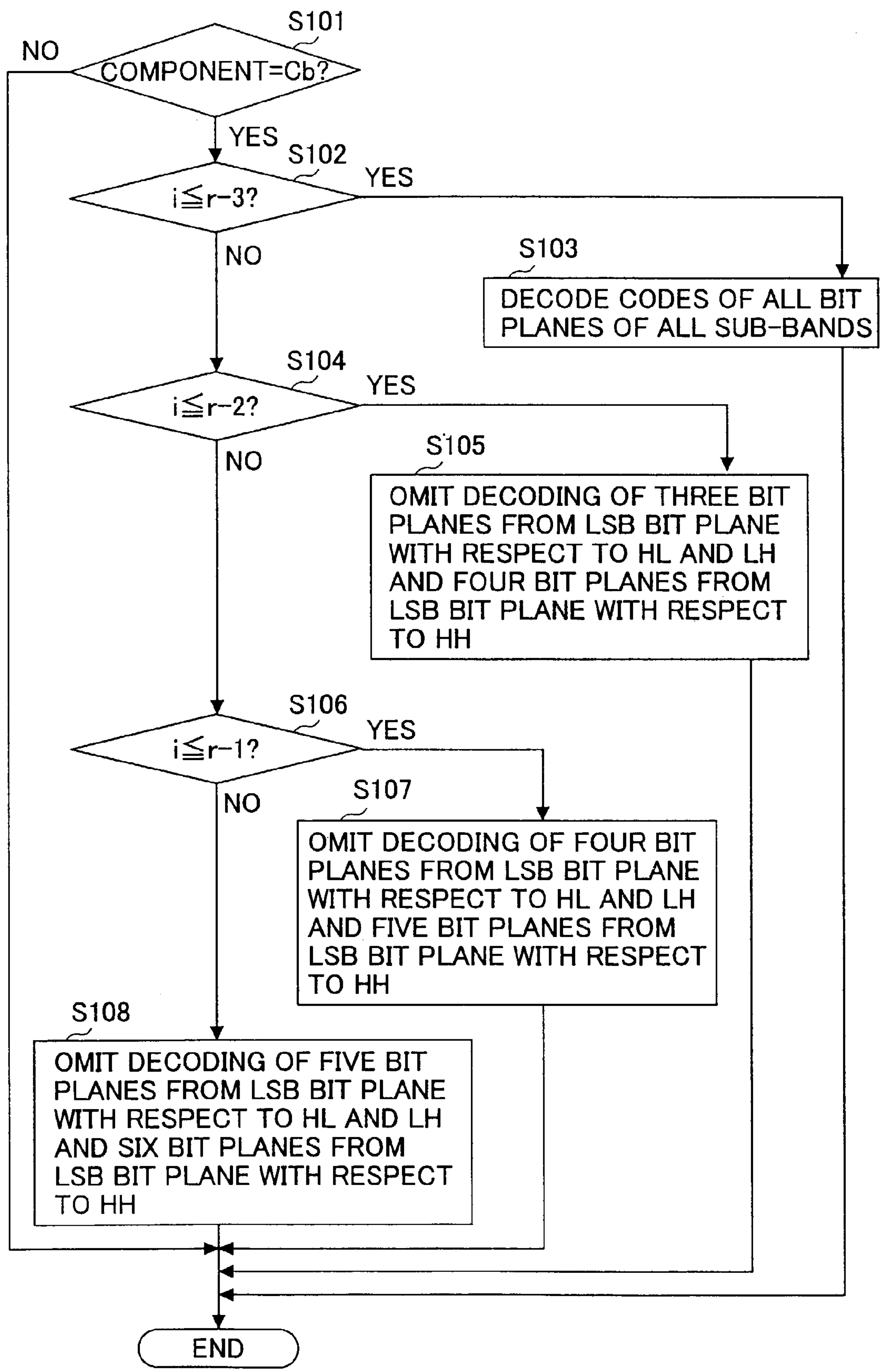
FIG. 32 is another flowchart for expatiating the partial decoding in the operation of FIG. 29 according to the sixth embodiment of the present invention.

FIG. 29 is a flowchart for illustrating the basic flow of the reduced size image generating operation performed in an image data generator according to the sixth embodiment of the present invention. FIGS. 30 through 32 are flowcharts for expatiating the partial decoding in the operation of FIG. 29, showing the partial decoding in the luminance component Y, the color difference component Cr, and the color difference component Cb, respectively.

A description will be given, with reference to FIGS. 29 through 32, of an operation of generating a reduced size image based on image data compressed losslessly using the color conversion of the equations (8) and 5×3 wavelet transform in the image data generator having the configuration of FIG. 12 or 13 according to the sixth embodiment of the present invention. Since the image data is compressed by lossless compression, all of the bit planes of all of the sub-bands are coded.

According to the reduced size image generating operation of this embodiment, first, in step S71 of FIG. 29, the resolution level of a reduced size image to be generated is set to (resolution level) r based on a resolution (1/k) specified by a user. Then, in step S72, (resolution level) i is set to zero (i=0) and r is decreased by one (r=r−1). In steps S73 through S75, i is incremented while i satisfies i≦r. During this process, in step S74, the entropy codes of all components are decoded with respect to each resolution level i. Additionally, as stated above, when the aspect ratio of a reduced size image is different from that of the original image, if a desired resolution (1/kh horizontally and 1/kv vertically) with respect to the original image is provided by a user, the value of r is calculated by the equation (7) using the smaller of kh and kv as k. It is clear that the following examples can be modified to the above case easily.

FIG. 28 shows the codes of the components arranged in the following order: component 0 (luminance), component 1 (color difference V), and component 2 (color difference U) of resolution 0 (minimum resolution), components 0, 1, and 2 of resolution 1, components 0, 1, and 2 of resolution 2, . . . . As is well known, in JPEG 2000, the codes of all components can be arranged in the order of resolutions as shown in FIG. 28. Therefore, it is possible to extract only the wavelet coefficients from the lowest resolution up to a desired resolution with ease (steps S71 through S75).

In this specification, the expression of a 1/3 “resolution” is frequently used, while in JPEG 2000, a quantity called “resolution level” is employed as a quantity similar to “resolution.” The lowest resolution is 0, and the second lowest resolution is 1. FIG. 16 shows the relationship between decomposition level and resolution level. Each “LL” sub-band takes an exceptional value in this relationship. That is, the resolution level of 3LL is resolution level 0, the resolution level of 3HL, 3LH, and 3HH is resolution level 1, the resolution level of 2HL, 2LH, and 2HH is resolution level 2, and the resolution level of 1HL, 1LH, and 1HH is resolution level 3. Further, the resolution level of 2LL is resolution level 1, and the resolution level of 1LL is resolution level 2.

The ratio of the resolution of revolution level r to the resolution of an original image depends on the maximum value of the decomposition level. If the maximum value of the decomposition level is d, the resolution of the wavelet coefficients (sub-band) of resolution level r (r>0) with respect to the original image is $1/2^{(d-r+1)}$. Therefore, the value of r that should be set in step S71 in order to generate a 1/k scale image of the original image is given by the above-described equation:

$$r=d-(\log_2 k-1) \quad (7)$$

Accordingly, when the desired resolution (1/k) with respect to the original image is provided by the user, the value of r is calculated by the equation (7) to be set in step S71.

Normally, the wavelet coefficients are quantized, and therefore, should be inversely quantized before being subjected to an inverse wavelet transform. Therefore, when the decoding is completed in each resolution level i lower than resolution level r (that is, “NO” in step S73), in step S76, all of the decoded wavelet coefficients are inversely quantized. Thereafter, in step S77, the inversely quantized wavelet coefficients are subjected to an inverse wavelet transform operation. The above-described selected inverse wavelet transform operation may be applied as the inverse wavelet transform operation of step S77. Next, in step S78, it is determined whether i equals r. If i does not equal r in step S78, in step S79, thinning-out processing is performed. In the case of a plurality of components, when i equals r (that is, “YES” in step S78) or after thinning-out processing (step S79), in step S80, inverse color conversion is performed and the operation ends.

Partial decoding, which is one feature of one embodiment of the present invention, is the operation of step S74. According to this embodiment, the wavelet coefficients of each component are obtained by partially decoding the codes of each component in the following manner, depending on the value of i of the resolution level (or depending on the decomposition level).

Referring to FIG. 30, first, in step S81, it is determined whether the component is the luminance Y. If the component is other than the luminance Y, the operation of FIG. 31 or 32 is started. With respect to the luminance Y (that is, in the case of “YES” in step S81), in step S82, it is determined whether i<r−2 is satisfied, and in step S84, it is determined whether i≦r−1 is satisfied. Based on the results of determination of these steps, the codes of the luminance Y are partially decoded so that the wavelet coefficients of the luminance Y are obtained.

When i≦r−2 (that is, “YES” in step S82), in step S83, the codes of all of the bit planes are decoded with respect to each sub-band. Since the LL sub-band exists only at resolution level 0, all of the codes of the LL sub-band are decoded as a result of step S83, so that the amount of codes not to be decoded is reduced.

When r−2<i≦r−1 (that is, “NO” in step S82 and “YES” in step S84), in step S85, decoding is performed on the bit planes of the sub-bands except for the two bit planes counted from the LSB bit plane (that is, the LSB bit plane and the next low-order bit plane) with respect to the HL and LH sub-bands and the three bit planes counted from the LSB bit plane with respect to the HH sub-band.

When r−1<i≦r (that is, “NO” in step S82 and “NO” in step S84), in step S86, decoding is performed on the bit planes of the sub-bands except for the three bit planes counted from the LSB bit plane with respect to the HL and LH sub-bands and the four bit planes counted from the LSB bit plane with respect to the HH sub-band.

With respect to the codes of the color difference Cr, in step S91 of FIG. 31, it is determined whether the component is the color difference Cr. If the component is other than the color difference Cr, the operation of FIG. 32 (or 30) is started. With respect to the color difference Cr (that is, in the case of “YES” in step S91), in step S92, it is determined whether i≦r−3 is satisfied, in step S94, it is determined whether i≦r−2 is satisfied, and in step S96, it is determined whether $i \leqq r-1$ is satisfied. Based on the results of determination of these steps, the codes of the color difference Cr are partially decoded so that the wavelet coefficients of the color difference Cr are obtained. With respect to the codes of the color difference Cr, the wavelet coefficients are obtained by further omitting the decoding of one more bit plane than with respect to the codes of the luminance Y.

When $i \leqq r-3$ (that is, "YES" in step S92), in step S93, the codes of all of the bit planes are decoded with respect to each sub-band.

When $r-3<i \leqq r-2$ (that is, "NO" in step S92 and "YES" in step S94), in step S95, decoding is performed on the bit planes of the sub-bands except for the two bit planes counted from the LSB bit plane with respect to the HL and LH sub-bands and the three bit planes counted from the LSB bit plane with respect to the HH sub-band.

When $r-2<i \leqq r-1$ (that is, "NO" in step S92, "NO" in step S94, and "YES" in step S96), in step S97, decoding is performed on the bit planes of the sub-bands except for the three bit planes counted from the LSB bit plane with respect to the HL and LH sub-bands and the four bit planes counted from the LSB bit plane with respect to the HH sub-band.

When $r-1<i \leqq r$ (that is, "NO" in steps S92, S94, and S96), in step S98, decoding is performed on the bit planes of the sub-bands except for the four bit planes counted from the LSB bit plane with respect to the HL and LH sub-bands and the five bit planes counted from the LSB bit plane with respect to the HH sub-band.

With respect to the codes of the color difference Cb, in step S101 of FIG. 32, it is determined whether the component is the color difference Cb. If the component is other than the color difference Cb, the operation of FIG. 30 or 31 is started. With respect to the color difference Cb (that is, in the case of "YES" in step S101), in step S102, it is determined whether $i \leqq r-3$ is satisfied, in step S104, it is determined whether $i \leqq r-2$ is satisfied, and in step S106, it is determined whether $i \leqq r-1$ is satisfied. Based on the results of determination of these steps, the codes of the color difference Cb are partially decoded so that the wavelet coefficients of the color difference Cb are obtained. With respect to the codes of the color difference Cb, the wavelet coefficients are obtained by further omitting the decoding of one more bit plane than with respect to the codes of the color difference Cr.

When $i \leqq r-3$ (that is, "YES" in step S102), in step S103, the codes of all of the bit planes are decoded with respect to each sub-band.

When $r-3<i \leqq r-2$ (that is, "NO" in step S102 and "YES" in step S104), in step S105, decoding is performed on the bit planes of the sub-bands except for the three bit planes counted from the LSB bit plane with respect to the HL and LH sub-bands and the four bit planes counted from the LSB bit plane with respect to the HH sub-band.

When $r-2<i \leqq r-1$ (that is, "NO" in step S102, "NO" in step S104, and "YES" in step S106), in step S107, decoding is performed on the bit planes of the sub-bands except for the four bit planes counted from the LSB bit plane with respect to the HL and LH sub-bands and the five bit planes counted from the LSB bit plane with respect to the HH sub-band.

When $r-1<i \leqq r$ (that is, "NO" in steps S102, S104, and S106), in step S108, decoding is performed on the bit planes of the sub-bands except for the five bit planes counted from the LSB bit plane with respect to the HL and LH sub-bands and the six bit planes counted from the LSB bit plane with respect to the HH sub-band.

Thus, Y<Cr<Cb holds among the components in terms of the amount of codes not to be decoded. Further, the amount of codes not to be decoded is smaller at a higher decomposition level. When each sub-band has the same total number of coded bit planes, the amount of codes not to be decoded is directly equal to the ratio of codes not to be decoded.

In the case of JPEG 2000, an MQ-coder is employed as an entropy coder. In the partial decoding of one embodiment of the present invention, it is important that the code configuration allow partial omission of decoding. Since the details of the entropy decoder have no direct relation to that nature of the partial decoding of one embodiment of the present invention, a description thereof will be omitted.

Referring back to FIG. 29, if i=r+1 in step S78 (that is, "YES" in step S78), the resolution specified by the user matches the resolution level of wavelet transform. Therefore, after performing an inverse quantization and an inverse wavelet transform, an inverse color conversion is performed without thinning-out processing so that a desired reduced size image is generated. On the other hand, if i=r in step S78 (that is, "NO" in step S78), the resolution level of wavelet transform is higher than the resolution specified by the user. Therefore, in step S79, each of Y, Cr, and Cb is converted to a desired size by well-known thinning-out processing after being subjected to an inverse quantization and an inverse wavelet transform. In this embodiment, in order to reduce the amount of processing, thinning-out processing is performed before the inverse color conversion instead of thinning out the R, G, and B values obtained after the inverse color conversion.

Omitting the decoding of the LSB bit plane is equivalent to dividing (quantizing) the wavelet coefficients by two. Omitting the decoding of the n bit planes counted from the LSB bit plane is equivalent to quantizing the wavelet coefficients by $2^n$. Therefore, in the case of omitting the decoding of bit planes, multiplying the decoded wavelet coefficients by $2^n$ is equivalent to performing an inverse quantization on the decoded wavelet coefficients.

In this embodiment, the equations (8) are employed to calculate Y, Cr, and Cb. In the case of calculating Y, Cr, and Cb using the well known equations provided by CCIR 601, however, the technique of this embodiment is also applicable. Further, the nearest neighbor method, which is widely used, is taken as an example of thinning-out processing. Since the algorithm of thinning-out processing itself does not affect the partial decoding of one embodiment of the present invention, an explanation of the algorithm will be omitted. For the details of the algorithm, see "Introduction to Computer Image Processing" (by Hideyuki Tamura, Soken Publishing Ltd., 1985).

Figure 33:
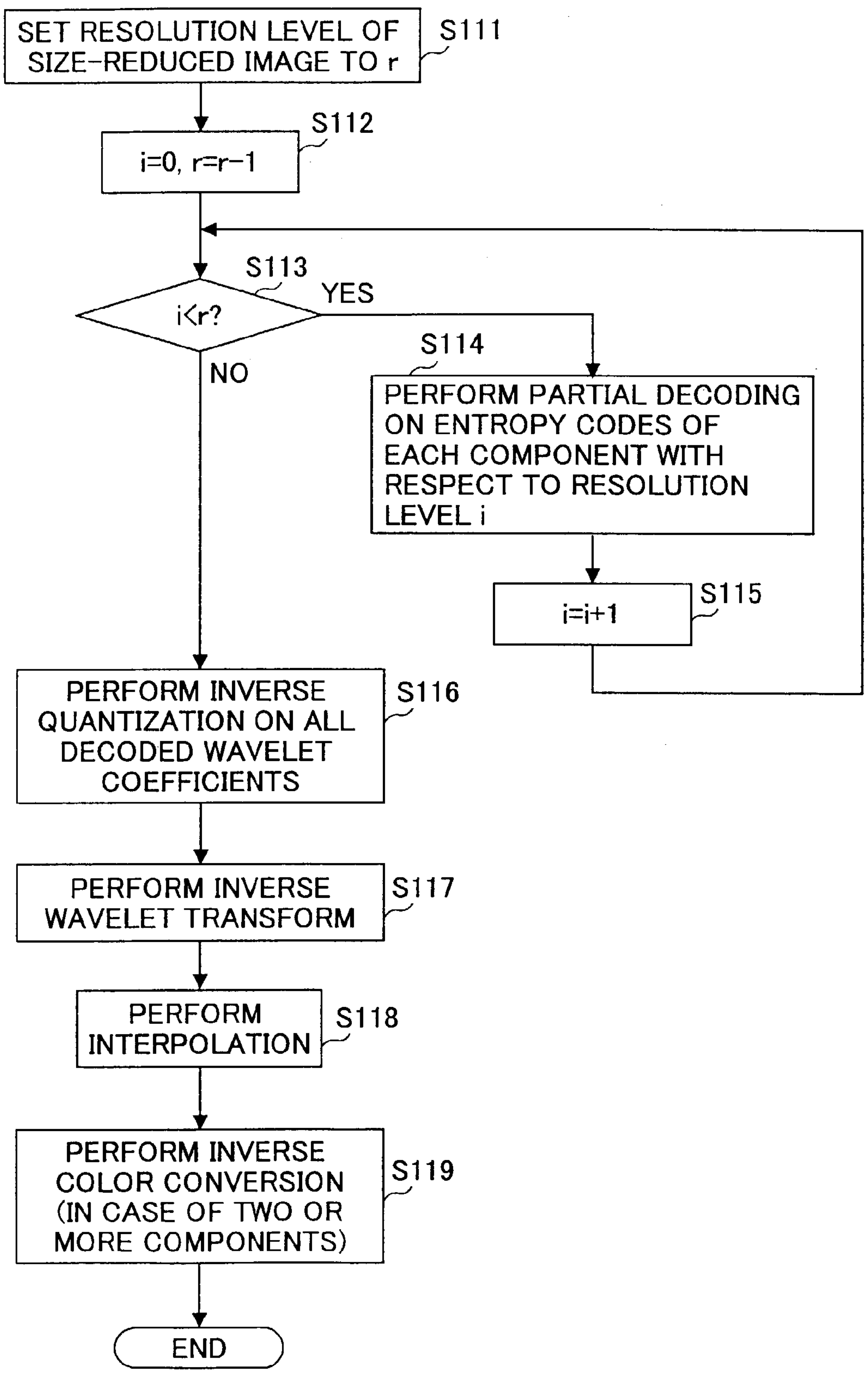
FIG. 33 is a flowchart for illustrating the basic flow of another reduced size image generating operation performed in the image data generator according to the sixth embodiment of the present invention.

FIG. 33 is a flowchart for illustrating the basic flow of another reduced size image generating operation performed in the image data generator according to this embodiment to which method the partial decoding of the present invention is applied.

In the above-described case, the conditional expression of step S73 is $i \leqq r$. Therefore, the resolution level of the extracted wavelet coefficients is equal to or higher by one than the resolution specified by the user. If the conditional expression of step S73 is changed to i<r, however, the resolution level lower than the resolution level specified by the user by one can be extracted, so that each of Y, Cr, and Cb is converted to a desired size by well known interpolation processing after being subjected to an inverse wavelet transform.

According to the reduced size image generating operation of FIG. 33 according to this embodiment, first, in step S111, the resolution level of a reduced size image to be generated is set to (resolution level) r based on a resolution (1/k)

specified by the user. Then, in step S112, (resolution level) i is set to zero (i=0) and r is decreased by one (r=r−1). In steps S113 through S115, i is incremented while i satisfies i≦r. During this process, in step S114, the entropy codes of all components are decoded with respect to each resolution level i. As in the above-described case, the operations described with reference to FIGS. 30 through 32 are applicable to the partial decoding operation on Y, Cr, and Cb of step S114.

Normally, the wavelet coefficients are quantized, and therefore, should be inversely quantized before being subjected to an inverse wavelet transform. Therefore, when the decoding is completed in each resolution level i lower than resolution level r (that is, "NO" in step S113), in step S116, all of the decoded wavelet coefficients are inversely quantized. Thereafter, in step S117, the inversely quantized wavelet coefficients are subjected to an inverse wavelet transform operation. The above-described selected inverse wavelet transform operation may be applied as the inverse wavelet transform operation of step S117. Next, in step S118, interpolation is performed. The nearest neighbor method, which is widely used, is taken as an example of interpolation. For the expatiation of the algorithm of interpolation, the above-described "Introduction to Computer Image Processing" may be referred to. In the case of a plurality of components, in step S119, an inverse color conversion is performed and the operation ends.

Thus, according to one embodiment of the present invention, the wavelet coefficients are subjected to an inverse wavelet transform, and in the case of generating a reduced size image of an original image, the wavelet coefficients in the same sub-band are selectively subjected to an inverse wavelet transform. Therefore, the reduced size image can be generated with a reduced amount of calculation.

Further, according to one embodiment of the present invention, the wavelet coefficients in the same sub-band are partially decoded in performing an inverse wavelet transform on the wavelet coefficients and generating a reduced size image of an original image. Therefore, the reduced size image can be generated with decoding speed and decoded image quality being balanced with each other.

The present invention is not limited to the specifically disclosed embodiments, but variations and modifications may be made without departing from the scope of the present invention.

The present application is based on Japanese priority application No. 2002-072696 filed on Mar. 15, 2002, the entire contents of which are hereby incorporated by reference.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Appendix A

I hereby appoint with full power of substitution and revocation, to prosecute this application and to transact all business in the Patent and Trademark Office connected herewith, BLAKELY SOKOLOFF TAYLOR & ZAFMAN LLP, a firm including: Ramin Aghevli, Reg. No. 43,462; William E. Alford, Reg. No. 37,764; Farzad E. Amini, Reg. No. 42,261; W. Thomas Babbitt, Reg. No. 39,591; Jordan M. Becker, Reg. No. 39,602; Michael A. Bernadicou, Reg. No. 35,934; Roger W. Blakely, Jr., Reg. No. 25,831; R. Alan Burnett, Reg. No. 46,149; Gregory D. Caldwell, Reg. No. 39,926; Cory G. Claassen, Reg. No. 50,296; Thomas M. Coester, Reg. No. 39,637; Mimi D. Dao, Reg. No. 45,628; Stephen M. De Klerk, Reg. No. 46,503; Daniel M. De Vos, Reg. No. 37,813; Sanjeet Dutta, Reg. No. 46,145; Tarek N. Fahmi, Reg. No. 41,402; Thomas S. Ferrill, Reg. No. 42,532; George L. Fountain, Reg. No. 36,374; Angelo J. Gaz, Reg. No. 45,907; Andre M. Gibbs, Reg. No. 47,593; James Y. Go, Reg. No. 40,621; Jeffery S. Heileson, Reg. No. 46,765; James A. Henry, Reg. No. 41,064; William E. Hickman, Reg. No. 46,771; Willmore F. Holbrow III, Reg. No. 41,845; Sheryl Sue Holloway, Reg. No. 37,850; George W Hoover II, Reg. No. 32,992; Eric S. Hyman, Reg. No. 30,139; Aslam A. Jaffery, Reg. No. 51,841; William W. Kidd, Reg. No. 31,772; Walter T. Kim, Reg. No. 42,731; Eric T. King, Reg. No. 44,188; Steven Laut, Reg. No. 47,736; Suk S. Lee, Reg. No. 47,745; Gordon R. Lindeen III, Reg. No. 33,192; Jan C. Little, Reg. No. 41,181; Joseph Lutz, Reg. No. 43,765; Lawrence E. Lycke, Reg. No. 38,540; Michael J. Mallie, Reg. No. 36,591; Andre L. Marais, Reg. No. 48,095; Raul D. Martinez, Reg. No. 46,904; Paul A. Mendonsa, Reg. No. 42,879; Jonathan S. Miller, Reg. No. 48,534; Heather M. Molleur, Reg. No. 50,432; Richard A. Nakashima, Reg. No. 42,023; Thinh V. Nguyen, Reg. No. 42,034; Robert B. O'Rourke, Reg. No. 46,972; Daniel E. Ovanezian, Reg. No. 41,236; Philip A. Pedigo, Reg. No. 52,107; Marina G. Portnova, Reg. No. 45,750; Joseph A. Pugh, Reg. No. 52,137; James H. Salter, Reg. No. 35,668; William W. Schaal, Reg. No. 39,018; James C. Scheller, Reg. No. 31,195; Saina S. Shamilov, Reg. No. 48,266; Kevin G. Shao, Reg. No. 45,095; Stanley W. Sokoloff, Reg. No. 25,128; Judith A. Szepesi, Reg. No. 39,393; Edwin H. Taylor, Reg. No. 25,129; Lisa Tom, Reg. No. 52,291; John F. Travis, Reg. No. 43,203; Kerry D. Tweet, Reg. No. 45,959; Mark C. Van Ness, Reg. No. 39,865; Thomas A. Van Zandt, Reg. No. 43,219; Mark R. Vatuone, Reg. No. 53,719; Lester J. Vincent, Reg. No. 31,460; John P. Ward, Reg. No. 40,216; Mark L. Watson, Reg. No. 46,322; Thomas C. Webster, Reg. No. 46,154; Chui-Kiu Teresa Wong, Reg. No. 48,042; and Norman Zafman, Reg. No. 26,250, my patent attorneys, and Brent Vecchia, Reg. No. 48,011 and Lehua Wang, Reg. No. 48,023, my patent agents, with offices located at 12400 Wilshire Boulevard, 7th Floor, Los Angeles, California 90025, telephone (310) 207-3800; and James R. Thein, Reg. No. 31,710, my patent attorney with full power of substitution and revocation, to prosecute this application and to transact all business in the Patent and Trademark Office connected herewith.

What is claimed is:

1. An apparatus for generating data for a reduced size image of an original image, the apparatus comprising:

a coefficient selecting unit to select wavelet coefficients to be subjected to an inverse wavelet transform in a same sub-band from wavelet coefficients obtained by performing a wavelet transform on the original image one or more times; and an inverse wavelet transform unit to perform the inverse wavelet transform only on the wavelet coefficients selected in the coefficient selecting unit with respect to the sub-band, wherein the coefficient selecting unit selects the wavelet coefficients required to obtain desired pixels of the original image.

2. The apparatus as claimed in claim 1, wherein the coefficient selecting unit comprises a unit to select at least all of wavelet coefficients relating to pixels of the size-reduced image to be generated.

3. The apparatus as claimed in claim 1, wherein the coefficient selecting unit comprises a unit to select only wavelet coefficients relating to pixels of the size-reduced image to be generated.

4. The apparatus as claimed in claim 1, wherein the inverse wavelet transform comprises a plurality of inverse wavelet transforms; and the coefficient selecting unit comprises a unit to select, of the wavelet coefficients in the sub-band in an interleaved state, all of wavelet coefficients positioned on straight lines extending in a direction in which the last one of the inverse wavelet transforms is performed, the straight lines each including a wavelet coefficient corresponding to a pixel position of the size-reduced image to be generated.

5. The apparatus as claimed in claim 1, wherein:

the inverse wavelet transform is performed two-dimensionally in first and second directions perpendicular to each other in an order; and the coefficient selecting unit comprises a unit that, in selecting wavelet coefficients to be subjected to the inverse wavelet transform performed in the first direction, selects, of the wavelet coefficients in the sub-band in an interleaved state, all of wavelet coefficients positioned on straight lines extending in the second direction, the straight lines including a wavelet coefficient corresponding to a pixel position of the size-reduced image to be generated or a wavelet coefficient required to obtain the pixel position by the inverse wavelet transform in the first direction.

6. The apparatus as claimed in claim 1, wherein the coefficient selecting unit comprises a unit to select all of wavelet coefficients in sub-bands of a decomposition level higher than a decomposition level of an LL sub-band having a maximum resolution below a resolution of the size-reduced image to be generated, in order to obtain the LL sub-band by the inverse wavelet transform.

7. The apparatus as claimed in claim 1, further comprising a high-pass filter and a low-pass filter having different tap lengths for the inverse wavelet transform, wherein the sum of the tap lengths of the high-pass and low-pass filters performing filtering centered on wavelet coefficients corresponding to pixel positions of the size-reduced image to be generated of the wavelet coefficients in the sub-band in an interleaved state is smaller than $$d \cdot n(Tlow+Thigh)/2$$

where d is a dimensional number of the inverse wavelet transform, n is the number of pixels of the size-reduced image, Tlow is the tap length of the low-pass filter, and Thigh is the tap length of the high-pass filter.

8. The apparatus as claimed in claim 1, wherein the inverse wavelet transform is performed independently on each of a plurality of components with at least one of the components having a resolution set therefor, the resolution being set different from a resolution set for the rest of the components.

9. The apparatus as claimed in claim 8, wherein:

the components comprises a luminance component and two color-difference components; and the luminance component is subjected to the inverse wavelet transform to a resolution higher than the color-difference components.

10. An image data generator for generating data for a reduced size image of an original image, the image data generator comprising:

a coefficient selection unit to select wavelet coefficients to be subjected to an inverse wavelet transform in a same sub-band from wavelet coefficients obtained by performing a wavelet transform on the original image one or more times;

an inverse wavelet transform unit to perform inverse wavelet transform independently on each of the components with at least one of the components having a resolution set therefor, the resolution being set different from a resolution set for the rest of the components;

wherein the coefficient selecting unit selects the wavelet coefficients required to obtain desired pixels of the original image.

11. The image data generator as claimed in claim 10, wherein:

the wavelet coefficients are of a plurality of components:

the components comprises a luminance component and two color-difference components; and the luminance component is subjected to the inverse wavelet transform to a resolution higher than the color-difference components.

12. A computer-implemented method of generating a reduced size image of an original image, the method comprising:

(a) selecting wavelet coefficients to be subjected to an inverse wavelet transform in a same sub-band from wavelet coefficients obtained by performing a wavelet transform on the original image one or more times; and (b) performing the inverse wavelet transform only on the wavelet coefficients selected to be subjected to the inverse wavelet transform with respect to the sub-band to generate data of the reduced size image, wherein the coefficient selecting unit selects the wavelet coefficients required to obtain desired pixels of the original image.

13. An article of manufacture having one or more computer-readable recording media storing instructions which, when executed by a system, cause the system to generate data for a reduced size image of an original image by:

(a) selecting wavelet coefficients to be subjected to an inverse wavelet transform in a same sub-band from wavelet coefficients obtained by performing a wavelet transform on the original image one or more times; and (b) performing the inverse wavelet transform only on the wavelet coefficients selected to be subjected to the inverse wavelet transform with respect to the sub-band to generate data of the reduced size image, wherein the coefficient selecting unit selects the wavelet coefficients required to obtain desired pixels of the original image.

14. An apparatus of generating a reduced size image of an original image, the apparatus comprising:

means for selecting wavelet coefficients to be subjected to an inverse wavelet transform in a same sub-band from wavelet coefficients obtained by performing a wavelet transform on the original image one or more times; and means for performing the inverse wavelet transform only on the wavelet coefficients selected to be subjected to an inverse wavelet transform with respect to the sub-band, wherein the coefficient selecting unit selects the wavelet coefficients required to obtain desired pixels of the original image.

* * * * *